United States Patent
Blair et al.

(10) Patent No.: US 12,290,816 B2
(45) Date of Patent: May 6, 2025

(54) APPARATUS TO FACILITATE TRANSFER OF BIOLOGICAL SPECIMENS STORED AT CRYOGENIC CONDITIONS

(71) Applicant: TMRW Life Sciences, Inc., New York, NY (US)

(72) Inventors: William Alan Blair, San Diego, CA (US); Timothy Alan Sharp, Farmingdale, NY (US); Amit Gupta, Jersey City, NJ (US); Kathryn Josephine Go, Somerville, MA (US); William Nicholas Garbarini, Jr., Cranford, NJ (US)

(73) Assignee: TMRW Life Sciences, Inc., New York, NY (US)

( * ) Notice: Subject to any disclaimer, the term of this patent is extended or adjusted under 35 U.S.C. 154(b) by 0 days.

(21) Appl. No.: 18/113,297

(22) Filed: Feb. 23, 2023

(65) Prior Publication Data

US 2023/0191415 A1 Jun. 22, 2023

Related U.S. Application Data

(63) Continuation of application No. 17/082,359, filed on Oct. 28, 2020, now Pat. No. 11,607,691.

(Continued)

(51) Int. Cl.
*B01L 3/00* (2006.01)
*A01N 1/147* (2025.01)
*B01L 7/00* (2006.01)

(52) U.S. Cl.
CPC .......... *B01L 3/50851* (2013.01); *A01N 1/147* (2025.01); *B01L 3/5029* (2013.01);

(Continued)

(58) Field of Classification Search
CPC . H01L 2224/45144; H01L 2224/73204; H01L 2224/83101; H01L 24/97;

(Continued)

(56) References Cited

U.S. PATENT DOCUMENTS

| 4,573,581 | A | 3/1986 | Galloway et al. |
| D300,583 | S | 4/1989 | Smith |

(Continued)

FOREIGN PATENT DOCUMENTS

| AU | 2011357590 B2 | 9/2015 |
| AU | 2017287017 A1 | 1/2019 |

(Continued)

OTHER PUBLICATIONS

EP Search Report mailed Mar. 6, 2024 in EP App No. 22739992.0, 7 pages.

(Continued)

*Primary Examiner* — Jennifer Wecker
*Assistant Examiner* — Jonathan Bortoli
(74) *Attorney, Agent, or Firm* — Cozen O'Connor

(57) ABSTRACT

A system and method facilitates transfers of specimen containers (e.g., vials with caps) between storage cassettes and carrier cassettes. The storage cassettes are designed to be stored in cryogenic refrigerators while the carrier cassettes are designed to be temporarily stored in a portable carrier. Identification information is read from wireless transponders carried by the specimen containers. Visual mappings of the positions of the specimen container in the cassettes is provided. Presence and position of the specimen containers in the cassettes is verified, and alerts of inconsistencies provided along with corrective commands. Inventories of specimen container and even specific specimen holders are provided.

21 Claims, 27 Drawing Sheets

Related U.S. Application Data

(60) Provisional application No. 62/927,566, filed on Oct. 29, 2019.

(52) U.S. Cl.
CPC ............ *B01L 3/50825* (2013.01); *B01L 7/50* (2013.01); *B01L 2200/147* (2013.01); *B01L 2300/042* (2013.01); *B01L 2300/1883* (2013.01)

(58) Field of Classification Search
CPC ... H01L 2924/01079; H01L 2924/3011; H01L 2224/16225; H01L 2224/32225; H01L 2224/48091; H01L 2224/92125; H01L 2924/00; H01L 2924/00014; H01L 2924/15311; H01L 2924/15312; H01L 2924/181; H01L 2224/97; H01L 2924/01005; H01L 2924/01006; H01L 2924/01013; H01L 2924/01029; H01L 2924/01033; H01L 2924/01082; H01L 21/56; H01L 21/561; H01L 21/563; H01L 21/566; H01L 21/568; H01L 21/6835; H01L 2221/68345; H01L 2221/68377; H01L 2224/02371; H01L 2224/0401; H01L 2224/05552; H01L 2224/0556; H01L 2224/16235; H01L 2224/16237; H01L 2224/274; H01L 2224/29111; H01L 2224/32245; H01L 2224/45015; H01L 2224/48227; H01L 2224/48465; H01L 2224/50; H01L 2224/73104; H01L 2224/73203; H01L 2224/73253; H01L 2224/73265; H01L 2224/81; H01L 2224/83102; H01L 2224/83191; H01L 2224/85; H01L 2224/85001; H01L 2224/85205; H01L 2225/06517; H01L 2225/0652; H01L 2225/06527; H01L 2225/06541; H01L 2225/06551; H01L 2225/06572; H01L 2225/06579; H01L 2225/06582; H01L 2225/06586; H01L 2225/06589; H01L 2225/1005; H01L 2225/1064; H01L 2225/107; H01L 2225/1082; H01L 23/24; H01L 23/3107; H01L 23/3114; H01L 23/3121; H01L 23/3128; H01L 23/49572; H01L 23/4985; H01L 24/27; H01L 24/29; H01L 24/45; H01L 24/48; H01L 24/73; H01L 25/0657; H01L 25/105; H01L 29/0657; H01L 2924/00012; H01L 2924/0002; H01L 2924/01027; H01L 2924/01028; H01L 2924/01046; H01L 2924/0105; H01L 2924/01074; H01L 2924/01078; H01L 2924/0133; H01L 2924/12042; H01L 2924/15153; H01L 2924/15165; H01L 2924/15173; H01L 2924/15174; H01L 2924/15192; H01L 2924/1532; H01L 2924/15331; H01L 2924/16195; H01L 2924/18161; H01L 2924/207; H01L 2924/3025; H01L 2924/3511; H01L 2924/3512; H01L 2224/16; H01L 2224/29011; H01L 2924/351; H01L 2924/01004; B29C 2043/3444; B29C 2043/3628; B29C 43/18; A01N 1/0242; A01N 1/0257; A01N 1/0268; B01L 2200/147; B01L 2300/042; B01L 2300/1883; B01L 2300/1894; B01L 3/5029; B01L 3/50825; B01L 3/50851; B01L 7/50; B01L 9/06; G06K 17/0022; G06K 7/10356

See application file for complete search history.

(56) References Cited

U.S. PATENT DOCUMENTS

| | | |
|---|---|---|
| D310,264 S | 8/1990 | Leoncavallo et al. |
| 5,024,830 A | 6/1991 | Linner |
| 5,176,202 A | 1/1993 | Richard |
| 5,355,684 A | 10/1994 | Guice |
| 5,545,562 A | 8/1996 | Cassou et al. |
| D382,809 S | 8/1997 | Aldrich et al. |
| D382,810 S | 8/1997 | Aldrich et al. |
| 5,711,446 A | 1/1998 | Jeffs et al. |
| 5,741,462 A | 4/1998 | Nova et al. |
| 5,751,629 A | 5/1998 | Nova et al. |
| 5,874,214 A | 2/1999 | Nova et al. |
| D408,145 S | 4/1999 | Au |
| 5,921,102 A | 7/1999 | Vago |
| 5,925,562 A | 7/1999 | Nova et al. |
| 5,964,095 A | 10/1999 | Coelho et al. |
| 6,066,300 A | 5/2000 | Carey et al. |
| 6,100,026 A | 8/2000 | Nova et al. |
| 6,141,975 A | 11/2000 | Tatsumi |
| 6,156,566 A | 12/2000 | Bryant |
| 6,302,327 B1 | 10/2001 | Coelho et al. |
| 6,329,139 B1 | 12/2001 | Nova et al. |
| 6,564,120 B1 | 5/2003 | Richard et al. |
| 6,701,743 B1 | 3/2004 | Durst et al. |
| D496,398 S | 9/2004 | Greenberg |
| 6,888,063 B1 | 5/2005 | Lien et al. |
| D506,550 S | 6/2005 | Greenberg |
| 7,070,053 B1 | 7/2006 | Abrams et al. |
| 7,091,864 B2 | 8/2006 | Veitch et al. |
| D535,478 S | 1/2007 | Uffner et al. |
| 7,278,328 B2 | 10/2007 | Massaro |
| 7,316,896 B2 | 1/2008 | Kuwayama et al. |
| 7,350,703 B2 | 4/2008 | Ambartsoumian |
| 7,411,508 B2 | 8/2008 | Harazin et al. |
| D576,488 S | 9/2008 | Miota et al. |
| 7,661,591 B2 | 2/2010 | Dearing et al. |
| 7,694,886 B2 | 4/2010 | Tan et al. |
| 7,861,540 B2 | 1/2011 | Cloutier et al. |
| 7,870,748 B2 | 1/2011 | Byrne |
| D642,697 S | 8/2011 | Gaefvert |
| 8,097,199 B2 | 1/2012 | Abbott et al. |
| 8,098,162 B2 | 1/2012 | Abbott et al. |
| 8,115,599 B2 | 2/2012 | Harazin et al. |
| 8,168,138 B2 | 5/2012 | Che et al. |
| 8,378,827 B2 | 2/2013 | Davidowitz et al. |
| D682,045 S | 5/2013 | Myoung |
| 8,502,645 B2 | 8/2013 | Thomas et al. |
| 8,710,958 B2 | 4/2014 | Yang et al. |
| 8,790,597 B2 | 7/2014 | Childs et al. |
| 8,852,536 B2 | 10/2014 | Davidowitz et al. |
| 8,872,627 B2 | 10/2014 | Davidowitz |
| 8,884,743 B2 | 11/2014 | Chaffey et al. |
| 8,919,532 B2 | 12/2014 | Buergermeister et al. |
| 8,937,550 B2 | 1/2015 | Phaneuf et al. |
| 9,028,754 B2 | 5/2015 | Winter et al. |
| 9,033,251 B2 | 5/2015 | Weisshaupt et al. |
| D733,314 S | 6/2015 | Lui |
| 9,140,487 B2 | 9/2015 | Chaffey et al. |
| 9,163,869 B2 | 10/2015 | Warhurst et al. |
| 9,211,540 B2 | 12/2015 | Lansdowne |
| 9,280,738 B2 | 3/2016 | Dor et al. |
| 9,289,770 B2 | 3/2016 | Lavi |
| 9,297,499 B2 | 3/2016 | Jimenez-Rios et al. |
| 9,418,265 B2 | 8/2016 | Morris et al. |
| 9,431,692 B2 | 8/2016 | Davidowitz et al. |
| D768,868 S | 10/2016 | Inoue |
| D771,271 S | 11/2016 | Zingre |
| 9,501,734 B2 | 11/2016 | Morris |
| 9,516,876 B2 | 12/2016 | Inoue |
| D777,941 S | 1/2017 | Piramoon |
| 9,538,746 B2 | 1/2017 | Inoue |

(56) References Cited

U.S. PATENT DOCUMENTS

| | | |
|---|---|---|
| 9,538,747 B2 | 1/2017 | Inoue |
| 9,547,782 B2 | 1/2017 | Lansdowne |
| 9,551,649 B2 | 1/2017 | Houghton et al. |
| 9,589,225 B2 | 3/2017 | Morris |
| 9,619,678 B2 | 4/2017 | Morris et al. |
| 9,697,457 B2 | 7/2017 | Morris |
| 9,723,832 B2 | 8/2017 | Camenisch et al. |
| 9,736,890 B2 | 8/2017 | Chaffey et al. |
| 9,764,325 B2 | 9/2017 | Davidowitz |
| 9,796,574 B2 | 10/2017 | Frey et al. |
| 9,928,457 B2 | 3/2018 | McDowell |
| D816,165 S | 4/2018 | Haug |
| D835,472 S | 12/2018 | Seiders et al. |
| 10,156,386 B2 | 12/2018 | Bartlett et al. |
| D840,684 S | 2/2019 | Luburic |
| 10,207,270 B2 | 2/2019 | Lansdowne |
| 10,241,015 B2 | 3/2019 | Hollabaugh et al. |
| D845,139 S | 4/2019 | Wilson et al. |
| 10,328,431 B2 | 6/2019 | Davidowitz |
| 10,401,082 B2 | 9/2019 | Coradetti et al. |
| 10,493,457 B2 | 12/2019 | Croquette et al. |
| 10,531,657 B2 | 1/2020 | Farrington et al. |
| D874,875 S | 2/2020 | Huang |
| 10,561,141 B2 | 2/2020 | Suzuki et al. |
| 10,677,810 B2 | 6/2020 | Grimwood et al. |
| D890,948 S | 7/2020 | Figueredo et al. |
| 10,748,050 B2 | 8/2020 | Morris et al. |
| D910,836 S | 2/2021 | Sandberg et al. |
| 10,973,226 B2 | 4/2021 | Blair et al. |
| 10,989,636 B2 | 4/2021 | Gutelius et al. |
| D928,343 S | 8/2021 | Bonnoitt et al. |
| D930,186 S | 9/2021 | Kim |
| D931,128 S | 9/2021 | Li |
| D932,906 S | 10/2021 | Schulz |
| 11,148,143 B2 | 10/2021 | Davidowitz et al. |
| 11,175,298 B2 | 11/2021 | Neeper et al. |
| D938,053 S | 12/2021 | Xiao |
| D945,271 S | 3/2022 | Halgren et al. |
| 2002/0190845 A1 | 12/2002 | Moore |
| 2002/0196146 A1 | 12/2002 | Moore |
| 2003/0017082 A1 | 1/2003 | Van Deursen et al. |
| 2003/0174046 A1 | 9/2003 | Abrams |
| 2004/0100415 A1 | 5/2004 | Veitch et al. |
| 2005/0058483 A1 | 3/2005 | Chapman et al. |
| 2005/0237195 A1 | 10/2005 | Urban |
| 2005/0247782 A1 | 11/2005 | Ambartsoumian |
| 2006/0051239 A1 | 3/2006 | Massaro |
| 2006/0283945 A1 | 12/2006 | Excoffier et al. |
| 2007/0068208 A1 | 3/2007 | Norman et al. |
| 2007/0172396 A1 | 7/2007 | Neeper et al. |
| 2008/0012687 A1 | 1/2008 | Rubinstein |
| 2008/0024301 A1 | 1/2008 | Fritchie et al. |
| 2008/0121700 A1 | 5/2008 | Dearing et al. |
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0141384 A1 | 6/2010 | Chen et al. |
| 2010/0281886 A1 | 11/2010 | Shaham et al. |
| 2010/0302040 A1 | 12/2010 | Davidowitz et al. |
| 2010/0318217 A1 | 12/2010 | Ferrer et al. |
| 2011/0088424 A1 | 4/2011 | Cloutier et al. |
| 2011/0088517 A1 | 4/2011 | Tsujimura et al. |
| 2011/0137812 A1 | 6/2011 | Sherga |
| 2011/0143452 A1 | 6/2011 | Che et al. |
| 2011/0181875 A1 | 7/2011 | Nakahana et al. |
| 2011/0199187 A1 | 8/2011 | Davidowitz |
| 2011/0199188 A1 | 8/2011 | Dickson |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |
| 2012/0167786 A1 | 7/2012 | Laugharn, Jr. |
| 2012/0187197 A1 | 7/2012 | Masin |
| 2012/0256806 A1 | 10/2012 | Davidowitz et al. |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Laugharn et al. |
| 2013/0217107 A1 | 8/2013 | Pederson et al. |
| 2013/0342320 A1 | 12/2013 | Hinman et al. |
| 2014/0008355 A1 | 1/2014 | Chaffey et al. |
| 2014/0157798 A1 | 6/2014 | Jimenez-Rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0295328 A1* | 10/2015 | Fireaizen ............. H01Q 3/2647 342/370 |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0086003 A1* | 3/2016 | Nikitin ............... G06K 7/10019 340/10.3 |
| 2016/0095309 A1 | 4/2016 | Reuteler |
| 2016/0101908 A1 | 4/2016 | Minnette et al. |
| 2016/0143270 A1 | 5/2016 | Schryver |
| 2016/0175837 A1 | 6/2016 | Chaffey et al. |
| 2016/0236387 A1 | 8/2016 | Carroll et al. |
| 2016/0288999 A1 | 10/2016 | Caveney et al. |
| 2016/0289000 A1 | 10/2016 | Caveney et al. |
| 2016/0349172 A1 | 12/2016 | Houghton et al. |
| 2016/0353730 A1 | 12/2016 | Harston et al. |
| 2016/0358062 A1 | 12/2016 | Morris |
| 2017/0113909 A1 | 4/2017 | Frey et al. |
| 2017/0122846 A1 | 5/2017 | Holmes et al. |
| 2017/0146636 A1* | 5/2017 | Alicot ................ G08B 13/2462 |
| 2017/0184479 A1 | 6/2017 | Schryver et al. |
| 2017/0190056 A1 | 7/2017 | Lapham et al. |
| 2017/0320054 A1 | 11/2017 | Crum et al. |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0086533 A1 | 3/2018 | Nelland |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |
| 2018/0154359 A1 | 6/2018 | Ueyama |
| 2018/0202908 A1 | 7/2018 | Croquette et al. |
| 2018/0313498 A1 | 11/2018 | Antola et al. |
| 2018/0368394 A1 | 12/2018 | Kjelland et al. |
| 2019/0000073 A1 | 1/2019 | Pedersen et al. |
| 2019/0025280 A1 | 1/2019 | Kaditz et al. |
| 2019/0060892 A1 | 2/2019 | Davidowitz et al. |
| 2019/0092555 A1 | 3/2019 | Ma et al. |
| 2019/0162639 A1 | 5/2019 | Gutelius et al. |
| 2019/0193078 A1 | 6/2019 | Fiondella et al. |
| 2019/0250181 A1 | 8/2019 | Seeber |
| 2019/0276233 A1 | 9/2019 | Caveney et al. |
| 2019/0293344 A1 | 9/2019 | Sun et al. |
| 2019/0297877 A1 | 10/2019 | Komatsu et al. |
| 2020/0093122 A1 | 3/2020 | Lin et al. |

(56) References Cited

U.S. PATENT DOCUMENTS

| | | |
|---|---|---|
| 2020/0097788 A1 | 3/2020 | Pedersen et al. |
| 2020/0107541 A1 | 4/2020 | Blair et al. |
| 2020/0143930 A1* | 5/2020 | Catchings ........ G06K 19/07773 |
| 2020/0229431 A1 | 7/2020 | Blair et al. |
| 2020/0248638 A1 | 8/2020 | Engfehr et al. |
| 2020/0281191 A1 | 9/2020 | Ally et al. |
| 2020/0319625 A1* | 10/2020 | Morris ............... G05B 19/4155 |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1 | 3/2022 | Gupta et al. |
| 2022/0136656 A1 | 5/2022 | Clarke et al. |
| 2022/0221476 A1 | 7/2022 | Craven et al. |

FOREIGN PATENT DOCUMENTS

| | | |
|---|---|---|
| CA | 2972315 A1 | 8/2016 |
| CN | 105857932 A | 8/2016 |
| CN | 105890965 A | 8/2016 |
| CN | 106102460 A | 11/2016 |
| CN | 205815766 U | 12/2016 |
| CN | 106370879 A | 2/2017 |
| CN | 106871546 A | 6/2017 |
| CN | 107624751 A | 1/2018 |
| CN | 108112576 A | 6/2018 |
| CN | 207595583 U | 7/2018 |
| CN | 207663251 U | 7/2018 |
| CN | 207675193 U | 7/2018 |
| CN | 108541702 A | 9/2018 |
| CN | 109258627 A | 1/2019 |
| CN | 208425434 U | 1/2019 |
| CN | 109922887 A | 6/2019 |
| CN | 110476952 A | 11/2019 |
| CN | 110517737 A | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 210711515 U | 6/2020 |
| CN | 111771211 A | 10/2020 |
| DE | 102011012887 A1 | 8/2012 |
| EP | 0411224 A2 | 2/1991 |
| EP | 0706825 A1 | 4/1996 |
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2301857 A1 | 3/2011 |
| EP | 2315163 A1 | 4/2011 |
| EP | 2358196 A1 | 8/2011 |
| EP | 2467465 A1 | 6/2012 |
| EP | 2124171 B1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2614320 B1 | 10/2016 |
| EP | 2354729 B1 | 12/2016 |
| EP | 2873497 B1 | 5/2017 |
| EP | 2948247 B1 | 11/2017 |
| EP | 2743865 B1 | 6/2019 |
| EP | 2866938 B1 | 6/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3655892 A1 | 5/2020 |
| EP | 3228191 B1 | 8/2020 |
| EP | 4252009 A4 | 4/2024 |
| ES | 2467465 A2 | 6/2014 |
| ES | 2595984 T3 | 1/2017 |
| JP | 2000137031 A | 5/2000 |
| JP | 2001142861 A | 5/2001 |
| JP | 2004028595 A | 1/2004 |
| JP | 2005009863 A | 1/2005 |
| JP | 2005239366 A | 9/2005 |
| JP | 2005321935 A | 11/2005 |
| JP | 2007235905 A | 9/2007 |
| JP | 2007532867 A | 11/2007 |
| JP | 2008021082 A | 1/2008 |
| JP | 2008522184 A | 6/2008 |
| JP | 2010521725 A | 6/2010 |
| JP | 2012526966 A | 11/2012 |
| JP | 5278978 B2 | 5/2013 |
| JP | 2014174647 A | 9/2014 |
| JP | 2015019244 A | 1/2015 |
| JP | 2015087306 A | 5/2015 |
| JP | 2017508984 A | 3/2017 |
| JP | 2017514499 A | 6/2017 |
| JP | 2017165487 A | 9/2017 |
| JP | 2018511782 A | 4/2018 |
| JP | 6343934 B2 | 6/2018 |
| JP | 2018136246 A | 8/2018 |
| JP | 2018529062 A | 10/2018 |
| JP | 2019505042 A | 2/2019 |
| JP | 2019518974 A | 7/2019 |
| JP | 2019529938 A | 10/2019 |
| JP | 2019536973 A | 12/2019 |
| KR | 20080070015 A | 7/2008 |
| KR | 102368093 B1 | 2/2022 |
| WO | 9216800 A1 | 10/1992 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |
| WO | 2006029110 A1 | 3/2006 |
| WO | 2007024540 A1 | 3/2007 |
| WO | 2007049039 A1 | 5/2007 |
| WO | 2007075253 A2 | 7/2007 |
| WO | 2007092119 A1 | 8/2007 |
| WO | 2008024471 A2 | 2/2008 |
| WO | 2008057150 A1 | 5/2008 |
| WO | 2009004366 A1 | 1/2009 |
| WO | 2009017558 A1 | 2/2009 |
| WO | 2009094071 A3 | 10/2009 |
| WO | 2009120596 A1 | 10/2009 |
| WO | 2009155638 A1 | 12/2009 |
| WO | 2010037166 A1 | 4/2010 |
| WO | 2011069190 A1 | 6/2011 |
| WO | 2012083396 A1 | 6/2012 |
| WO | 2012100281 A1 | 8/2012 |
| WO | 2012033605 A3 | 11/2012 |
| WO | 2012033994 A3 | 12/2012 |
| WO | 2012033992 A3 | 4/2013 |
| WO | 2013053011 A1 | 4/2013 |
| WO | 2010014656 A3 | 5/2013 |
| WO | 2012034037 A3 | 5/2013 |
| WO | 2014001819 A1 | 1/2014 |
| WO | 2014006417 A1 | 1/2014 |
| WO | 2014009729 A1 | 1/2014 |
| WO | 2014114938 A2 | 7/2014 |
| WO | 2014157798 A1 | 10/2014 |
| WO | 2014191757 A1 | 12/2014 |
| WO | 2015073964 A1 | 5/2015 |
| WO | 2015109315 A3 | 10/2015 |
| WO | 2016081755 A1 | 5/2016 |
| WO | 2016120224 A1 | 8/2016 |
| WO | 2016160984 A1 | 10/2016 |
| WO | 2016160986 A3 | 11/2016 |
| WO | 2016200519 A1 | 12/2016 |

(56) References Cited

FOREIGN PATENT DOCUMENTS

| | | | |
|---|---|---|---|
| WO | 2017014999 | A1 | 1/2017 |
| WO | 2017075144 | A1 | 5/2017 |
| WO | 2017109153 | A1 | 6/2017 |
| WO | 2017149468 | A1 | 9/2017 |
| WO | 2017215957 | A1 | 12/2017 |
| WO | 2018000051 | A1 | 1/2018 |
| WO | 2018002287 | A1 | 1/2018 |
| WO | 2018005129 | A1 | 1/2018 |
| WO | 2018025053 | A1 | 2/2018 |
| WO | 2018039727 | A1 | 3/2018 |
| WO | 2018041516 | A1 | 3/2018 |
| WO | 2018097267 | A1 | 5/2018 |
| WO | 2018215588 | A1 | 11/2018 |
| WO | 2019005450 | A1 | 1/2019 |
| WO | 2019182900 | A1 | 9/2019 |
| WO | 2020033578 | A1 | 2/2020 |
| WO | 2020072945 | A1 | 4/2020 |
| WO | 2022155225 | A1 | 7/2022 |

OTHER PUBLICATIONS

Australian Examination Report mailed Feb. 26, 2024, Application No. 2021348066, 8 pages.
Japanese Office Action, dated Mar. 19, 2024, for corresponding Japanese Application No. 2023-519519, 15 pages.
"Abeyance Web App / Stay Connected", Jul. 6, Abeyance Cry Solutions—Abeyateck, LLC, 2021, 3 pages.
"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.
"IVF Witness System: RI Witness TM ART Management System", CooperSurgical Fertility Company 2021, 24 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: ROW Oct. 24, 2018, 12 pages.
"S840 Lab Mover", Large Volume LNS Dry Vapor Shipper, Products Shipping, Jul. 6, Abeyance Cry Solutions—Abeyateck, LLC, 2021, 3 pages.
"Simple, Secure—190° C LN2 Vapor Storage", Products Shipping, Jul. 6, Abeyance Cry Solutions—Abeyateck, LLC, 2021, 7 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017, 11 pages.
CooperSurgical, RI Witness, Order No. CE 60010312 Version 3-ROW: Oct. 24, 2018, 12 pages.
Cryogenic Vials, Standard. Online, published date unknown. Retrieved on Dec. 8, 2021 from URL: https://www.nextdayscience.com/cryogenic-vials-standard.htm.
CX100 Cryo Express Dry Shipper With Shipping Case. Online, published date unknown. Retrieved on May 24, 2022 from URL:https://www.mitegen.com/product/cryo-express-dry-shipper-cx100-with-case, 2 pages.
Extended European Search Report dated Jun. 30, 2022, for European Application No. 19869478.8, 9 pages.
FluidX Tri-Coded Jacket: 0.7ml Sample Storage Tube with External Thread; Brooks Life Sciences; https://bioinventory.biostorage.com, 2019, 7 pages.
HID Beyond Cool: RFID disentangles cryopreservation storage and management, 2015, 4 pages.
Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.

International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
International Search Report and Written Opinion for PCT/US2021/051803, mailed Jan. 12, 2022, 6 pages.
International Search Report and Written Opinion for PCT/US2021/062676, mailed Apr. 1, 2022, 9 pages.
International Search Report and Written Opinion for PCT/US2021/063608, mailed Apr. 12, 2022, 11 pages.
International Search Report and Written Opinion for PCT/US2022/012151, mailed Apr. 29, 2022, 9 pages.
International Search Report and Written Opinion for PCT/US2022/028185, mailed Aug. 26, 2022, 11 pages.
International Search Report and Written Opinion for PCT/US2022/077741, mailed date Feb. 1, 2023, 12 pages.
International Search Report for PCT/US2021/032600, mailed Sep. 3, 2021, 4 pages.
Japanese Office Action for Japanese Patent Application No. 2022-525678, mailed May 29, 2023 (with English Translation) 12 pages.
Japanese Office Action, dated Jun. 6, 2023, for corresponding Japanese Application No. 2022-525679, 16 pages.
Non Final Office Action for U.S. Appl. No. 17/083,179, mailed Sep. 1, 2022, 8 pages.
Non Final Office Action for U.S. Appl. No. 17/321,174, mailed Nov. 22, 2022, 26 pages.
Non-Final Office Action Issued in U.S. Appl. No. 16/840,270, Mailed Sep. 21, 2021, 58 pages.
Notice of Allowance mailed Jan. 4, 2022, for "Cryogenic Vial", U.S. Appl. No. 29/748,815, 9 pages.
Notice of Reasons for Refusal for Japanese Patent Application No. 2021-518707, mailed May 11, 2022, 11 pages.
Notice of Reasons for Rejection, issued in corresponding Japanese Application No. 2021-518707, dated May 11, 2022, 5 pages.
Office Action dated Sep. 3, 2020, for U.S. Appl. No. 16/840,718, 46 pages.
OXO Airtight Pet Food Storage POP Container. Online published date unknown. Retrieved on May 24, 2022 from URL: https://www.walmart.com/ip/oxo-pet-food-storage-pop-container/623284606, 1 page.
Maggiulli, Roberta, et al., "Implementing an electronic witnessing system into a busy IVF clinic—one clinic's experience", Genera Center for Reproductive Medicine, Rome, Italy, 2 pages. J Assist Reprod Genet. 33 (9) :1215-22, Published online Jul. 7, 2016.
Rienzi, Laura, et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.
Swedberg, Claire, "Hitachi Chemical Markets Tiny UHF Tag", https://www.rfidjournal.com/hitachi-chemical-markets-tiny-uhf-tag, Sep. 12, 2010, 4 pages.
Thornhill, A. R, et al., "Measuring human error in the IVF laboratory using an electronic witnessing system", Monduzzi Editoriale, Proceedings, 17th World Congress on Controversies in Obstetrics, Genecology & Infertility (GOGI), Nov. 8-11, 2012 Lisbon, Portugal, 6 pages.
Fontaine, "Automated Visual Tracking for Behavioral Analysis of Biological Model Organisms," Dissertation (Ph.D.), California Institute of Technology, ProQuest Dissertations Publishing (2008), 156 pages.
Notice of Allowance for U.S. Appl. No. 17/321,174, mailed Jul. 12, 2023, 13 pages.
EP Search Report mailed Nov. 7, 2023, in EP App No. 21808453.1, Nov. 11, 2023.
Japanese Office Action for Japanese Patent Application No. 2022-525678, mailed Oct. 12, 2023 (with English Translation) 12 pages.
Japanese Office Action for JP 2022-569516, mailed Nov. 8, 2023, 6 pages (with English Translation).

(56) References Cited

OTHER PUBLICATIONS

Notice of Reasons for Refusal, Japanese Application No. 2023-541871, dated Apr. 24, 2024, 3 pages.
Canadian Office Action, for Canadian Application No. 3,202,347, dated Nov. 7, 2024 4 pages.
Comiso, S. et al., "Biot cryocarrier-standardized cryogenic temperature handling of biospecimens"; Biopreservation and Biobanking 13.3: A15. Mary Ann Liebert Inc. (Jun. 2015) (Year: 2015).
Japanese Notice of Allowance for Application No. 2023-541871 mailed Oct. 8, 2024, 3 pages.
Non Final Office Action for U.S. Appl. No. 18/487,878, mailed Sep. 16, 2024, 25 pages.
Notice of Allowance for U.S. Appl. No. 17/490,274, mailed Jun. 26, 2024, 13 pages.
Notice of Reasons for Refusal. Japanese Application No. 2023-518185, dated Jun. 17, 2024, 8 pages.
Thermo Fisher Scientific Introduces System to Double Cryogenic Storage Capacity; M2 Presswire Oct. 27, 2011: NA (Year: 2011).
Zachman, "High-Resolution Studies of Intact Solid-Liquid Interfaces and Reactive Materials by Cryogenic Electron Microscopy"; Cornell University. ProQuest Dissertations & Theses, 2018. 10845397. (Year: 2018).

\* cited by examiner

PLEASE SELECT WHAT YOU'D LIKE TO WORK ON

STANLEY ▽ | CLIENT | | | | STANLEY ▽ TMRW

| TIME ▽ | PATIENT NAME | IDENTIFICATION NUMBER | DATE OF BIRTH | PROCEDURE |
|---|---|---|---|---|
| ○ 09 MAR 2019–09:30AM | EMELIA BRISTOW | 123-456-789 | 01 MAR 1981 | FET |
| ⦿ 09 MAR 2019–10:30AM | PATIENCE GUMBS | 123-456-789 | 01 MAR 1981 | EGG FREEZE |
| ○ 09 MAR 2019–11:30AM | ELLY HUNDLEY | 123-456-789 | 01 MAR 1981 | EGG FREEZE |
| ○ 09 MAR 2019–11:30AM | ARDELIA KOPP | 123-456-789 | 01 MAR 1981 | EGG FREEZE |
| ○ 09 MAR 2019–11:30AM | LASHAWNA PESINA | 123-456-789 | 01 MAR 1981 | FET |
| ○ 09 MAR 2019–12:00PM | ALANE WEDDINGTON | 123-456-789 | 01 MAR 1981 | SPERM FREEZE |

APPARATUS TO FACILITATE TRANSFER OF BIOLOGICAL SPECIMENS STORED AT CRYOGENIC CONDITIONS

TECHNICAL FIELD

The present disclosure generally relates to apparatus and methods to transfer biological specimens (e.g., eggs, sperm, embryos, other biological tissue) between a cryogenic freezer (e.g., cryogenic storage tank or liquid nitrogen bath), which is typically fixed or stationary, and a portable thermally insulated carrier, and to facilitate identification of stored biological specimens and evidence chain-of-custody during handling.

BACKGROUND

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological specimen or sample (e.g., an oocyte, an embryo, a biopsy) contained in or on a storage device (e.g., a cryopreservation straw, cryopreservation tube, stick or spatula) is rapidly cooled by placing the biological specimen and the storage device in a substance, such as liquid nitrogen. This results in a glass-like solidification or glassy state of the biological specimen (e.g., a glass structure at the molecular level), which maintains the absence of intracellular and extracellular ice (e.g., reducing cell damage and/or death) and, upon thawing, improves post-thaw cell viability. To ensure viability, the vitrified biological specimens must then be continuously stored in a liquid nitrogen dewar or other container containing the liquid nitrogen, which is at a temperature of negative 190 degrees Celsius.

There are, however, a number of concerns in how these biological specimens are being stored, identified, managed, inventoried, retrieved, etc.

For example, each harvested embryo is loaded on a rigid specimen holder (e.g., embryo straw, stick or spatula). In the case of a tubular specimen holder, the tube may be closed (e.g., plugged) at one end and open at the other end. The cryopreservation storage devices (e.g., specimen holders) containing or holding the embryos are cooled as quickly as possible by plunging the cryopreservation storage device with the biological material into a liquid nitrogen bath in a cryogenic freezer at a temperature of approximately negative 190 degrees Celsius, for example to achieve vitrification. More particularly, multiple cryopreservation storage devices are placed in a goblet for placement in the liquid nitrogen storage tank or freezer. The goblet attaches to the liquid nitrogen storage tank such that the multiple cryopreservation storage devices are suspended in the liquid nitrogen. Labels that are manually written-on using a suitable marker pen or printed using a custom printer are attached to the straw and/or the goblet. Such labels can include identification information corresponding to the individual that the embryo was harvested from and other suitable information (e.g., a cryopreservation storage device number, a practitioner number, etc.).

Access to the biological specimens are required during normal operation. For example, a particular biological specimen or specimens may be required to perform a procedure (e.g., implantation of a fertilized egg). Retrieval of cryopreservation storage devices and associated biological specimens from the cryogenic refrigerator or cryogenic tank in which the biological specimens are stored exposes the retrieved biological specimens to non-cryogenic conditions (e.g., temperatures above negative 190° C., and depending on a duration of the exposure places the biological specimens at risk. Due to the way biological specimens are stored (e.g., cryopreservation storage devices arrayed in cassettes, cassettes arrayed in stacks), retrieval of one or more desired biological specimens often requires retrieval of additional biological specimens that are not needed at that time, exposing such to risk. Additionally, transport of biological specimens from a cryogenic refrigerator to a site of an intended use (e.g., fertilization, implantation) exposes the biological specimens to risk.

With regard to storage and management of these biological specimens, facilities employ personnel that are required to maintain the liquid nitrogen storage tanks (e.g., by refilling them with liquid nitrogen when needed) and manage the inventory of stored biological specimens (e.g., by performing periodic accountings). There is, however, little record-keeping with regard to the proper storage of these biological specimens. For example, subsequent identification or otherwise handling of the vitrified biological specimen or sample can involve removal of the specimen from temperature-controlled storage and exposure of the sample to ambient temperature, thus potentially risking the viability of the sample.

BRIEF SUMMARY

Accordingly, it is desirable to provide new apparatus and methods for transferring biological specimens (e.g., eggs, sperm, embryos) between a cryogenic freezer or storage tank that holds a liquid nitrogen bath, which is typically a large, heavy piece of equipment and hence stationary, and a portable thermally insulated carrier. It is also desirable to provide new apparatus and methods to facilitate identification of stored biological specimens or samples and evidence chain-of-custody during handling.

A system and method facilitates transfers of specimen containers (e.g., vials with caps) between storage cassettes and carrier cassettes. The storage cassettes are designed to be stored in cryogenic refrigerators while the carrier cassettes are designed to be temporarily stored in a portable carrier. Identification information is read from wireless transponders carried by the specimen containers. Visual mappings of the positions of the specimen container in the cassettes is provided. Presence and position of the specimen containers in the cassettes is verified, and alerts of inconsistencies provided along with corrective commands. Inventories of specimen container and even specific specimen holders are provided.

A system may be operable to facilitate transfers of specimen containers between positions in storage cassettes and positions in transfer cassettes, the specimen containers marked with wireless transponders. The system may be summarized as comprising: a plurality of antennas spatially arrayed in a two-dimensional array of antennas, the two-dimensional array of antennas having a set of dimensions; at least one radio communicatively coupled to drive the antennas to emit interrogation signals to interrogate the wireless transponders and to receive response signals from any of the wireless transponders in a range of one or more of the antennas; and a processor-based control system communicatively coupled to the at least one radio, the processor-based control system which determines based on response signals received in response to a given interrogation, whether at least one of the wireless transponders is located at an expected position of one of the storage or the transfer cassettes, and in response to a determination that the at least one of the wireless transponders is not located at the expected position of one of the storage or the transfer cassettes causes a signal indicative of an occurrence of an unexpected condition to be provided.

Before the processor-based control system determines whether at least one of the wireless transponders is located at an expected position of one of the storage or the transfer cassettes, the processor-based control system may further cause a prompt to be presented which indicates a position of one of the storage or the transfer cassettes from which to transfer one of the specimen containers along with the wireless transponder associated therewith and a position of the other of the storage or the transfer cassettes to which to transfer the specimen container, the expected position being the position of the other of the storage or the transfer cassettes to which the specimen container is to be transferred.

The processor-based control system may further determine, based on response signals received in response to one or more interrogations, whether there are any specimen containers marked by respective ones of the wireless transponders in an unexpected position in one of the storage or the transfer cassettes, and in response to a determination that there is at least one specimen container marked by respective one of the wireless transponders in an unexpected position in one of the storage or the transfer cassettes, cause a signal indicative of an occurrence of an unexpected condition to be provided.

The processor-based control system may further determine, based on response signals received in response to one or more interrogations, whether there are any specimen containers marked by respective ones of the wireless transponders that are missing from the one of the storage or the transfer cassettes, and in response to a determination that there is at least one specimen containers marked that is missing from the one of the storage or the transfer cassettes, cause a signal indicative of an occurrence of an unexpected condition to be provided. To cause a signal indicative of an occurrence of an unexpected condition to be provided, the processor-based control system may cause a presentation of a signal to be provided that is indicative of the occurrence of the unexpected condition and indicative of at least one of an incorrect location and a correct location for the specimen container in the at least one of the storage or the transfer cassettes.

For each response signal received in response to a given interrogation, the processor-based control system may determine which response signal was returned from one of the wireless transponders that is closest wireless transponder to the antenna that emitted the respective interrogation signal to which the wireless transponders are responding.

To determine which response signal was returned from one of the wireless transponders that is closest wireless transponder to the antenna that emitted the respective interrogation signal to which the wireless transponders are responding, for each response signal received in response to a given interrogation, at least one of the processor-based control system or the at least one radio may normalize a respective received signal strength indicator (RSSI) value that indicates a received signal strength of the response signal to account for any automatic gain adjustment introduced by the at least one radio. To determine which response signal was returned from one of the wireless transponders that is closest wireless transponder to the antenna that emitted the respective interrogation signal to which the wireless transponders are responding, for each interrogation, the processor-based control system determines which of the respective normalized RSSI values for the response signals received in response to a given interrogation has the largest absolute value. To determine which of the respective normalized RSSI values for the response signals received in response to a given interrogation has the largest absolute value for each interrogation, the processor-based control system may compare the respective normalized RSSI values for the received response signals to one another.

To determine which response signal was returned from one of the wireless transponders that is closest wireless transponder to the antenna that emitted the respective interrogation signal to which the wireless transponders are responding, the processor-based control system may further compare a respective read rate to one another for each of the wireless transponders that respond, the respective read rate representative of a total number of times the respective wireless transponder is read per a unit of time. To determine which response signal was returned from one of the wireless transponders that is closest wireless transponder to the antenna that emitted the respective interrogation signal to which the wireless transponders are responding, the processor-based control system may additionally or alternatively further compare a respective response time to one another for each of the wireless transponders that respond, the respective response time representative of an amount of time the respective wireless transponder takes to initially respond to the interrogation.

To cause a signal indicative of an occurrence of an unexpected condition to be provided, the processor-based control system may cause a visual prompt to be presented. To cause a signal indicative of an occurrence of an unexpected condition to be provided, the processor-based control system may cause a signal to be provided to a robot that causes the robot to make a movement.

The wireless transponders and the respective specimen containers may be stored in a cryogenic environment, and the two-dimensional array of antennas is external to the cryogenic environment.

An interrogation system is operable to interrogate wireless transponders physically associated with respective specimen containers, the wireless transponder and the respective specimen containers stored in a cryogenic environment. The interrogation system may be summarized as comprising: a plurality of antennas spatially arrayed in an array of antennas, the array of antennas having a set of one or more dimensions; at least one radio communicatively coupled to drive the antennas to emit interrogation signals to interrogate the wireless transponders in the cryogenic environment and to receive response signals from any of the wireless transponders in a range of one or more of the antennas; and a processor-based control system communicatively coupled to the at least one radio, the processor-based control system which, for each response signal received in response to a given interrogation, determines which response signal was returned from one of the wireless transponders that is closest wireless transponder to the antenna that emitted the respective interrogation signal to which the wireless transponders are responding, and which stores in at least one data structure a mapping that relates an identity of at least one of the wireless transponders and a respective spatial position in an array of positions in a cassette, the array of positions in the cassette have a set of one or more dimensions and the set of one or more dimensions of the array of positions in the cassette is equal to or less than corresponding dimensions of the set of one or more dimensions of the array of antennas.

To determine which response signal was returned from one of the wireless transponders that is closest wireless transponder to the antenna that emitted the respective interrogation signal to which the wireless transponders are responding, for each response signal received in response to a given interrogation, at least one of the processor-based control system or the at least one radio may normalize a respective received signal strength indicator (RSSI) value that indicates a received signal strength of the response signal to account for any automatic gain adjustment introduced by the at least one radio. To determine which response signal was returned from one of the wireless transponders that is closest wireless transponder to the antenna that emitted the respective interrogation signal to which the wireless transponders are responding, for each interrogation, the processor-based control system may determine which of the respective normalized RSSI values for the response signals received in response to a given interrogation has the largest absolute value. To determine which of the respective normalized RSSI values for the response signals received in response to a given interrogation has the largest absolute value for each interrogation, the processor-based control system may compare the respective normalized RSSI values for the received response signals to one another. To determine which response signal was returned from one of the wireless transponders that is closest wireless transponder to the antenna that emitted the respective interrogation signal to which the wireless transponders are responding, the processor-based control system may further compare a respective read rate to one another for each of the wireless transponders that respond, the respective read rate representative of a total number of times the respective wireless transponder is read per a unit of time. To determine which response signal was returned from one of the wireless transponders that is closest wireless transponder to the antenna that emitted the respective interrogation signal to which the wireless transponders are responding, the processor-based control system may further compare a respective response time to one another for each of the wireless transponders that respond, the respective response time representative of an amount of time the respective wireless transponder takes to initially respond to the interrogation.

In at least some implementations, the at least one radio is controlled such that, for each interrogation, the at least one radio drives the antenna during an interrogation period of an interrogation cycle, does not drive the antenna during a decay period and a receive period of the interrogation cycle, and processes response signals received during the receive period and not during the interrogation period or decay period, the decay period sufficiently long to allow resonance of the antenna to decay below a threshold value. The at least one radio may monitor a plurality of antennas for a response to the interrogation signal, for example concurrently or sequentially monitoring the plurality of antennas, or monitoring all antennas except the antenna that most recently emitted the interrogation signal (e.g., carrier wave signal with no encoded information to power a passive RFID transponder). The plurality of antennas may include at least two sets of antennas and the at least one radio concurrently drives one antenna from each of the at least two sets of antennas.

The plurality of antennas may, for example include at least two sets of antennas, the antennas in each set arranged in a respective two-dimensional array, the two-dimensional arrays having respective dimensions, the respective dimensions of each two-dimensional array matching a corresponding respective dimensions of the other two-dimensional arrays, and the at least one radio drives the antennas in the sets sequentially in a defined order through the two-dimensional array. The at least one radio may, for example, drive the antennas in the at least two sets concurrently within one another. The defined order may be selected to maximize a distance between the antennas that are currently driven in each of the sets of antennas concurrently with one another at any given time. The defined order may be selected to fix a distance between the antennas that is currently driven in each of the sets of antennas at any given time.

The plurality of antennas may be spatially arrayed in a two-dimensional array of antennas. For example, the set of dimensions of the array of positions in the cassette may be 4 positions by 4 position and the set of dimensions of the array of antennas is 7 positions by 7 positions. Alternatively, the set of dimensions of the array of positions matches a set of dimensions of the array of antennas. The array of antennas may be external to the cryogenic environment.

The at least one processor-based device may determine whether the wireless transponder that was determined to be the closest wireless transponder to the antenna that emitted the respective interrogation signal is the wireless transponder that is expected at the position of the cassette corresponding to the antenna in the antenna array. In response to the wireless transponder not being at the expected position of the cassette the at least one processor-based device provides a signal indicative of an occurrence of an unexpected condition.

To provide a signal indicative of an occurrence of an unexpected condition the at least one processor-based device may provide a signal that causes a visual prompt to be presented. To provide a signal indicative of an occurrence of an unexpected condition the at least one processor-based device may provide a signal that causes a robot to make a movement. In response to the wireless transponder being at the expected position of the cassette, the at least one processor-based device may store the mapping that relates the identity of the at least one of the wireless transponders and the respective spatial position in the array of positions in the cassette in the at least one data structure. The at least one processor-based device may compares a position of the wireless transponder that was determined to be the closest wireless transponder to the antenna that emitted the respective interrogation signal to a position in a target map.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 15 is a screen print showing a navigation window of a user interface at a second time, used in operation of the transfer system to transfer specimen containers that hold biological specimens between a storage cassette and a carrier cassette, according to at least one implementation.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
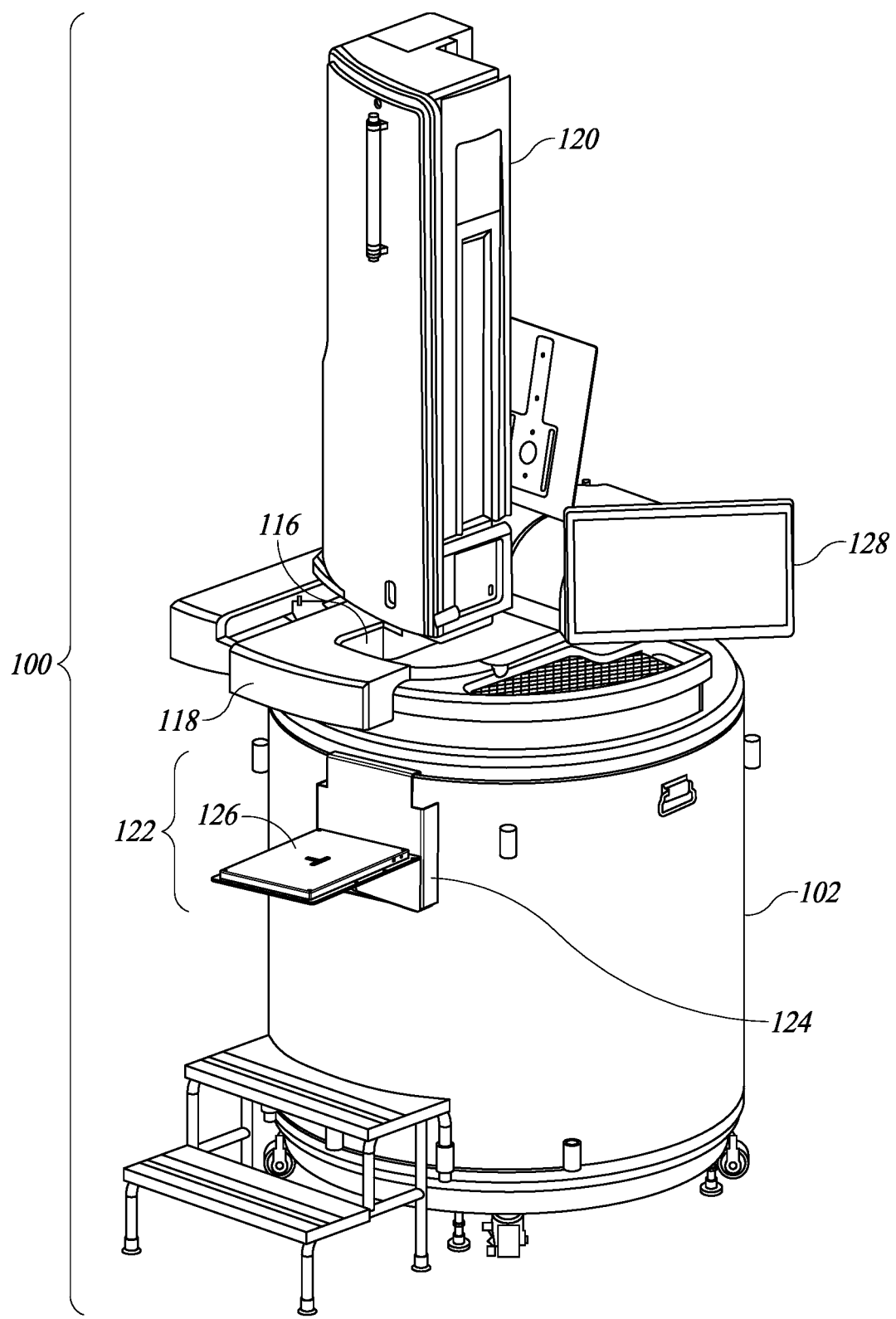
FIG. 1 is an isometric view of a cryogenic storage system, according to at least one illustrated embodiment, the cryogenic storage system including or interfacing with a transfer system to facilitate transfer of biological specimens (e.g., eggs, sperm, embryos) between a cryogenic freezer or storage tank that holds a liquid nitrogen bath and a portable thermally insulated carrier, and/or to facilitate identification of stored biological specimens and evidence chain-of-custody during handling.

FIG. 1 shows a cryogenic storage system 100, according to at least one illustrated embodiment.

The cryogenic storage system 100 may take may of a large variety of forms, typically including cryogenic storage tank or freezer 102 which can store specimen containers in a cryogenic environment, for example immersed in a bath of liquid nitrogen at a temperature at or below about negative 190° C. The cryogenic storage tank or freezer 102 is typically highly thermally insulated, and may include stainless steel interior and exterior walls with a vacuum and/or other thermal insulating material therebetween.

Figure 2:
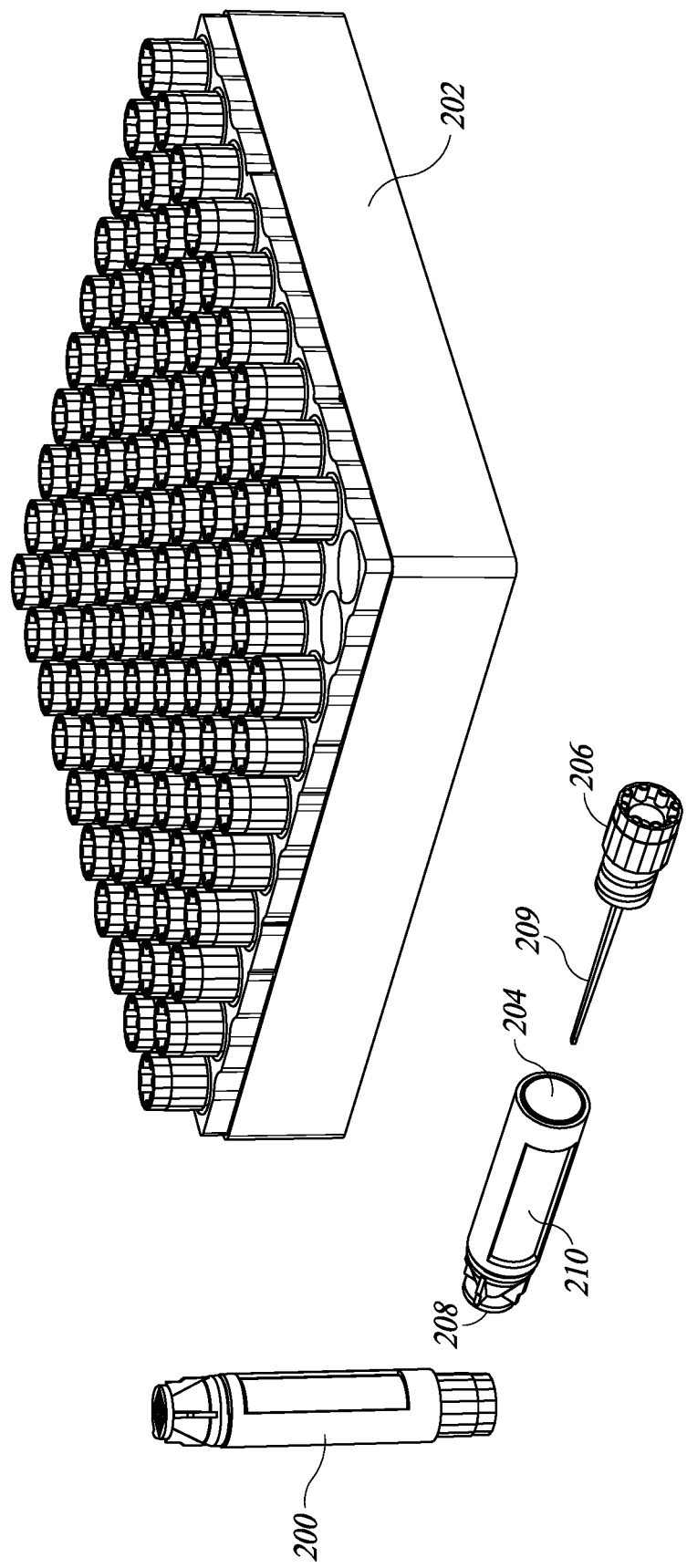
FIG. 2 is an isometric view of a storage cassette holding a plurality of specimen containers, with two of the specimen containers removed from the storage cassette to better illustrate aspects of those storage containers.

As illustrated in FIG. 2, the specimen containers 200 (only one called out) are typically stored in storage cassettes 202 (only one illustrated) for long term storage via a cryogenic refrigerator. Each specimen container 200 may include a vial 204 (only one called out), a cap 206 (only one called out), one or more wireless transponders (e.g., radio frequency identification (RFID) transponders) 208 (only one called out), an elongated specimen holder 209 (e.g., straw, rod, spatula), and optionally one or more machine-readable symbols 210 (only one called out). The specimen containers 200, for example, store specimens of biological tissue, for instance eggs, sperm or embryos. Various implementations of specimen containers are described in U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018.

The specimen containers 200 are typically arrayed in the storage cassette 202, for example arrayed in a two-dimensional array (e.g., 7 by 7, 10 by 10, 8 by 12, 14 by 14). The storage cassettes 202 are typically designed with little thought to use outside of the cryogenic refrigerator since in use, the storage cassettes remain in the cryogenic refrigerator expect for brief periods when removal is needed to retrieve a specimen. Storage cassettes 202 are typically stored in the cryogenic storage tank or freezer 102 in vertical stacks, the vertical stacks also called racks. The stacks or racks of storage cassettes 202 may be annularly arrayed in the cryogenic storage tank or freezer 102 about a central axis of the cryogenic storage tank or freezer 102. The cryogenic storage tank or freezer 102 may include a turntable or convey in the interior thereof, on which the stacks or racks of storage cassettes 202 are carried. This allows respective stacks or racks of storage cassettes 202 to be aligned with an opening 116 of the cryogenic refrigerator for placement or removal.

Returning to FIG. 1, the cryogenic storage tank or freezer 102 includes an opening 116 and a door or cover 118 to selectively open and close the opening 116, to respectively provide access to the interior of the cryogenic storage tank or freezer 102 from an exterior thereof, and to prevent access, as well as hermetically seal the interior from the exterior to maintain the cryogenic temperature in the interior of the cryogenic storage tank or freezer 102. The stacks or racks of storage cassettes 202 may be selectively placed into the interior of the cryogenic storage tank or freezer 102 for storage at cryogenic temperatures and removed from the interior of the cryogenic storage tank or freezer 102 for use via the opening. In some implementations, the stacks or racks of storage cassettes 202 are manually removed from the cryogenic storage tank or freezer 102 when needed, and manually placed in the cryogenic storage tank or freezer 102 to store the specimens in the specimen containers 200 at cryogenic temperatures. In other implementations, the cryogenic storage system 100 includes a picker or elevator 120 to automatically remove selected ones of the stacks or racks of storage cassettes 202 from the cryogenic storage tank or freezer 102 when needed, and to automatically place the storage cassettes 202 with the specimen containers 200 in the cryogenic storage tank or freezer 102 to store the specimens in the specimen containers 200 at cryogenic temperatures. The storage and retrieval mechanism (e.g., turntable, picker or elevator) of the cryogenic storage tank or freezer 102 can automatically replicate movements of a human, and hence is denominated as a robot or robotic system. Whether manually moved or automatically moved, it is typically important to minimize exposure of the specimens to temperatures high than about negative 190° C. (e.g., ambient room temperature or about 23° C.).

A transfer system 122 may facilitate a transfer of specimen containers 200 from the storage cassettes 202 to carrier cassettes and/or to portable thermally insulated cryogenic carriers in which the carrier cassettes are carried. The transfer system 122 may be part of the cryogenic storage system 100, or may be provided as a separate system that interfaces with the cryogenic storage system 100. For example, the transfer system 122 may interface with a conventional commercially available cryogenic automated storage system (e.g., the BROOKS BIOSTORE® III Cryo— from Brooks Life Sciences)).

Figure 3:
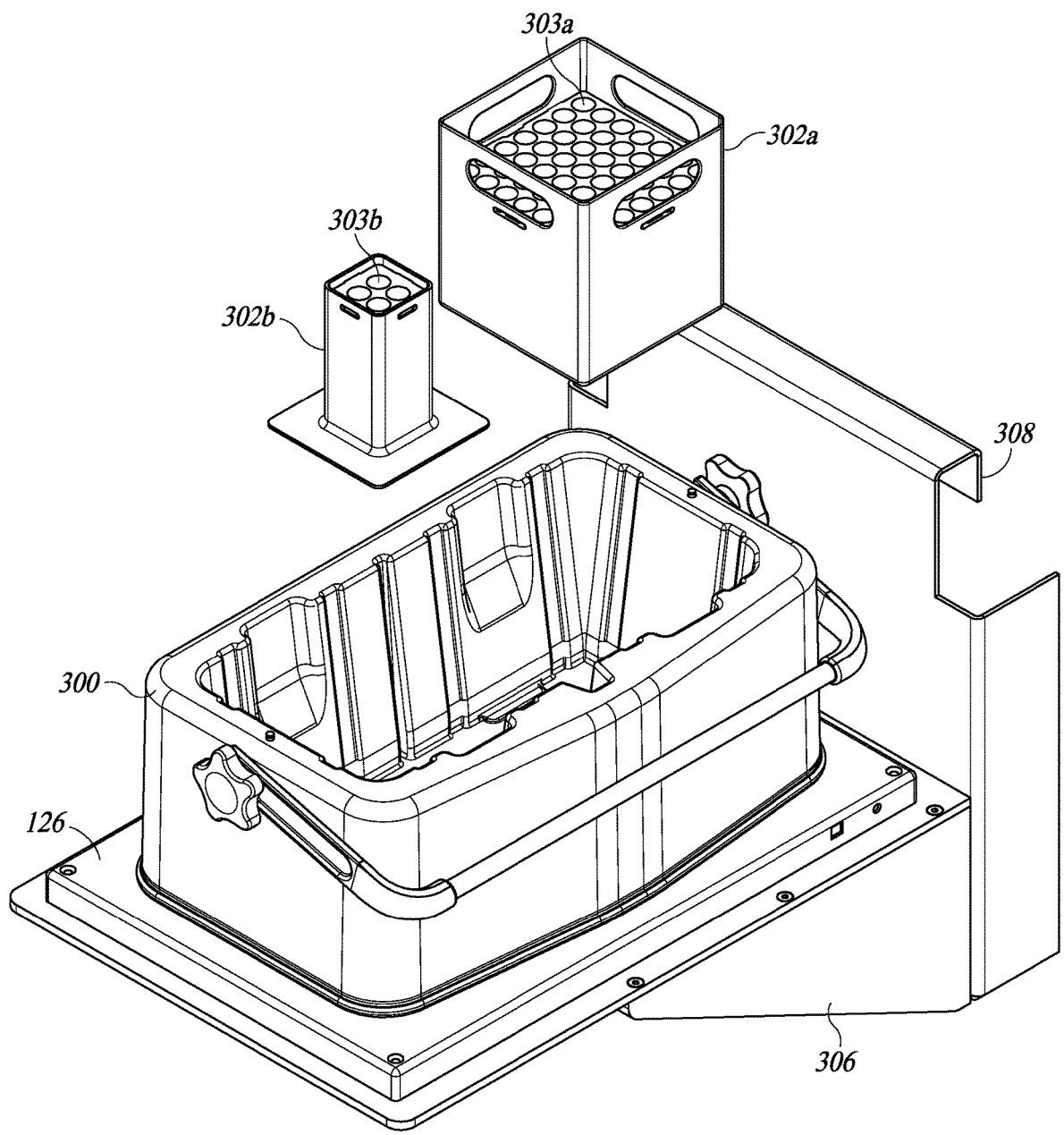
FIG. 3 is an isometric view of a portable thermally insulated cryogenic carrier that carries or holds a number of carrier cassettes positioned with respect to an antenna array of a reader of a transfer system, according to at least one illustrated implementation

The transfer system 122 includes one or more readers 124 (only one shown in FIG. 1) operable to read information from one or more wireless transponders physically associated with respective specimen containers 200, storage cassettes 202, and/or carrier cassettes 302 (FIG. 3). As explained in detail herein, the readers 124 may include one or more antennas, for example a two-dimensional array of antennas 126, and one or more transmitters, receivers, transceivers (collectively radios), operable to cause the antennas to emit interrogation signals and to receive response signals in response to the interrogations signals. The reader(s) 124 may take the form of an RFID reader or interrogator. The transfer system 122 may include one or more dedicated user interface components (e.g., touch screen display, speakers, microphones), or may employ a user interface component of the cryogenic storage system 100, for example a touch screen display 128.

Portions of the cryogenic system 100 may be of a conventional design. For example, the cryogenic storage tank or freezer and/or the picker or elevator may take the form of a commercially available automated storage system (e.g., the Bistore III Cryo −190° C. System sold by Brooks Life Sciences). Some, or even all, of the cryogenic system 100 may include structures and methods for described herein, and thus are not known by the applicant to be either conventional or commercially available. For example, the transfer system 122 including the reader 124 is operable to work with a portable thermally insulated cryogenic carrier 300 (FIG. 3, described below), and to facilitate transfer of specimen containers 200 between a storage cassette 202 and carrier cassettes 302*a*, 302*b* (FIG. 3, described below, collectively 302) held by the portable thermally insulated cryogenic carrier 300 are not conventional or commercially available. Also for example, the transfer system 122 may include a co-robot 405 (FIG. 4, described below) to facilitate transfer between storage cassettes 202 retrieved via the picker or elevator 120 and carrier cassettes 302 held by the portable thermally insulated cryogenic carrier 300 are not known by the applicant to be either conventional or commercially available.

FIG. 3 shows a portable thermally insulated cryogenic carrier 300 that carries or holds a number of carrier cassettes 302*a*, 302*b* (two illustrated) positioned with respect to an antenna array 126 of the reader 124 of the transfer system 122, according to at least one illustrated implementation.

The portable thermally insulated cryogenic carrier 300 is shown without a cover, and with the carrier cassettes 302*a*, 302*b* removed to better illustrate various features. In use, the portable thermally insulated cryogenic carrier 300 would hold a liquid nitrogen bath in the interior thereof, and the carrier cassettes 302*a*, 302*b* would be positioned at least partially immersed in the liquid nitrogen bath in the interior of the portable thermally insulated cryogenic carrier 300, with a cover positioned to close the opening at the top of the portable thermally insulated cryogenic carrier 300.

The carrier cassettes 302*a*, 302*b* may each include a number of positions 303*a*, 303*b* (only one called out for each carrier cassette 302, 302*b*) to at least partially receive respective specimen containers thereby (e.g., receptacles, holders, wells), which may be laid out in a two-dimensional array. The carrier cassettes 302*a*, 302*b* may include certain features to thermally protect biological specimens held on specimen holders, which are located in specimen containers 200, which are in turn held at various positions 304*a*, 304*b* (only one called out for each carrier cassette to prevent clutter in the drawing) carrier cassettes 302*a*, 302*b*. For example, each carrier cassette 302*a*, 302*b* can comprise a thermal shunt, including a thermally conductive block of material (e.g., aluminum) and an aerogel, with or without a plastic sleeve. Suitable carrier cassettes 302*a*, 302*b* are described, for example in U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018. The carrier cassettes 302*a*, 302*b* are thus different in designed than the storage cassettes 202 (FIG. 2) since the storage cassettes 202 are designed to be stored in the cryogenic storage tank or freezer 102, and thus do not need added features to prolong cryogenic conditions.

The antenna array 126 and/or the reader 124 may be supported by a platform or frame 306. The platform or frame 306 may have a lip 308 that allows the platform or frame 306 to be hung from a structure (e.g., edge, handle) of the cryogenic storage tank or freezer 102, advantageously allowing the antenna array 126 and/or the reader 124 to be positioned proximate the cryogenic storage tank or freezer 102 to facilitate transfers between. This also advantageously allows simplified retrofit of the processor-based transfer system 122 to the cryogenic storage tank or freezer 102. Less advantageously, the platform or frame 306 may be secured to the cryogenic storage tank or freezer 102 via other structures, for example fastened there to via fasteners (e.g., bolts, screws, rivets), adhered thereto by adhesive or epoxy, or soldered thereto via a solder joint.

Figure 4:
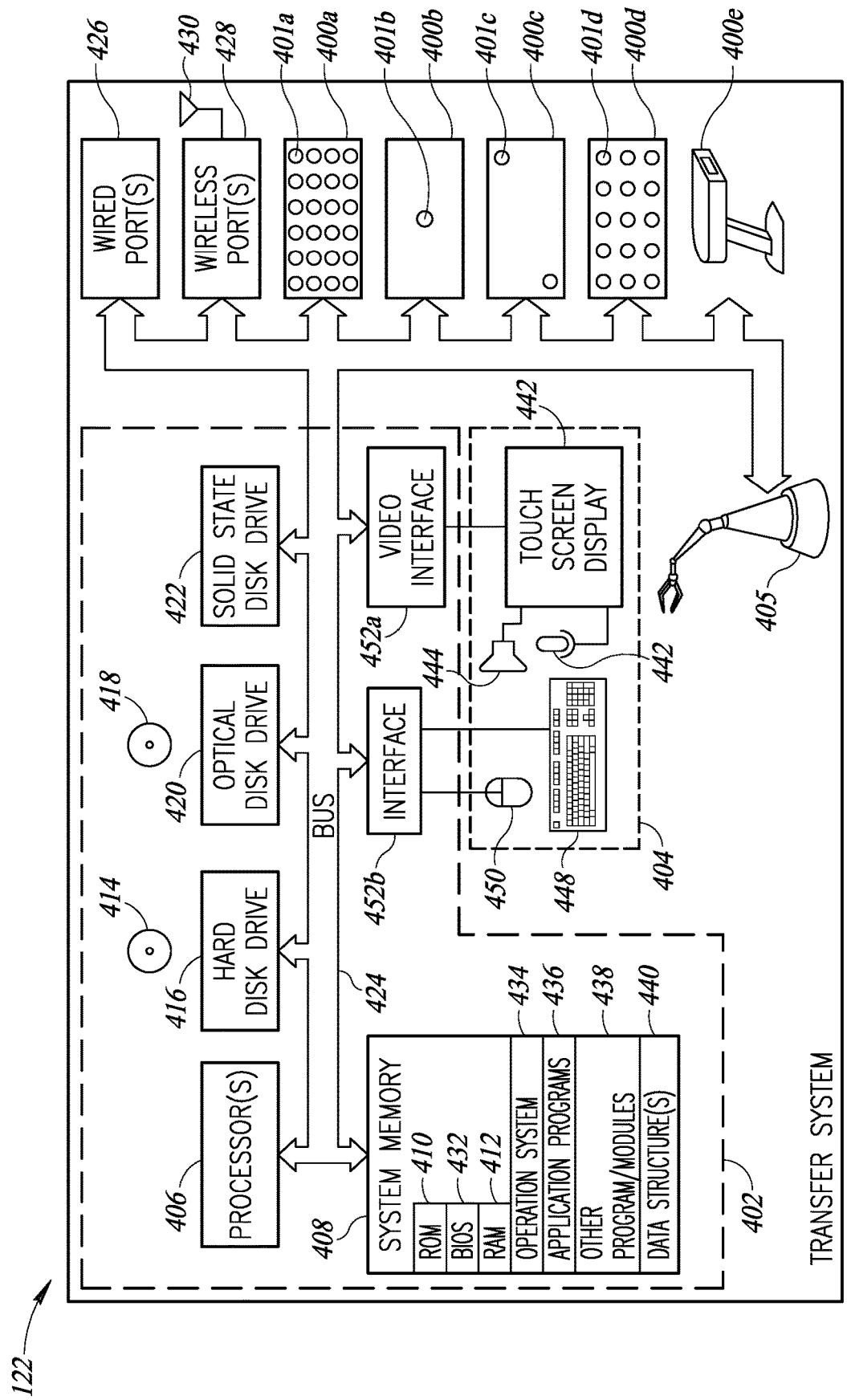
FIG. 4 is an isometric view of a processor-based transfer system, according to at least one implementation.

FIG. 4 shows a processor-based transfer system 122 of, or that interfaces with, the cryogenic system 100 of FIG. 1. The processor-based transfer system 122 facilitates transfers, whether automated or manual, of specimen containers 200 (FIG. 2) between storage cassettes 202 (FIG. 2) and carrier cassettes 302 (FIG. 3). The storage cassettes 202 are designed for long term storage in cryogenic refrigerators (e.g., tanks or dewars), which are typically large and heavy fixtures. The carrier cassettes 302 are designed for temporary storage, in a format that is portable. Examples of suitable carrier cassettes 302, and of portable thermally insulated cryogenic carriers 300 that carry the carrier cassettes 302 and which can temporarily maintain cryogenic materials at cryogenic temperatures, as wells as specimen containers 200 for use therewith, are described in U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018.

The processor-based transfer system 122 includes one or more readers 400a-400e (five shown, collectively 400), a control subsystem 402, and a user interface system 404. The processor-based transfer system 122 optionally includes one or more robots, for example one or more co-robots 405 (only one shown) that interface with the picker or elevator 120 (FIG. 1) of the cryogenic storage system 100.

The readers 400 may take any of a variety of forms. For example, the processor-based transfer system 122 includes one or more readers 400a-400d that wireless read information stored in wireless transponders 208 (FIG. 2) physically associated with the specimen containers 200 (FIG. 2) and/or transfer cassettes 202 (FIG. 2) and/or carrier cassettes 302 (FIG. 3). Such readers 400a-400d each include one or more transmitters, receivers or transceivers, collectively and individually referred to herein as radios. Such readers 400 each include one or more antenna 401a-401d (only one antenna called out for each, to prevent clutter of drawing) communicatively coupled to the respective radios, and operable to emit wireless signals (e.g., interrogation signals) and/or to receive wireless signals (e.g., response signals) returned from the wireless transponders 208 (FIG. 2). The wireless signals are typically in the radio or microwave frequency bands of the electromagnetic spectrum.

Also for example, one or more readers 400e (i.e., machine-readable symbol reader or scanner) may optically read information stored or encoded in one or more machine-readable symbols 210 (FIG. 2) (e.g., one-dimensional or barcode symbols, two-dimensional or area code symbols) carried by, printed on, or inscribed in the specimen containers 200 (FIG. 2), transfer cassettes 202 (FIG. 2), and/or carrier cassettes 302 (FIG. 3).

The readers 400a-400e may each include one or more processors, for example, one or more of: one or more microcontrollers, one or more microprocessors, one or more central processing units, one or more digital signal processors (DSPs), one or more graphics processing units (GPUs), one or more application specific integrated circuits (ASICs), one or more field programmable gate arrays (FPGAs), and/or one or more programmable logic controllers (PLCs). The readers 400a-400e may each include one or more nontransitory storage media, for example, one or more nonvolatile storage media and/or one or more volatile storage media, for example one or more of: one or more read only memories (ROMs), one or more random access memories (RAMs), one or more FLASH memory, one or more magnetic disk drives, one or more optical disk drives, one or more solid state drives, one or more cache memories, and/or one or more registers of one or more processors.

In some implementations, the processor-based transfer system 122 includes: a mapping or box reader 400a and associated antenna(s) 401a, a signal specimen container reader 400b and associated antenna(s) 401b, a cassette identification reader 400c and associated antenna(s) 401c, and a bulk reader 400d and associated antenna 401d. The mapping or box reader 400a may include a two-dimensional array of antennas 401a and allows the scanning of a two-dimensional array of positions, which can be used to query or audit the contents of a carrier cassette 302 or even a storage cassette 202. The mapping or box reader 400a and associated array of antennas 401a may, for example, be the reader 124 (FIG. 1) and antenna array 126 of the transfer system 122. The antenna array 126 may, for example, be formed or carried on one side of a printed circuit board, while various electrical or electronic components (e.g., inductors, resistors, capacitors) may be carried on the other side if the printed circuit board, thereby providing a substantially flat planner surface that faces the specimen containers during use, and minimizing a distance therebetween (e.g., less than or equal to 2 mm). The signal specimen container reader 400b may be fixed or more preferably handheld, and is operable to read information from wireless transponders 208 (FIG. 2) of individual specimen containers 200, for example when the specimen container 200 is removed from one of the carrier or storage cassettes, 302, 202, respectively. The antenna(s) 401c of the cassette identification reader 400c are positioned to read cassette identifiers from wireless transponders 208 physically associated with (e.g., attached or fix to or on) the carrier or storage cassettes, 302, 202, respectively, for example when the carrier or storage cassettes 302, 202, respectively, are positioned at one or more stations (e.g., positioned on or at the antenna array 126 (FIG. 1) of the reader 124 of the transfer system 122). The bulk reader 400d may, for example be a handheld, and is operable to read information from respective wireless transponders 208 (FIG. 2) of all of the specimen containers 200 held by one of the carrier or storage cassettes, 302, 202, respectively.

The control subsystem 402 may include one or more processors 406, for example, one or more of: one or more microcontrollers, one or more microprocessors, one or more central processing units, one or more digital signal processors (DSPs), one or more graphics processing units (GPUs), one or more application specific integrated circuits (ASICs), one or more field programmable gate arrays (FPGAs), and/or one or more programmable logic controllers (PLCs). The control subsystem 402 may include one or more nontransitory storage media, for example, one or more nonvolatile storage media and/or one or more volatile storage media, for example a system memory 408 that includes one or more of: one or more read only memories (ROMs) 410, one or more random access memories (RAMs) 412, one or more FLASH memory, one or more magnetic disk 414 and associated drives 416, one or more optical disk drives 418 and associated drives 420, one or more solid state drives 422, one or more cache memories, and/or one or more registers of one or more processors 406. The control subsystem 402 may include one or more communications channels 424 (e.g., buses) that communicatively couple the processor(s) with the storage media. The control subsystem 402 may include one or more communications ports, for example one or more wired communications ports 426, wireless communications ports 428 (e.g., Wi-Fi and/or Bluetooth radios and associated antennas 430; infrared transceivers) that provide for communications between the control subsystem 402 and external devices (e.g., dedicated control system of conventional cryogenic refrigerator system with, or without picker or elevator 120 (FIG. 1)).

The processor(s) 406 of the control subsystem 402 are operable to execute logic, for example to execute one or more algorithms stored as process-executable instructions by the one or more nontransitory storage media. Suitable algorithms are set out herein. Process-executable instructions may, for example, include a basic input/output operating system (BIOS) 432, for example stored in ROM 410. Process-executable instructions may, for example, include an operating system (OS) 434, for example stored in RAM 412 during execution. Process-executable instructions may, for example, include one or more application programs 436, which provide the logic to collect user information, map transfers between storage and carrier cassettes, verify that the specimen containers are at the correct positions in the carrier or storage cassettes, and establish evidence of a chain-of-custody for the same, the applications program(s) stored, for example, in RAM 412 during operation. Process-executable instructions may include one or more other programs or modules 438, for example to provide for communications with external devices and/or to control operation of co-robot(s) 405, and which may be stored, for example, in RAM 412 during execution. One or more data structures 440 may store information, for example information that identifies specific users, identifies specific clinicians, identifies specific patients, identifies specific procedures, identifies specific specimen containers and associates the specific specimen containers with specific patients, and that maps specimen containers to respective storage cassettes and/or carrier cassettes. The data structures 440 may take a variety of forms including databases, data sets, records and fields, tables, linked lists, trees, binary trees, etc. The data structures 440 may be stored, for example, in RAM 412 during execution.

The processor(s) 406 of the control subsystem 402 are communicatively coupled operable (e.g., wired, optical, wireless or radio) to receive information from the readers 400a-400e, and optionally to control operation of one or more of the readers 400a-400e. The processor(s) 406 of the control subsystem 402 are also operable to receive user input from, and provide user out to, one or more user interface devices of the user interface system 404, to allow a human user to interact with the processor-based transfer system 122.

The user interface system 404 may, for example, include one or more of: one or more display screens, one or more touch-sensitive display screens 442, one or more speakers 444, one or more microphones 446, one or more keyboards 448, one or more pointer devices 450 (e.g., computer mouse, trackpad, trackball), one or more haptic interfaces. The user interfaces 406 are communicatively coupled (e.g., wired, optical, wireless or radio) with the processor(s) via one or more peripheral interfaces 452a, 452b to provide user input to the processor(s) 406 and to receive output from the processor(s) 406 to be presented to a user. In particular, the processor(s) 406 may execute processor-executable instructions that cause the processor(s) to cause devices to present a user interface (e.g., a graphical user interface), for instance via a touch screen display 442. Various user interface elements are illustrated and described herein.

In at least some implementations, the cryogenic storage system 100 may be designed to operate with existing lab equipment, for example with conventional specimen containers (e.g., FluidX™ 24-Format tubes, FluidX™ 48-Format tubes FluidX™ 96-Format tubes available from Brooks Life Sciences) or with plates or racks (e.g., 5¼ inch by 5¼ inch plates or wells, Vision Plate™ 96 Well plate, Vision Plate™ 24 Well plate, 10×10 Cryo Rack rack, 14×14 Cryo Rack rack available from Brooks Life Sciences). Designing the cryogenic storage system 100 to operate with existing lab equipment places a number of constraints on the structure as well as the operation. For example, a two-dimensional array of antennas must be designed to successfully interrogate RFID transponders array in the various available formats. This can place limits on the size (e.g., coil size) of the antennas used to interrogate and received response signals from RFID transponders. Smaller antennas typically reduce the range, which may require higher transmit power to compensate for the loss of range. This may be particularly true where the antennas of the wireless transponders are subject to extremely cold temperatures, for instance when the wireless transponders are immersed in a liquid nitrogen bath, while antennas of a reader are at room temperature. Also, relatively close spacing dictated by conventional equipment formats can increase the amount of cross-talk during interrogation, where an interrogation signal from one antenna excites and elicits response signals from more than one wireless transponder. Cross-talk may also increase with increasing transmit power, for instance where antenna size must be small, for instance to accommodate a spacing dictated by conventional spatial formats. The user of existing wireless transponders and readers (e.g., RFID interrogators or RFID readers) can also require specific accommodations to be made in structure and/or operation. For example, RFID readers typically employ automatic gain control.

The cryogenic storage system 100 comprise: a plurality of antennas spatially arrayed in a two-dimensional array of antennas, the two-dimensional array of antennas having a set of dimensions or orders (e.g., 2×2, 3×3, 5×5, 4×6, 7×7, 9×9, 8×12). One or more radios are communicatively coupled to drive the antennas to emit interrogation signals to interrogate the wireless transponders and to receive response signals from any of the wireless transponders in a range of one or more of the antennas. There may for example be a single radio which is multiplexed to the various antennas. Alternatively, there may be one radio per antenna. Alternatively, the antennas may be grouped into sets, for instance four sets, and one radio per set, multiplexed to the antennas of the respective sets. In some instances the radios are transmitters, in some the radios are receivers, and in yet other instances the radios are transceivers. A processor-based control system is communicatively coupled to the radio(s). The processor-based control system determines, based on response signals received in response to a given interrogation, whether at least one of the wireless transponders is located at an expected position of one of the storage or the transfer cassettes. In response to a determination that the at least one of the wireless transponders is not located at the expected position of one of the storage or the transfer cassettes the processor-based control system causes a signal indicative of an occurrence of an unexpected condition to be provided. To cause a signal indicative of an occurrence of an unexpected condition to be provided, the processor-based control system may cause a visual prompt to be presented and/or cause a signal to be provided to a robot that causes the robot to make a movement.

For each response signal received in response to a given interrogation, the processor-based control system may determine which response signal was returned from one of the wireless transponders that is closest wireless transponder to the antenna that emitted the respective interrogation signal to which the wireless transponders are responding. For example, for each response signal received in response to a given interrogation, at least one of the processor-based control system or the at least one radio may normalize a respective received signal strength indicator (RSSI) value that indicates a received signal strength of the response signal to account for any automatic gain adjustment introduced by the at least one radio. For instance, for each interrogation, the processor-based control system determines which of the respective normalized RSSI values for the response signals received in response to a given interrogation has the largest absolute value. To determine which of the respective normalized RSSI values for the response signals received in response to a given interrogation has the largest absolute value for each interrogation, the processor-based control system may compare the respective normalized RSSI values for the received response signals to one another.

To determine which response signal was returned from one of the wireless transponders that is closest wireless transponder to the antenna that emitted the respective interrogation signal to which the wireless transponders are responding, the processor-based control system may further compare a respective read rate to one another for each of the wireless transponders that respond, the respective read rate representative of a total number of times the respective wireless transponder is read per a unit of time. To determine which response signal was returned from one of the wireless transponders that is closest wireless transponder to the antenna that emitted the respective interrogation signal to which the wireless transponders are responding, the processor-based control system may additionally or alternatively further compare a respective response time to one another for each of the wireless transponders that respond, the respective response time representative of an amount of time the respective wireless transponder takes to initially respond to the interrogation.

Before the processor-based control system determines whether at least one of the wireless transponders is located at an expected position of one of the storage or the transfer cassettes, the processor-based control system may further cause a prompt to be presented which indicates a position of one of the storage or the transfer cassettes from which to transfer one of the specimen containers along with the wireless transponder associated therewith and a position of the other of the storage or the transfer cassettes to which to transfer the specimen container, the expected position being the position of the other of the storage or the transfer cassettes to which the specimen container is to be transferred.

The processor-based control system may further determine, based on response signals received in response to one or more interrogations, whether there are any specimen containers marked by respective ones of the wireless transponders in an unexpected position in one of the storage or the transfer cassettes, and in response to a determination that there is at least one specimen container marked by respective one of the wireless transponders in an unexpected position in one of the storage or the transfer cassettes, cause a signal indicative of an occurrence of an unexpected condition to be provided.

The processor-based control system may further determine, based on response signals received in response to one or more interrogations, whether there are any specimen containers marked by respective ones of the wireless transponders that are missing from the one of the storage or the transfer cassettes, and in response to a determination that there is at least one specimen containers marked that is missing from the one of the storage or the transfer cassettes, cause a signal indicative of an occurrence of an unexpected condition to be provided. To cause a signal indicative of an occurrence of an unexpected condition to be provided, the processor-based control system may cause a presentation of a signal to be provided that is indicative of the occurrence of the unexpected condition and indicative of at least one of an incorrect location and a correct location for the specimen container in the at least one of the storage or the transfer cassettes.

Additionally, speed is typically important to commercial operation. To increase speed, antennas may be grouped into a plurality of sets, the sets which are operated in parallel with one another. For example, a two-dimensional array of antennas 96 antennas, arranged as a 8×12 array, may be grouped to four sets denominated A, B, C D, and corresponding to four quadrants of the two-dimensional array (e.g., sets A, B, C D arranged clockwise starting with A in an upper left quadrant). The position in each quadrant may be represented by a pair of integers representing a row and column. In operation, a first antenna 1,1 of a first set A, a first antenna 1,1 of a second set B, a first antenna 1,1 of a third set C, and a first antenna 1,1 of a fourth set D, may be operated to concurrently transmit respective interrogation signals (e.g., carrier waves) during a first interrogation cycle. The other antennas of the first set A, second set B, third set C, and fourth set D may be monitored for response signals as part of the first interrogation cycle. Subsequently, a second antenna 1,2 of the first set A, a second antenna 1,2 of the second set B, the second antenna 1,2 of a third set C, and the second antenna 1,2 of the fourth set D, may be operated to concurrently transmit respective interrogation signals (e.g., carrier waves) during a second interrogation cycle. The other antennas of the first set A, second set B, third set C, and fourth set D may be monitored for response signals as part of the second interrogation cycle. Subsequent interrogation cycles may cycle through the remaining antennas of the sets, operating one of the antennas from each set to transmit interrogations currently with one another. In some implementations, operation may result in there being a fixed distance between the transmitting antennas of any two sets. For instance, during any given interrogation cycle the transmitting antenna in one set may be in the same relative position within its own set as the relative position of the other transmitting antennas in the other sets. This is similar to the operation described above, where the row/column pair of the transmitting antenna of each set match one another during each interrogation cycle. Alternatively, operation may result in there being a maximum achievable distance between the concurrently transmitting antennas during any given interrogation cycle. For instance, a first antenna 1,1 of a first set A, a sixth antenna 1,6 of a second set B, a nineteenth antenna 4, 1 of a third set C, and a twenty-fourth antenna 4,6 of a fourth set D, may be operated to concurrently transmit respective interrogation signals (e.g., carrier waves) in a first interrogation cycle. Thus, during the first interrogation cycle antennas at the opposite four corners of the two-dimensional array concurrently transmit interrogation signals. During subsequent interrogation cycles, the antennas in each set A, B, C, D may be stepped through in an order that matches one another, for example transmitting interrogation signals from antennas successively along a row, then successively from a next row, etc.

While four sets are described, any number of sets of antennas may be employed. While two patterns of antenna activation are described, other patterns may be employed. Also, while generally described as employing all antennas to monitor for a response signal except the antenna that most recently emitted the interrogation signal, other approaches may be employed. For example, all antennas may be monitored, including the antenna that most recently emitted the interrogation signal. In such implementations, delay will typically be employed to allow resonance in the transmitting antenna to decay sufficiently as to allow detection of a response signal. Alternatively, only a select one or select ones of the antennas may be employed to monitor for response signals. For instance, in some implementation, only the antenna that most recently transmitted the interrogation signal is monitored for a receipt of a response signal, typically after a delay time.

Figure 5A:
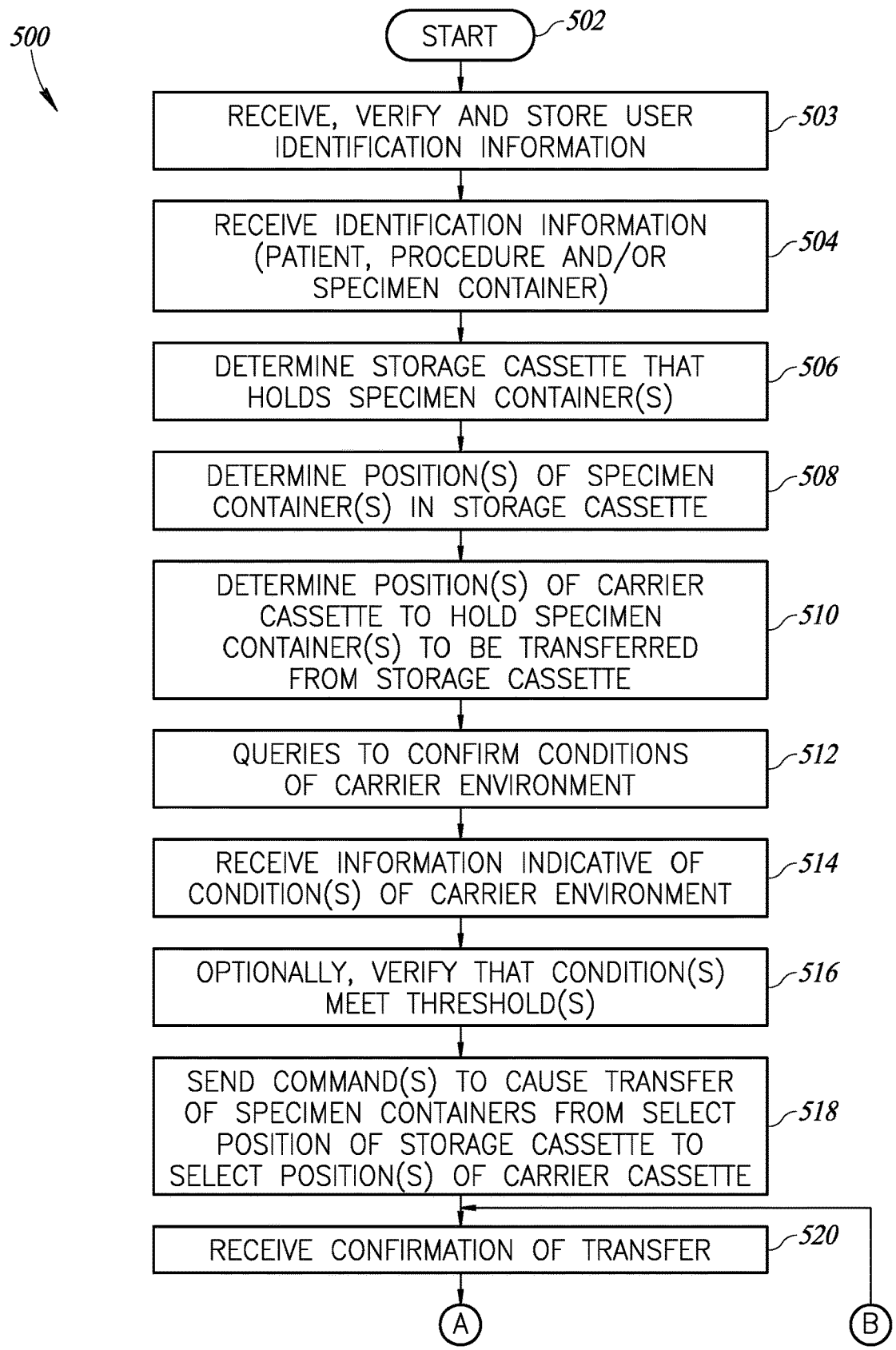
FIGS. 5A and 5B are a flow diagram showing a method of operation in a transfer system to transfer specimen containers that hold biological specimens from positions in a storage cassette, which can be stored in a cryogenic refrigerator, to positions in a carrier cassette, which can be stored in a portable thermally insulated carrier, according to at least one implementation.
Figure 5B:
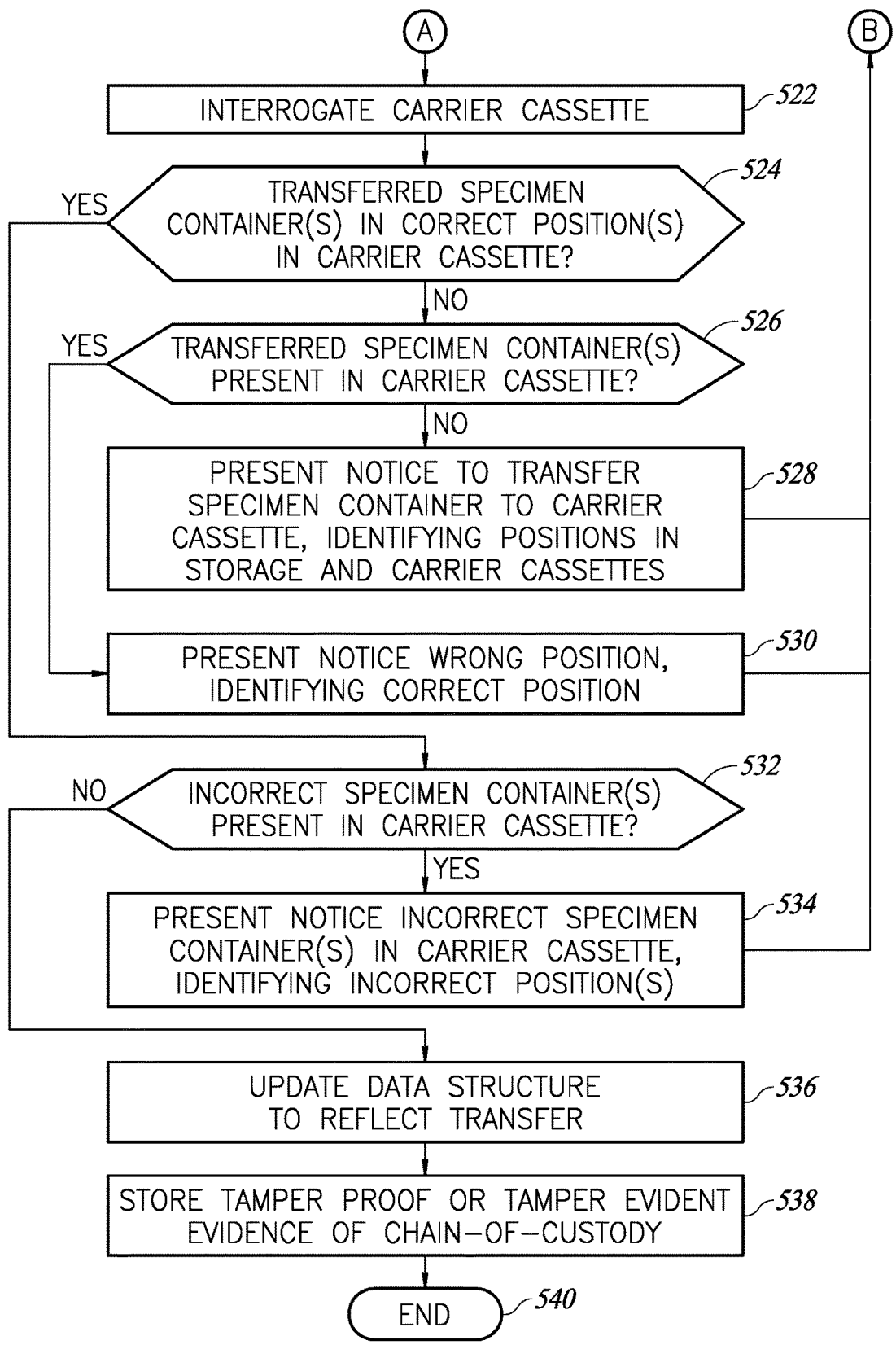

FIGS. 5A and 5B show a method 500 of operation to transfer specimen containers 200 (FIG. 2) from a storage cassette 202 (FIG. 2) which can be stored in a cryogenic freezer 102 to a carrier cassette 302 (FIG. 3) which can be stored in a portable thermally insulated cryogenic carrier 300 (FIG. 3), according to at least one illustrated implementation.

The method 500 starts at 502. For example, the method may start in response to a powering on of the processor-based transfer system 122 or a component thereof, in response to detection of a carrier cassette at a reader, receipt of a user input, or a call from a calling routine or program.

At 503, the processor-based transfer system 122 receives, verifies and stores user identification information. The user identification information may take a variety of forms, for example a user identifier, a password or passphrase, and/or biometric data (e.g., digital fingerprint, digital iris scan, facial features).

At 504, the processor-based transfer system 122 receives identification information. The identification information may, for example, be received as user input via a user interface, or as an electronic transfer of information from another system, for instance from a clinical procedure management processor-based system. The identification information may, for example, include a patient name, unique patient identifier, patient data of birth, procedure type or unique procedure identifier, specimen container identifier, and/or specimen identifier.

At 506, the processor-based transfer system 122 determines which storage cassette that holds the one or more specimen containers to be retrieved. For example, one or more specimen containers may hold biological specimens or tissue to be used in a given procedure on a given patient. The processor-based transfer system may, for example, query a data structure using the identification information.

At 508, the processor-based transfer system 122 determines one or more positions of the identified specimen containers in storage cassette. The processor-based transfer system may, for example, query a data structure using the identification information.

At 510, the processor-based transfer system 122 determines position(s) of carrier cassette to hold specimen container(s) transferred from the storage cassette. The processor-based transfer system may, for example, query a data structure using the identification information.

At 512, the processor-based transfer system 122 causes a presentation of queries to confirm conditions of carrier environment. Queries may be presented visually or aurally via a user interface. Queries may include a request that the user confirm that a carrier is ready, that there is adequate fluid (e.g., liquid nitrogen) in the carrier, and that the fluid is adequately cold (e.g., at or below approximate 190° C.).

At 514, the processor-based transfer system 122 receives information indicative of condition(s) of carrier environment. The information may, for example, be received via a user interface.

Optionally at 516, the processor-based transfer system 122 verifies that one or more conditions meet one or more thresholds. For example, a user may enter a fluid level and/or a temperature of the fluid, which can be compared to a threshold level and/or threshold temperature.

At 518, the processor-based transfer system 122 sends one or more commands to cause transfer of specimen containers from select position of the storage cassette to select position (s) of the carrier cassette. In the case of manual transfers, the commands may be presented to a user as prompts via the user interface. In the case of automated transfers, the commands can be in the form of a motion plan for execution by a robot or other mechanical conveyance.

At 520, the processor-based transfer system 122 receives a confirmation of transfer. Confirmation may be received from a user via a user interface. Alternatively, confirmation may come from a processor-based system, for example a robot, indicating that a series of operations have been completed.

At 522, the processor-based transfer system 122 interrogates the carrier cassette. For example, a reader may sequentially interrogate each position in the carrier cassette, determining which positions have a wireless transponder tagged specimen container, and even the identity of each specimen container at each position that has a specimen container. Such may, for example, be implemented via an RFID reader or interrogator, with a two-dimensional array of antennas which are arranged to be in registration with respective positions of the carrier cassette.

At 524, the processor-based transfer system 122 determines whether the transferred specimen container(s) are in correct the position(s) in carrier cassette. The processor-based transfer system 122 can query a data structure to determine, for each position of the carrier cassette that is supposed to have a specimen container, the identity of the specimen container that is supposed to be at that position. The processor-based transfer system 122 compares the actual mapping, as determined via interrogation, with the intended mapping, to verify that each specimen container is in the correct position, to identify specimen containers in incorrect positions, to identify missing specimen containers and/or specimen containers that should not be in the carrier cassette, as described below.

If it is determined at 524 that the transferred specimen container(s) are not in correct position(s) in carrier cassette, then the processor-based transfer system 122 attempts to determine what specific errors have occurred. For example, at 526 the processor-based transfer system 122 determines whether the transferred specimen container(s) are present in carrier cassette. If it is determined at 526 that the transferred specimen container(s) are not present in carrier cassette, then at 528 the processor-based transfer system 122 causes a user interface to present a prompt to transfer the specimen container from the storage cassette to carrier cassette, identifying the specific positions in storage and carrier cassettes, and control returns to 520 to await receipt of a confirmation that the transfer has been completed. Alternatively, the processor-based transfer system 122 provides instructions to a robot to implement the transfer of the specimen container (s). If it is determined at 526 that the transferred specimen container(s) is (are) present in carrier cassette, then at 530 the processor-based system 122 causes the user interface to present a notification or prompt to move the specimen container(s) to the correct position(s) in the carrier cassette, including an identification of the position from which the specimen container should be moved from and the position to which the specimen container should be moved. Control then returns to await receipt of a confirmation that the transfer has been completed at 520.

If it is determined at 524 that the transferred specimen container(s) are in correct position(s) in carrier cassette, then optionally at 532 the processor-based transfer system 122 determines whether there are any incorrect specimen container(s) present in carrier cassette. If it is determined at 532 that there are incorrect specimen container(s) present in carrier cassette, then at 534 the processor-based transfer system 122 causes the user interface to present a notification that there are incorrect specimen container(s) in carrier cassette, identifying incorrect position(s). Control then returns to await receipt of a confirmation that the transfer has been completed at 520. If it is determined at 532 that there are not incorrect specimen container(s) present in carrier cassette, then control passes to 536.

At 536, the processor-based transfer system 122 updates a data structure to reflect transfer. The data structure can, for example take the form of a database, table, tree structure or linked list.

At 538, the processor-based transfer system 122 stores evidence of chain-of-custody, preferably in a tamper proof or tamper evident form. The evidence of chain-of-title may, for example be stored in a block-chain form.

The method 500 terminates at 540, for example until invoked again.

Figure 6A:
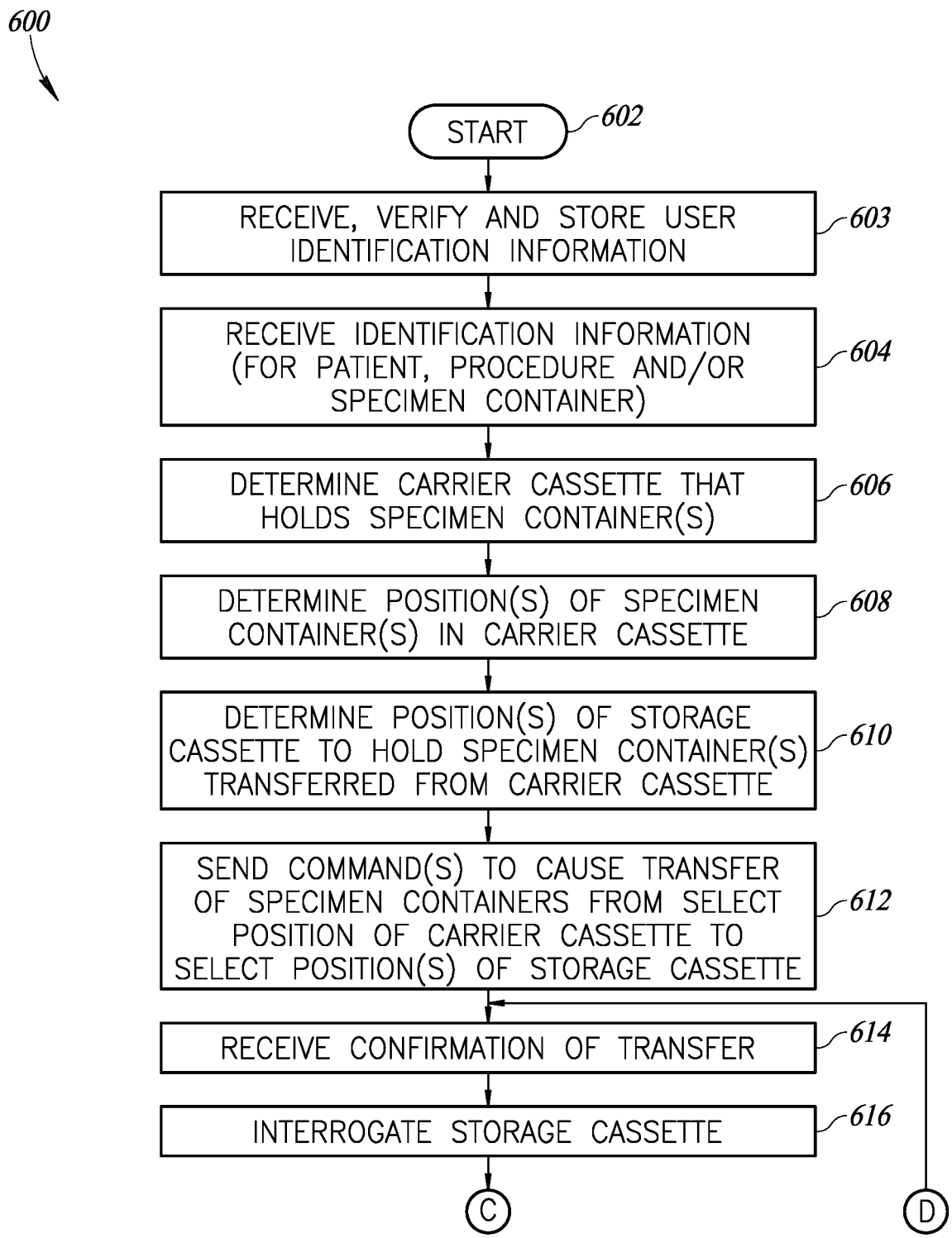
FIGS. 6A and 6B are a flow diagram showing a method of operation in a transfer system to transfer specimen containers that hold biological specimens from positions in a carrier cassette, which can be stored in a portable thermally insulated carrier, to positions in a storage cassette, which can be stored in a cryogenic refrigerator, according to at least one implementation.
Figure 6B:
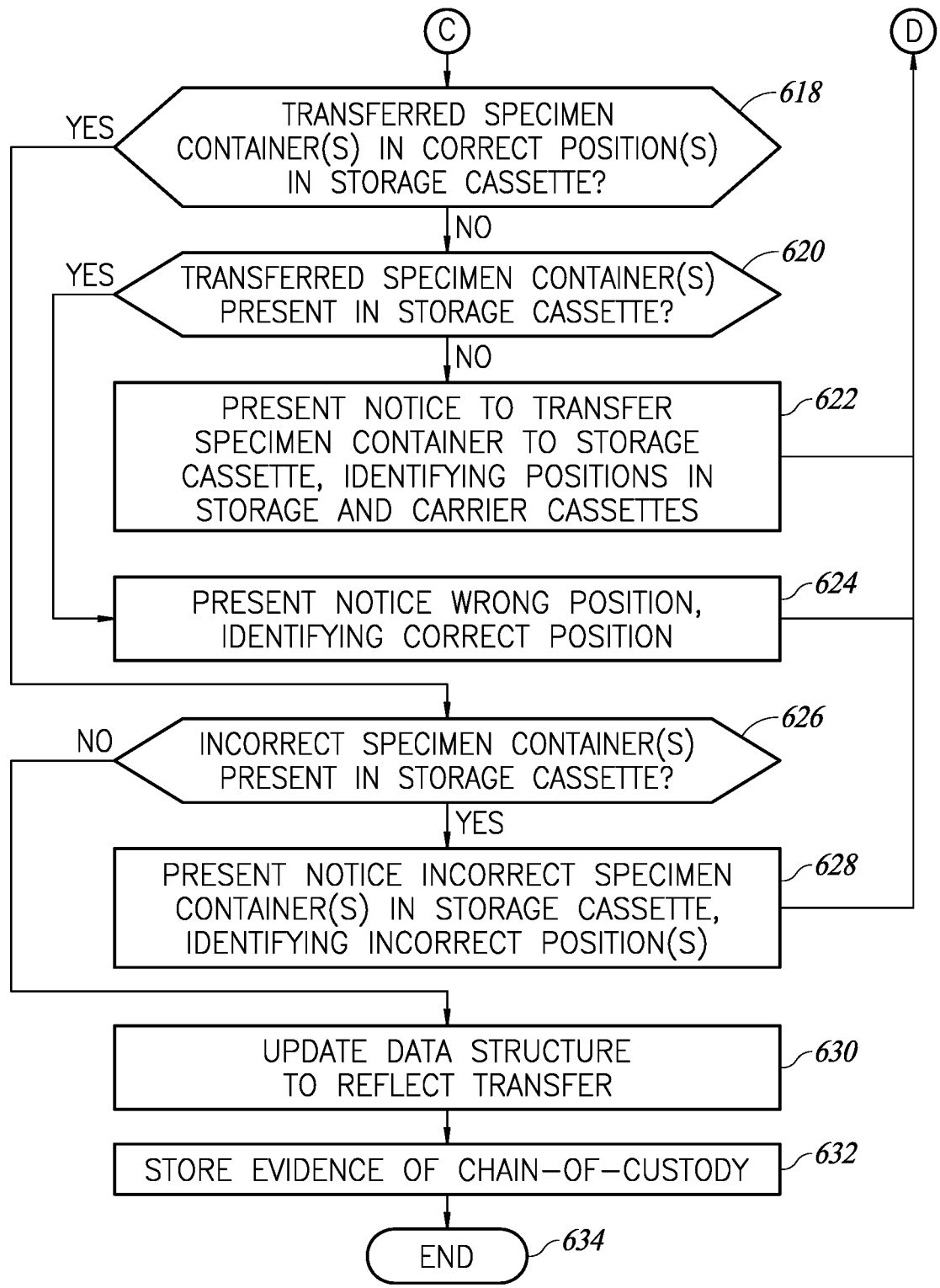

FIGS. 6A and 6B show a method 600 of operation to transfer specimen containers 200 (FIG. 2) from a carrier cassette 302 (FIG. 3) which can be stored in a portable thermally insulated cryogenic carrier 300 (FIG. 3) to a storage cassette 302 (FIG. 3) for storage in a cryogenic freezer 102, according to at least one illustrated implementation.

The method 600 starts at 602. For example, the method may start in response to a powering on of the processor-based transfer system 122 or a component thereof, in response to detection of a carrier cassette at a reader, receipt of a user input, or a call from a calling routine or program.

At 603, the processor-based transfer system 122 receives, verifies and stores user identification information. The user identification information may take a variety of forms, for example a user identifier, a password or passphrase, and/or biometric data (e.g., digital fingerprint, digital iris scan, facial features).

At 604, the processor-based transfer system 122 receives identification information. The identification information may, for example, be received as user input via a user interface, or as an electronic transfer of information from another system, for instance from a clinical procedure management processor-based system. The identification information may, for example, include a patient name, unique patient identifier, patient data of birth, procedure type or unique procedure identifier, specimen container identifier, and/or specimen identifier.

At 606, the processor-based transfer system 122 determines which carrier cassette holds the one or more specimen containers to be stored in the cryogenic freezer. For example, one or more specimen containers may hold biological specimens or tissue collected from a given procedure on a given patient. The processor-based transfer system 122 may, for example, query a data structure using the identification information.

At 608, the processor-based transfer system 122 determines one or more positions of the identified specimen containers in carrier cassette. The processor-based transfer system 122 may, for example, query a data structure using the identification information.

At 610, the processor-based transfer system 122 determines position(s) of storage cassette to hold specimen container(s) transferred from the carrier cassette. The processor-based transfer system 122 may, for example, query a data structure using the identification information.

At 612, the processor-based transfer system 122 sends one or more commands to cause transfer of specimen containers from select position of the carrier cassette to select position(s) of the carrier cassette. In the case of manual transfers, the commands may be presented to a user as prompts via the user interface. In the case of automated transfers, the commands can be in the form of a motion plan for execution by a robot or other mechanical conveyance.

At 614, the processor-based transfer system 122 receives a confirmation of transfer. Confirmation may be received from a user via a user interface. Alternatively, confirmation may come from a processor-based system, for example a robot, indicating that a series of operations have been completed.

Optionally at 616, the processor-based transfer system 122 interrogates the storage cassette. For example, a reader may sequentially interrogate each position in the storage cassette, determining which positions have a wireless transponder tagged specimen container, and even the identity of each specimen container at each position that has a specimen container. Such may, for example, be implemented via an RFID reader or interrogator, with a two-dimensional array of antennas which are arranged to be in registration with respective positions of the carrier cassette.

Optionally at 618, the processor-based transfer system 122 determines whether the transferred specimen container(s) are in correct the position(s) in storage cassette. The processor-based transfer system 122 can query a data structure to determine, for each position of the storage cassette that is supposed to have a specimen container, the identity of the specimen container that is supposed to be at that position. The processor-based transfer system 122 compares the actual mapping, as determined via interrogation, with the intended mapping, to verify that each specimen container is in the correct position, to identify specimen containers in incorrect positions, to identify missing specimen containers and/or specimen containers that should not be in the storage cassette, as described below.

If it is determined at 618 that the transferred specimen container(s) are not in correct position(s) in storage cassette, then at 620 the processor-based transfer system 122 determines whether the transferred specimen container(s) are present in storage cassette. If it is determined at 620 that the transferred specimen container(s) are not present in storage cassette, then at 622 the processor-based transfer system 122 causes a user interface to present a prompt to transfer the specimen container from the carrier cassette to storage cassette, identifying the specific positions in carrier and storage cassettes. Alternatively, the processor-based transfer system 122 provides instructions to a robot to implement the transfer of the specimen container(s). Control then returns to await receipt of a confirmation that the transfer has been completed at 614. If it is determined at 620 that the transferred specimen container(s) is (are) present in storage cassette, then at 624 the processor-based system 122 causes the user interface to present a notification or prompt to move the specimen container(s) to the correct position(s) in the storage cassette, including an identification of the position from which the specimen container should be moved from and the position to which the specimen container should be moved. Control then returns to await receipt of a confirmation that the transfer has been completed at 614.

If it is determined at 618 that the transferred specimen container(s) are in correct position(s) in storage cassette, then optionally at 626 the processor-based transfer system 122 determines whether there are incorrect specimen container(s) present in storage cassette. If it is determined at 620 that there are incorrect specimen container(s) present in storage cassette, then at 628 the processor-based transfer system 122 causes the user interface to present a notification that there are incorrect specimen container(s) in storage cassette, identifying incorrect position(s). Control then returns to await receipt of a confirmation that the transfer has been completed at 614. If it is determined at 620 that there are not incorrect specimen container(s) present in storage cassette, then control passes to 630.

At 630, the processor-based transfer system 122 updates a data structure to reflect transfer. The data structure can, for example take the form of a database, table, tree structure or linked list.

At 632, the processor-based transfer system 122 stores evidence of chain-of-custody, preferably in a tamper proof or tamper evident form. The evidence of chain-of-title may, for example be stored in a block-chain form.

The method 600 terminates at 634, for example until invoked again.

FIGS. 7 through 32 show an exemplary user interface to facilitate operation of the process-based transfer system 122. Such can be thought of a backend system, operable to store, retrieve and inventory specimens retained on specimen holders or "cryodevices" which are in turn stored in specimen containers marked with wireless transponders and/or machine-readable symbols. These specimen containers may hold one or multiple sample holders, and are generally logically associated with a particular patient. The specimen containers are transferable between storage cassettes for storage in a cryogenic refrigerator and carrier cassettes for storage in a portable thermally insulated carrier used, for instance, to transport the specimens to and from a patient.

Figure 7:
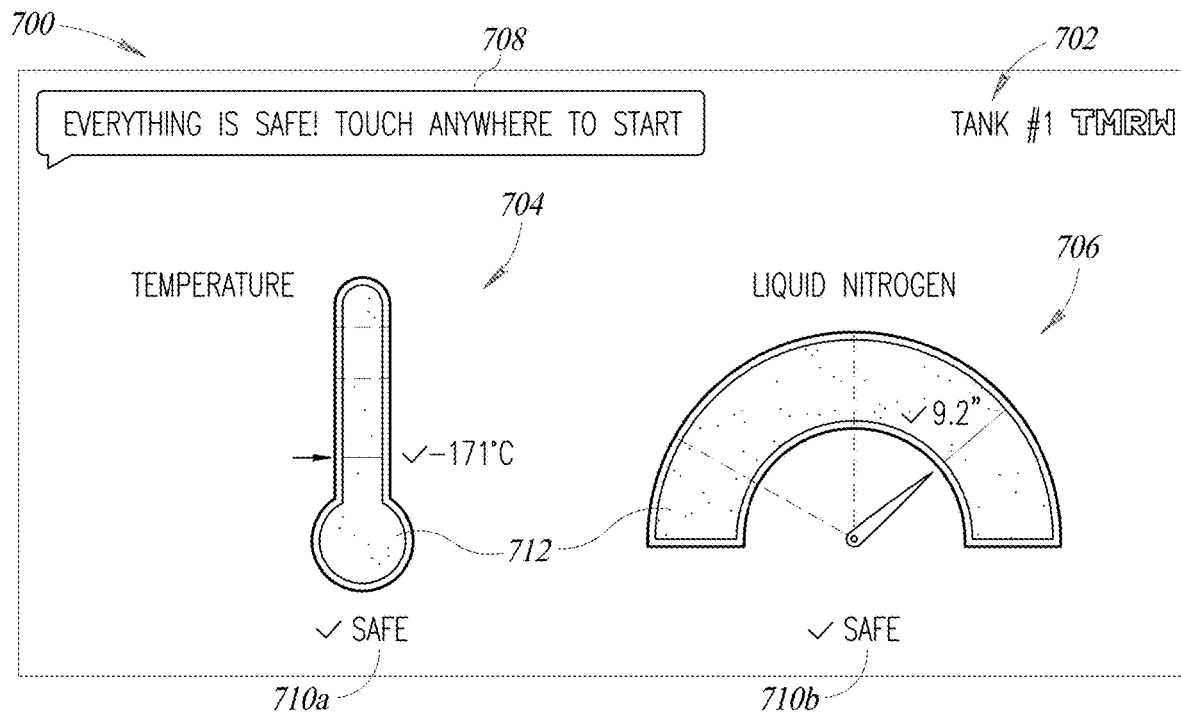
FIG. 7 is a screen print showing a tank status window of a user interface at a first time, used in operation of the transfer system to transfer specimen containers that hold biological specimens between a storage cassette and a carrier cassette, according to at least one implementation.

FIG. 7 shows a tank status window 700 of a user interface for a cryogenic robot system at a first time, the tank status window 700 providing a status of a cryogenic tank (e.g., cryogenic dewar), according to at least one illustrated implementation. The processor-based transfer system 122 of the cryogenic system 100 causes presentation of the tank status window 700 via a display monitor, heads up display, or other user interface device.

The tank status window 700 identifies a tank being monitored 702 and indicates a temperature 704 of a liquid nitrogen bath, a level 706 of the liquid nitrogen bath. The tank status window 700 also provides one or more indications that both the temperature and level are within acceptable conditions, for example via a message (e.g., "Everything is safe") 708, a graphical indicator (e.g., checkmark with the word safe) 710a, 710b, and a color (e.g., green represented by stippling) 712. The tank status window 700 may, for example, be presented as a default window, for instance as a "screensaver" window when not otherwise interacting with the user interface. Additionally, or alternatively, the tank status window 700 may be presented at other times, for example in response to performing an initialization or a status check. The tank status window 700 may, for example, be presented continuously, or as an alert in response to occurrence of certain conditions (e.g., temperature above one or more defined thresholds, fluid below one or more defined thresholds). Additionally, one or more alerts may be issued, for example via text message, electronic mail, etc.

Figure 8:
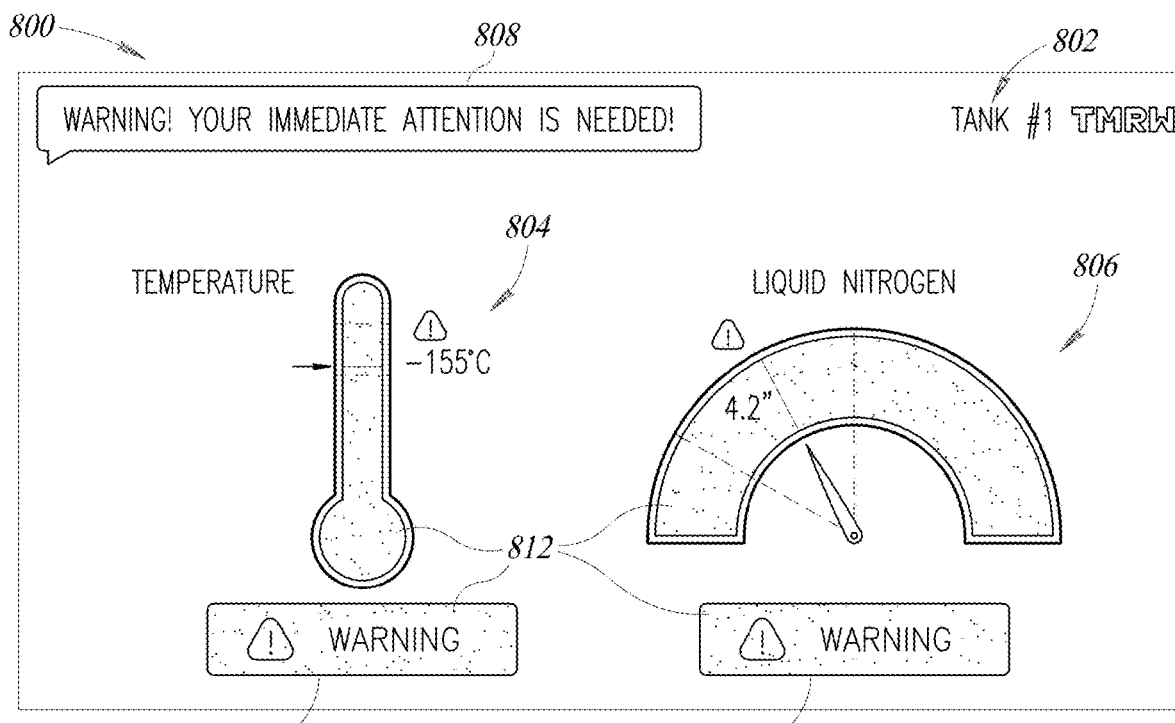
FIG. 8 is a screen print showing a tank status window of a user interface at a second time, used in operation of the transfer system to transfer specimen containers that hold biological specimens between a storage cassette and a carrier cassette, according to at least one implementation.

FIG. 8 shows the tank status window 800 of FIG. 7 of a user interface for a cryogenic robot system at another time, the tank status window 800 providing a status of a cryogenic tank (e.g., cryogenic dewar), according to at least one illustrated implementation. The processor-based transfer system 122 of the cryogenic system 100 causes presentation of the tank status window 800 via a display monitor, heads up display, or other user interface device.

The tank status window 800 identifies a tank 802 being monitored and indicates a temperature 804 of a liquid nitrogen bath, a level 806 of the liquid nitrogen bath. The tank status window 800 also provides one or more indications that both the temperature and level are approaching or at marginal conditions, for example via a message (e.g., "WARNING! Your immediate attention is needed") 808, a graphical indicator (e.g., exclamation symbol and the word Warning) 810a, 810b, and a color (e.g., yellow represented by stippling) 812. In particular, the tank status window 800 of FIG. 8 provides a first level of warning regarding conditions in the cryogenic tank or bath deteriorating (e.g., temperature approaching or at a first temperature threshold or level of fluid approaching or at a first fluid level threshold). The tank status window 800 may, for example, be presented as a default window, for instance as a "screensaver" window when not otherwise interacting with the user interface. The tank status window 800 may, for example, be presented continuously, or as an alert in response to occurrence of certain conditions (e.g., temperature above one or more defined thresholds, fluid below one or more defined thresholds). Additionally, one or more alerts may be issued, for example via text message, electronic mail, etc.

Figure 9:
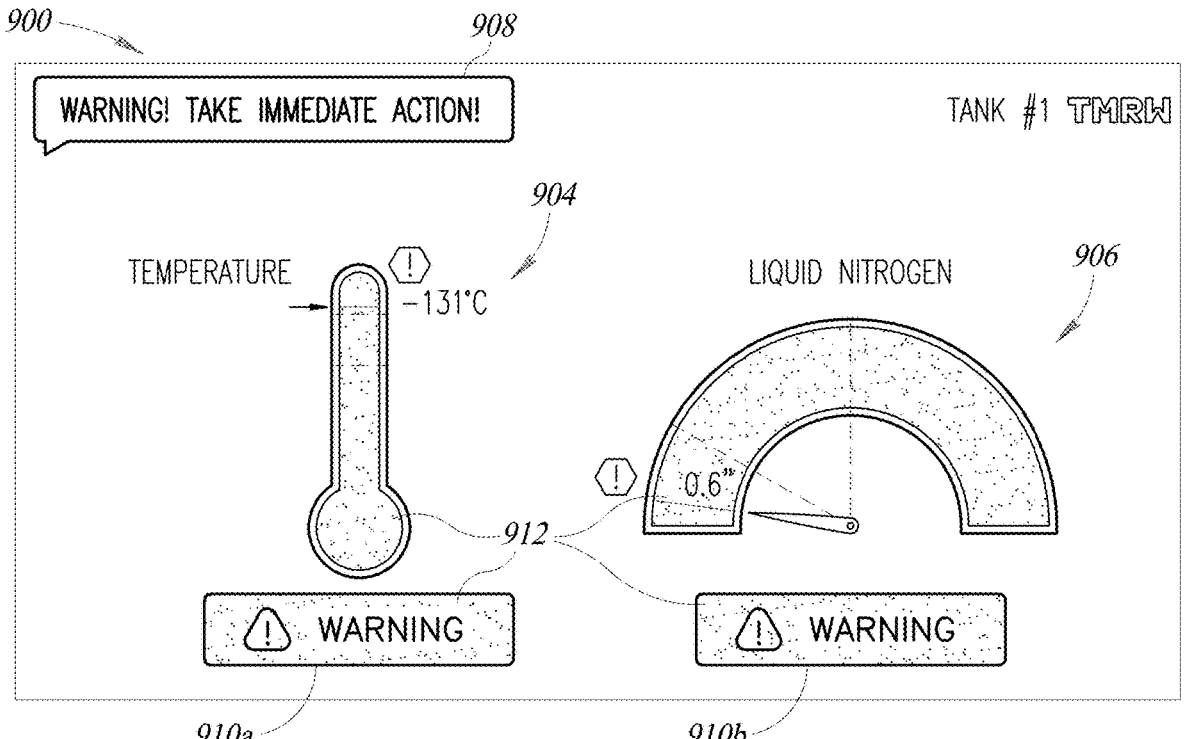
FIG. 9 is a screen print showing a tank status window of a user interface at a third time, used in operation of the transfer system to transfer specimen containers that hold biological specimens between a storage cassette and a carrier cassette, according to at least one implementation.

FIG. 9 shows the tank status window 900 of the user interface for a cryogenic robot system at yet another time, the tank status window 900 providing a status of a cryogenic tank (e.g., cryogenic dewar), according to at least one illustrated implementation. The processor-based transfer system 122 of the cryogenic system 100 causes presentation of the tank status window 900 via a display monitor, heads up display, or other user interface device.

The tank status window 900 identifies a tank 902 being monitored and indicates a temperature 904 of a liquid nitrogen bath, a level 906 of the liquid nitrogen bath. The tank status window 900 also provides one or more indications that both the temperature and level are at or below acceptable conditions, for example via a message (e.g., "WARNING! TAKE IMMEDIATE ACTION!") 908, a graphical indicator (e.g., exclamation symbol and the word Warning) 910a, 910b, and a color (e.g., red) 912. In particular, the tank status window 900 of FIG. 9 provides a second level of warning, more dire than the first level of warning, regarding conditions in the cryogenic tank or bath deteriorating (e.g., temperature approaching or at a second temperature threshold or level of fluid approaching or at a second fluid level threshold). The tank status window 900 may, for example, be presented as a default window, for instance as a "screensaver" window when not otherwise interacting with the user interface. The tank status window 900 may, for example, be presented continuously, or as an alert in response to occurrence of certain conditions (e.g., temperature above one or more defined thresholds, fluid below one or more defined thresholds). Additionally, one or more alerts may be issued, for example via text message, electronic mail, etc.

Figure 10:
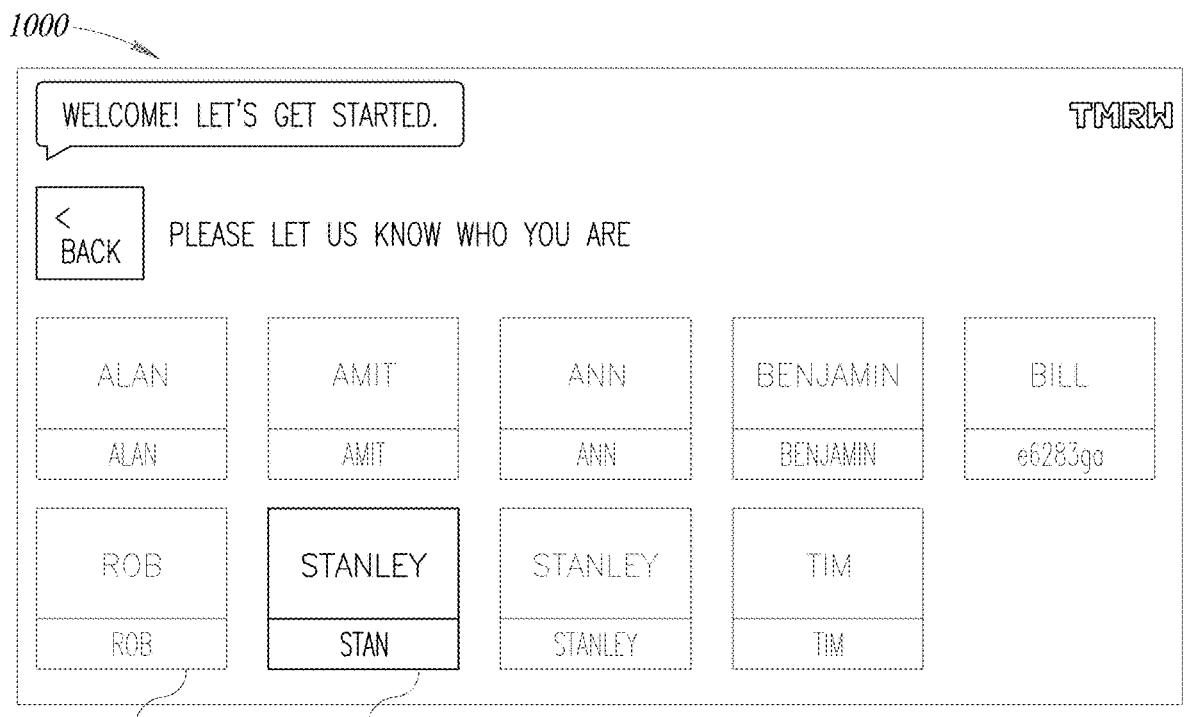
FIG. 10 is a screen print showing a login window of a user interface used in operation of the transfer system to transfer specimen containers that hold biological specimens between a storage cassette and a carrier cassette, according to at least one implementation.

FIG. 10 shows a login window 1000, according to at least one illustrated implementation. The processor-based transfer system 122 of the cryogenic system 100 causes presentation of the login window 1000 via a display monitor, heads up display, or other user interface device.

The login window 1000 allows a user or operator to identify themselves by selecting a corresponding one of a number of user selectable user identification icons 1002a, 1002b (only two called out). In this case a user named Stanley, who goes by Stan, is shown selected.

Figure 11:
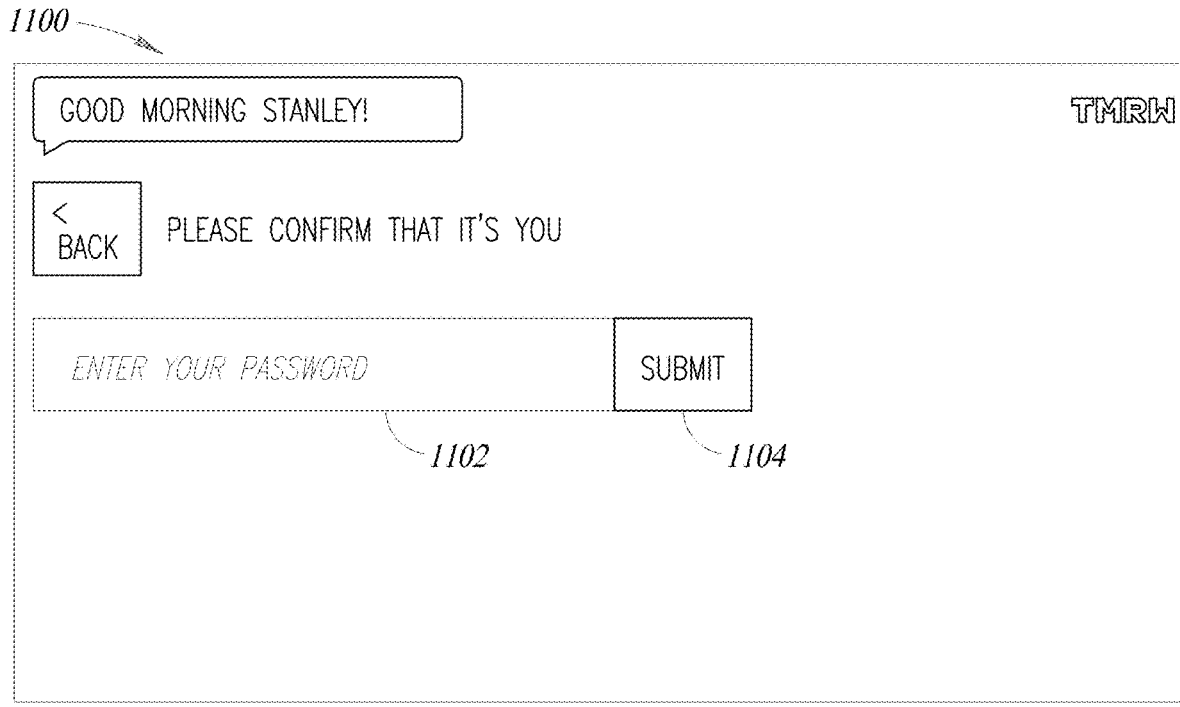
FIG. 11 is a screen print showing a password entry window of a user interface used in operation of the transfer system to transfer specimen containers that hold biological specimens between a storage cassette and a carrier cassette, according to at least one implementation.

FIG. 11 shows a password entry window 1100, according to at least one illustrated implementation. The processor-based transfer system 122 of the cryogenic system 100 causes presentation of the password entry window 1100 via a display monitor, heads up display, or other user interface device.

The password entry window 1100 is displayed in response a selection of one of the user identification icons from the login window. The password entry window 1100 has a field 1102 in which a user can enter a password or passphrase. On entry by selection of a user selectable submit icon 1104, a processor-based system verifies the entered password or passphrase for the particular identified user. In the illustrated implementation, an error notice is presented indicating that the entered password or passphrase is incorrect, and prompting the user to reenter the password or passphrase.

Figure 12:
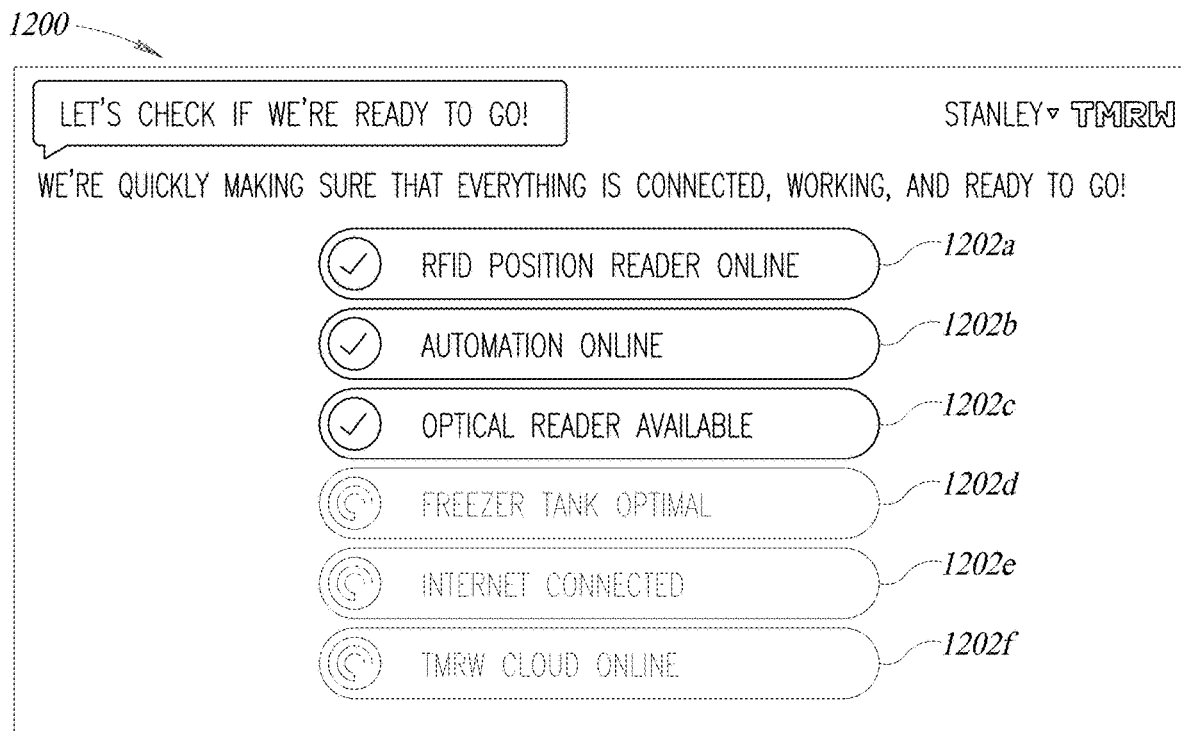
FIG. 12 is a screen print showing a system check window of a user interface at a first time, used in operation of the transfer system to transfer specimen containers that hold biological specimens between a storage cassette and a carrier cassette, according to at least one implementation.

FIG. 12 shows a system check window 1200 at a first time, according to at least one illustrated implementation. The processor-based transfer system 122 of the cryogenic system 100 causes presentation of the system check window 1200 via a display monitor, heads up display, or other user interface device.

The system check window 1200 may be displayed while and/or at a termination of a system check procedures. The system check procedure may be performed in response to a user successfully logging into the system.

Performance of the system check may include confirmation that each of several aspects of operation and within defined parameters. For example, a processor-based system may confirm that a reader, for example a wireless transponder (e.g., radio frequency identification (RFID)) reader or interrogator is online and operational to read or interrogate wireless transponders. Also for example, a processor-based system may confirm that an automated component or system (e.g., robot computer) is online. Also for example, a processor-based system may confirm that that a reader, for example an optical or machine-readable symbol (e.g., one-dimensional or barcode symbol; two-dimensional symbol) reader (e.g., scanner, imager) is online and operational to read optical or machine-readable symbol. Also for example, a processor-based system may confirm that a cryogenic tank or bath is optimal (e.g., temperature below a defined temperature; level above a defined height). Also for example, a processor-based system may confirm that a communications connection (e.g., Internet) exists and is operable. Also for example, a processor-based system may confirm that the system is communicatively coupled to a cloud-based system (e.g., TMRW Cloud Online). In particular, the system check window 1200 may present a status indication for the wireless reader(s) positioned and online status 1202a, automation online status 1202b, optical reader available status 1202c, freezer tanks optimal (e.g., temperature, fluid level) status 1202d, Internet or other communications channel connected and available status 1202e, and/or cloud-based resources availability status 1202f. Status indications may, for example include a checkmark or other symbol indicating that the status of the respective resource is operational, and X or other symbol indicating that the status of the respective resource is not operational, or a spinning indicator to represent that the status of the respective resource is still being checked.

Figure 13:
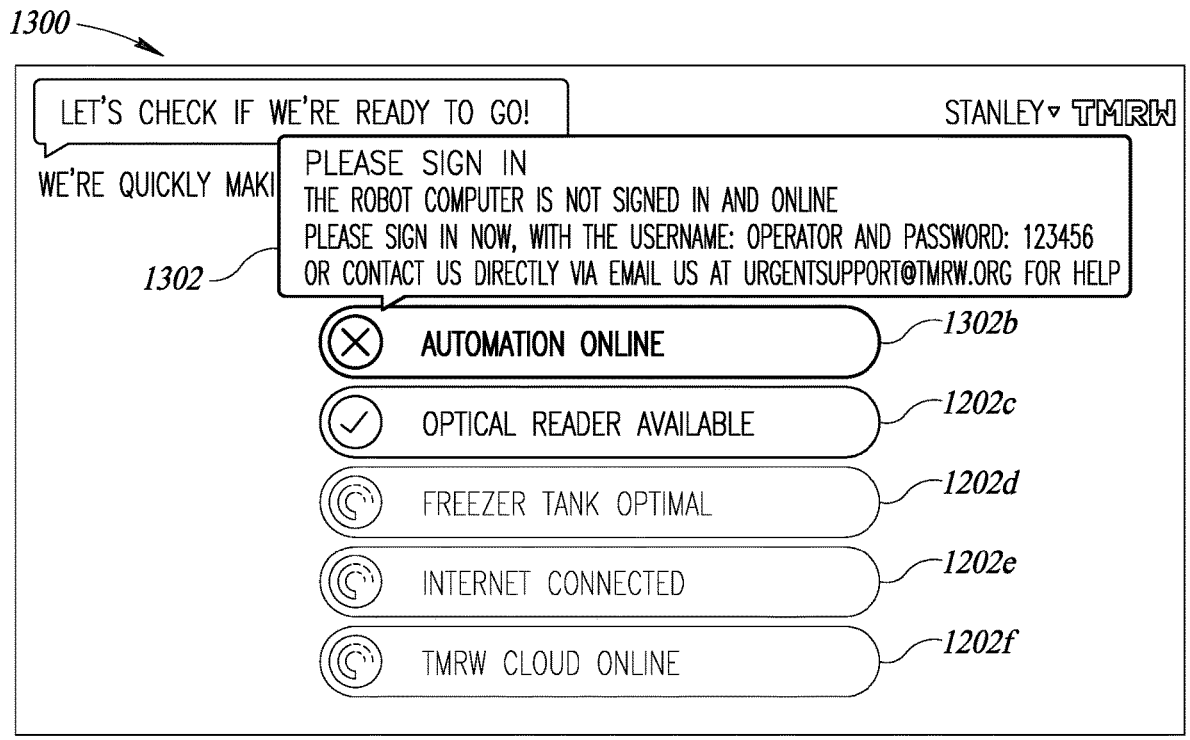
FIG. 13 is a screen print showing a system check window of a user interface at a second time, used in operation of the transfer system to transfer specimen containers that hold biological specimens between a storage cassette and a carrier cassette, according to at least one implementation.

FIG. 13 shows a system check window 1300 at a second time, according to at least one illustrated implementation. The processor-based transfer system 122 of the cryogenic system 100 causes presentation of the system check window 1300 via a display monitor, heads up display, or other user interface device.

The system check window 1300 is similar to the system check window 1200, but provides an indication of a failure, in the illustrated example that the automated component or system (e.g., robot computer) status is indicated (e.g., by X and color) 1302b as not being online and operational as well as via a popup message 1302 providing information about the error condition and resources for resolving the error condition.

Figure 14:
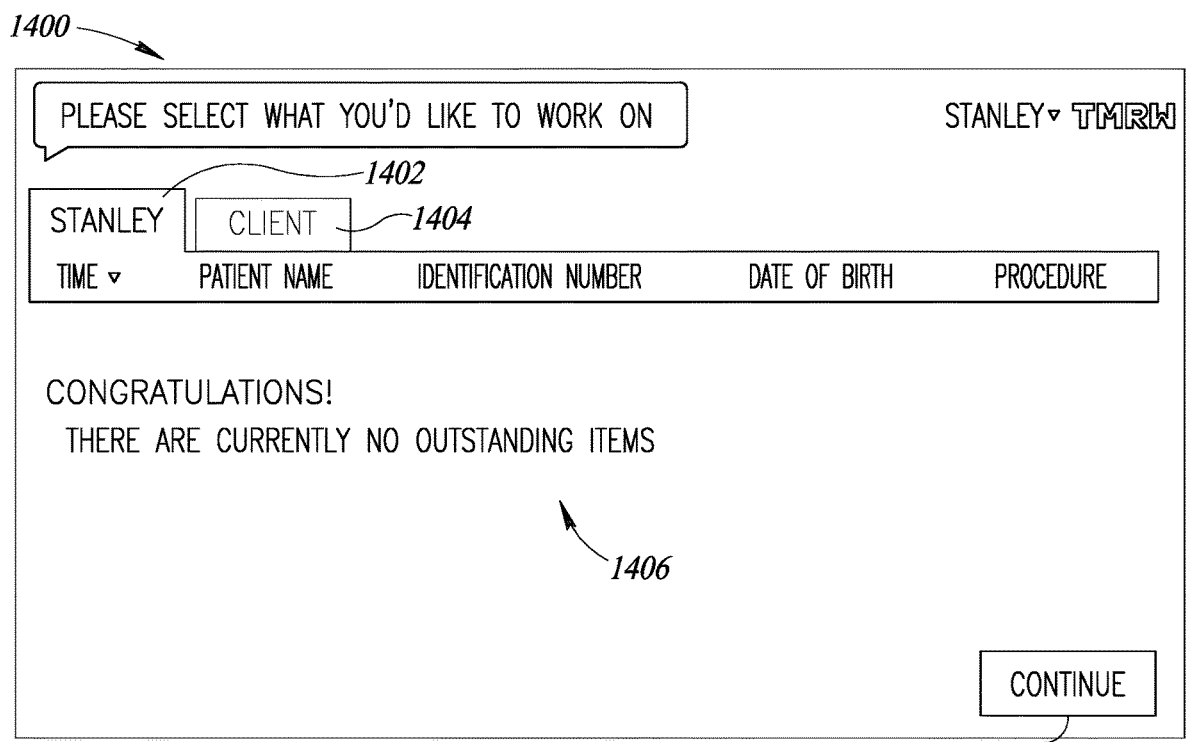
FIG. 14 is a screen print showing a navigation window of a user interface at a first time, used in operation of the transfer system to transfer specimen containers that hold biological specimens between a storage cassette and a carrier cassette, according to at least one implementation.

FIGS. 14 and 15 show a navigation window 1400, 1500, respectively, at two different instances of time, according to at least one illustrated implementation. The processor-based transfer system 122 of the cryogenic system 100 causes presentation of the navigation window 1400, 1500 via a display monitor, heads up display, or other user interface device.

The navigation window 1400, 1500 provides a user interface (e.g., user selectable icons, user selectable tabs, user selectable pull-down menus) via which a user can indicate a type of action or workflow to implement. For example, the user interface may include a first user selectable tab 1402, 1502 associated with the respective user, and a second user selectable 1404, 1504 tab associated with the respective clinic. Each of the first and the second user selectable tabs 1402, 1404, 1502, 1504 may be associated with a respective set of outstanding action items or workflows assigned to the user or the clinic, respectively, that require completion, and which may be presented as a list of chart 1506 (FIG. 15).

The navigation window 1400, 1500 may provide an indication of whether there are outstanding items or workflows assigned to the user that require completion, for example listing one or more action items or workflows 1506 (FIG. 15) where outstanding (i.e., uncompleted action items or workflows) action items or workflows exist. As illustrated in FIG. 14, where there are no outstanding action items or workflows, the navigation window 1400 may provide an appropriate a message 1406 indicating that there are no outstanding action items or workflows. As illustrated in FIG. 15, for each outstanding action item or workflow in the list or chart 1506, the navigation window 1500 may, for example, present in a corresponding column: a time set for a procedure on a patient 1506a, a patient name 1506b, an identification number for the patient 1506c, a patient date of birth 1506d, and/or an identification of a procedure 1506e to be performed on the patient. The identification of the procedure may be a textual description of a type of procedure to be performed (e.g., Frozen Embryo Transfer (FET), Egg Freeze, Sperm Freeze) and/or may be an identifier, for example a unique identifier that uniquely identifies a specific instance of the procedure.

On selection of an outstanding item or workflow, the user may select a continue user selectable icon 1408, 1508 to move forward with the selected outstanding item or workflow.

Figure 16:
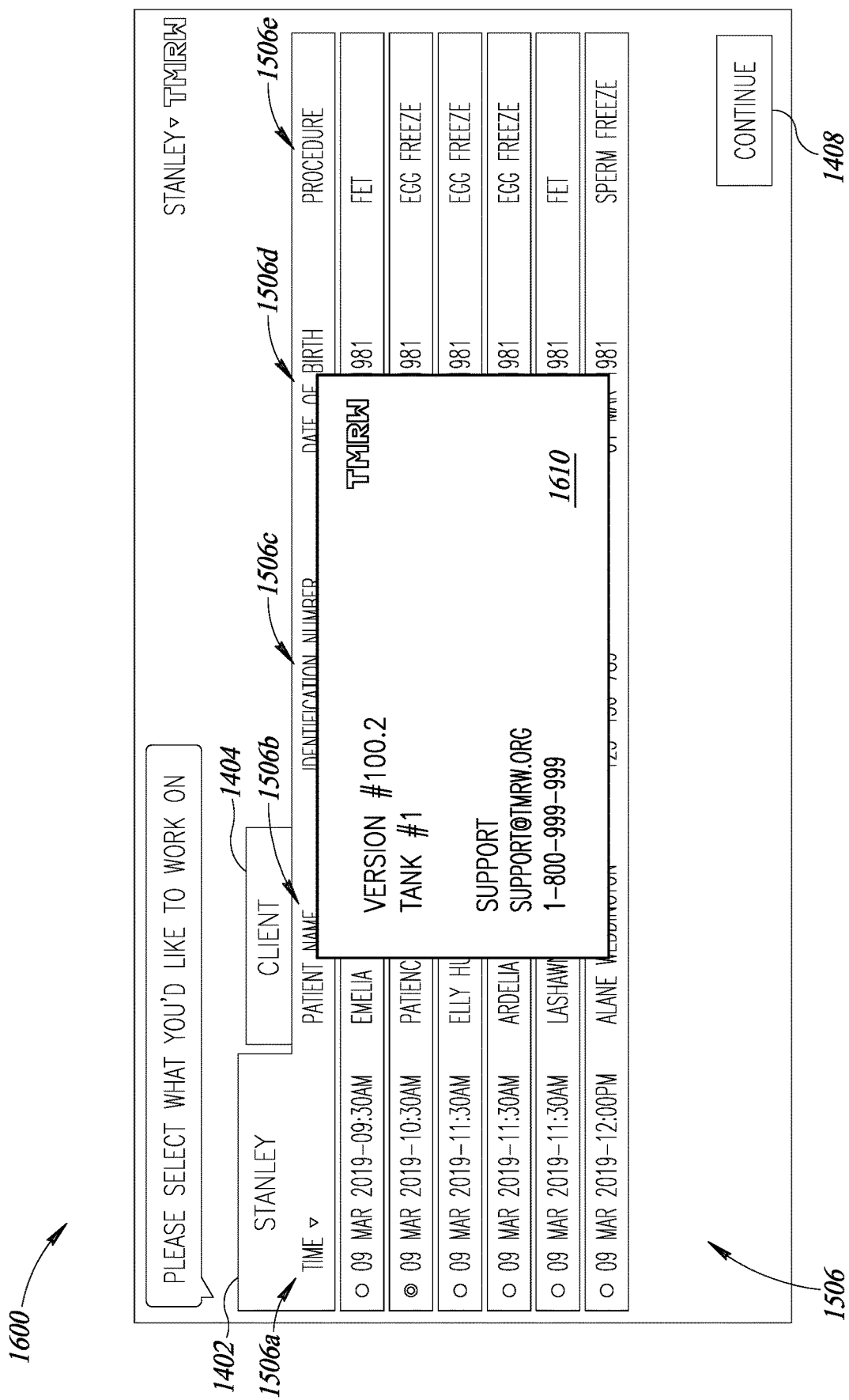
FIG. 16 is a screen print showing a navigation window of a user interface at another time, used in operation of the transfer system to transfer specimen containers that hold biological specimens between a storage cassette and a carrier cassette, according to at least one implementation.

FIG. 16 shows a navigation window 1600 at another time, according to at least one illustrated implementation. The processor-based transfer system 122 of the cryogenic system 100 causes presentation of the navigation window 1600 via a display monitor, heads up display, or other user interface device.

The navigation window 1600 may be similar to the navigation windows 1400, 1500 (FIGS. 14 and 15), although with different information represented, and in some instances employs there same references numbers from navigation windows 1400, 1500 (FIGS. 14 and 15) for similar structures.

In response to selection of an outstanding item or workflow (e.g., selection of a row in the list or table 1506 itself or a radio button spatially associated with the row in the list or table 1506), the navigation window 1600 may include a dialog box 1610, for example overlaid thereon, indicating a particular cryogenic tank that is to be employed and a version number of indicating the version of the software currently being executed.

Figure 17:
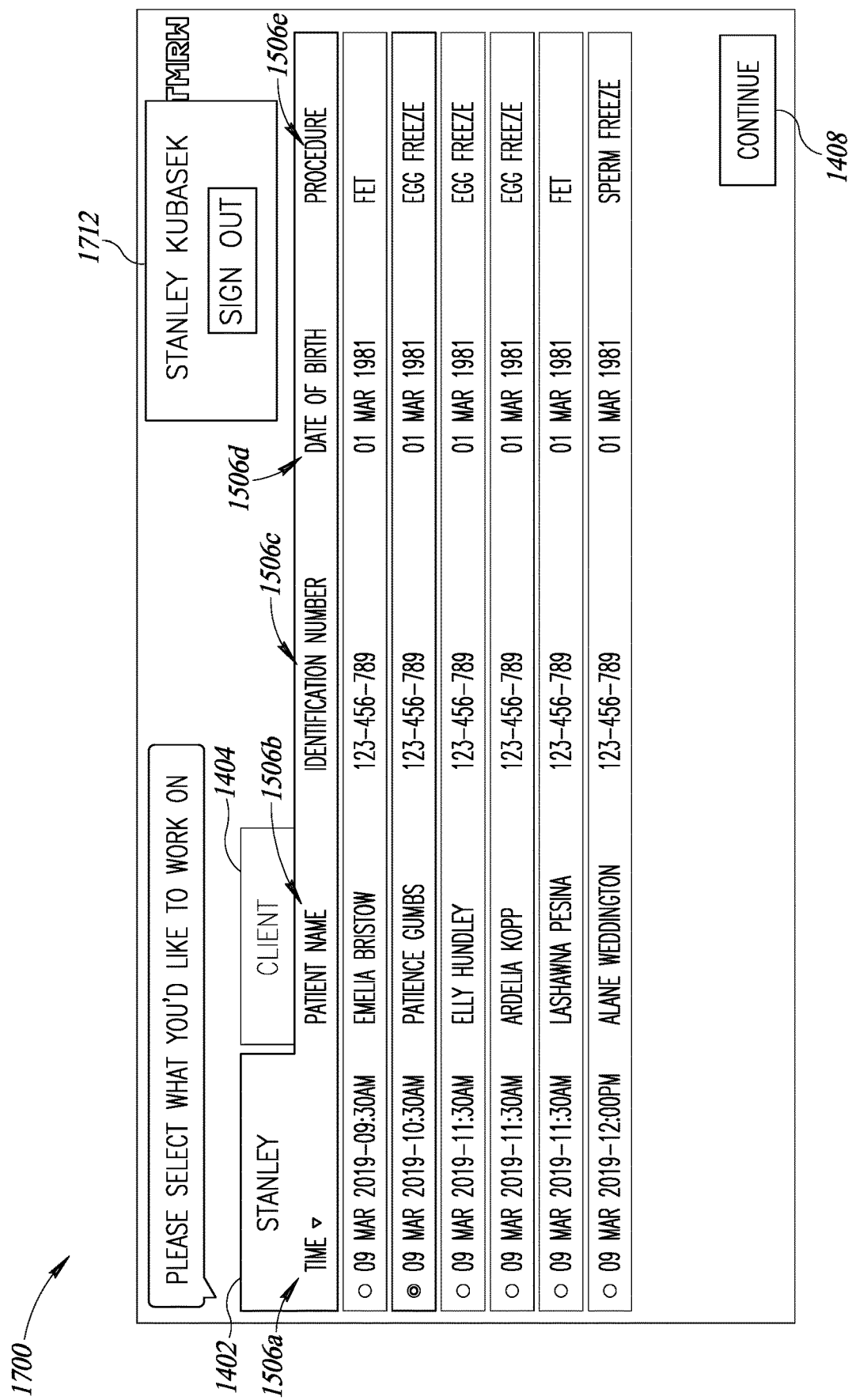
FIG. 17 is a screen print showing a navigation window of a user interface at yet another time, used in operation of the transfer system to transfer specimen containers that hold biological specimens between a storage cassette and a carrier cassette, according to at least one implementation.

FIG. 17 shows a navigation window 1700 at yet another time, according to at least one illustrated implementation. The processor-based transfer system 122 of the cryogenic system 100 causes presentation of the navigation window 1700 via a display monitor, heads up display, or other user interface device.

The navigation window 1700 may be similar to the navigation windows 1400, 1500, 1600 (FIGS. 14, 15 and 16), although with different information represented, and in some instances employs there same references numbers from navigation windows 1400, 1500 (FIGS. 14 and 15) for similar structures.

In particular, the navigation window 1700 may provide a user selectable sign out icon 1712, selection of which logs the user out of the system. Control over use of the system, including validation of the users who log in may be particularly advantageous to protect the integrity of the system and process. While the illustrated implementations employ user credentials in the form of a user name and password or passphrase, the processor-based system may additional or alternatively employ other user credentials including biometric user credentials (e.g., fingerprint recognition, iris recognition, facial recognition) as well as other identity verification techniques (e.g., two-factor authentication, physical tokens, firmware tokens, software tokens).

Figure 18:
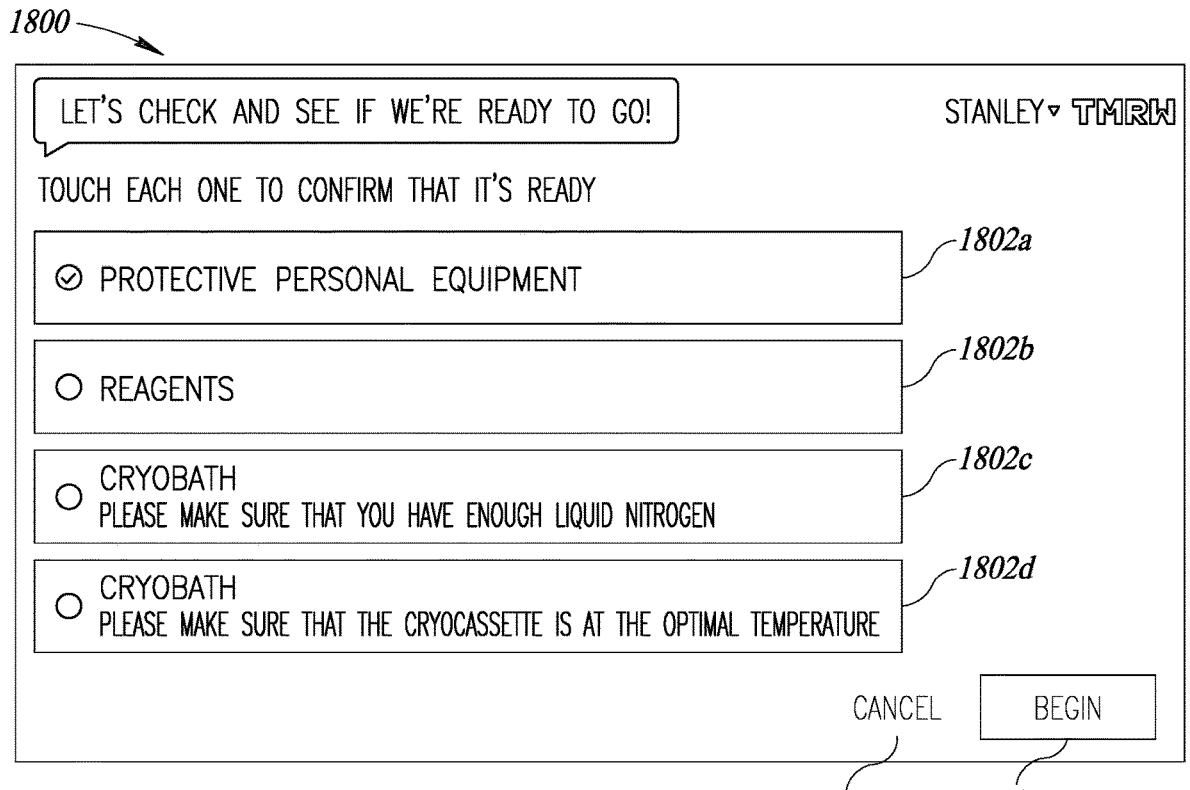
FIG. 18 is a screen print showing a checklist window of a user interface at a first time, used in operation of the transfer system to transfer specimen containers that hold biological specimens between a storage cassette and a carrier cassette, according to at least one implementation.
Figure 19:
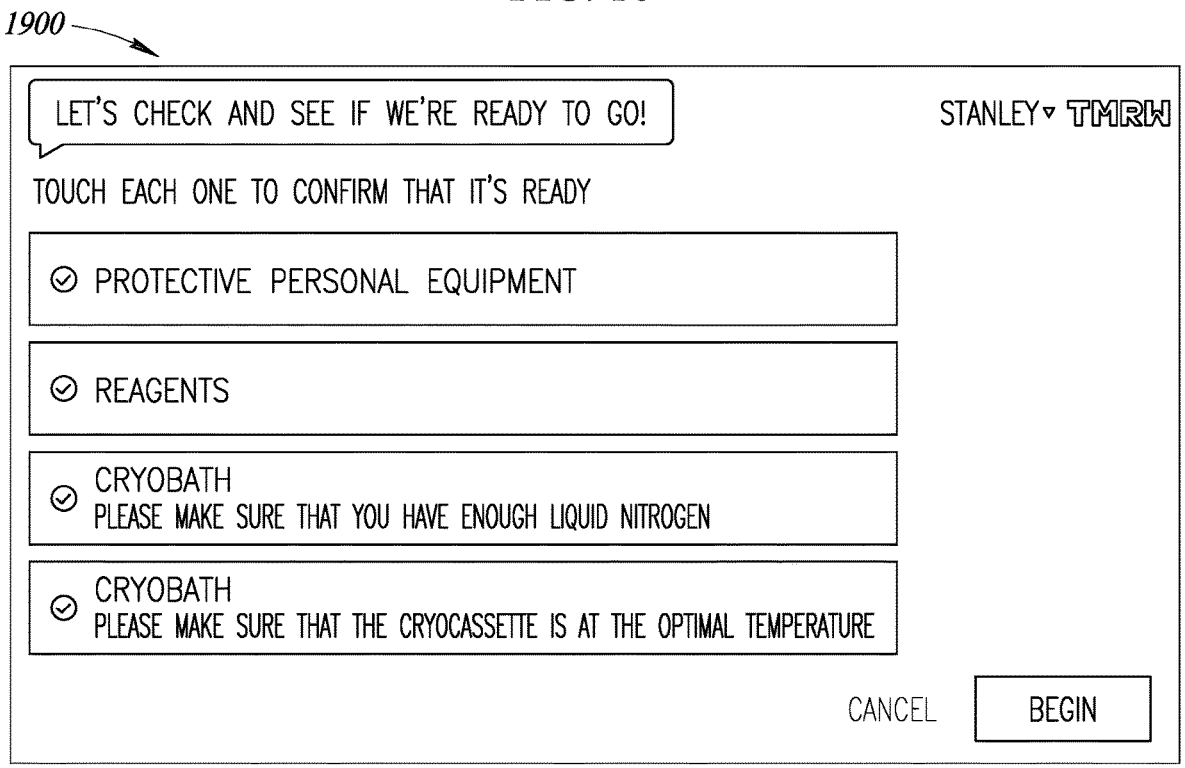
FIG. 19 is a screen print showing a checklist window of a user interface at a first time, used in operation of the transfer system to transfer specimen containers that hold biological specimens between a storage cassette and a carrier cassette, according to at least one implementation.

FIGS. 18 and 19 show a checklist window 1800, 1900, respectively, at two different instances of time, according to at least one illustrated implementation. The processor-based transfer system 122 of the cryogenic system 100 causes presentation of the checklist window 1800, 1900 via a display monitor, heads up display, or other user interface device.

The checklist window 1800, 1900 provides a set of user selectable icons corresponding to respective action items or confirmations that are part of a workflow which is to be confirmed or performed as part of a procedure. Those actions or workflow may be specific to the field of embryology, in in particular may be tasks performed by an embryologist. The checklist window 1800, 1900 requires a user to affirmatively confirm that each action item or confirmations is complete. The action items or confirmations and associated user selectable icons may, for example include: protective personal equipment (e.g., gloves worn, eye protection worn, surgical mask worn) is in place 1802a; reagents are available and ready for use 1802b, a cryogenic bath (i.e., cryobath) in a portable thermally insulated carrier has sufficient fluid (e.g., liquid nitrogen) and/or is at a sufficiently cool temperature 1802c; and/or the portable carrier and/or a carrier cassette is at or below a defined temperature 1802d. The user selectable icons 1802a-1802d may take the form of the text of the textual descriptions themselves, rows, and/or radio buttons spatially associated with the textual descriptions or rows.

In particular, FIG. 18 shows a first item 1802a identified as being confirmed (e.g., check mark and green color) after the user selects the corresponding user selectable icon indicating that protective equipment is in place. FIG. 19 shows all of the items 1802a01802d identified as being confirmed (e.g., check mark and green color) after the user selects the corresponding user selectable icons indicating that each action item or confirmation has been completed.

Once all items are identified as being confirmed, a "begin" user selectable icon 1804 becomes selectable. In response to selection of the "begin" user selectable icon 1804, the processor-based subsystem creates an electronic audit trail providing evidence that the user indicated that each of the action items or confirmations is complete and moves toward validating transfers between a storage cassette and a carrier cassette. The cryogenic system 100 or a portion thereof (e.g., processor-based subsystem) begins processing movements of carriers (e.g., cassettes) and/or containers (e.g., vials) from or to the cryogenic bath or tank for the currently selected procedure or order. In response to selection of a "cancel" user selectable icon 1806, the processor-based subsystem stops processing the currently selected procedure, and returns to the navigation window 1400, 1500, 1600, 1700.

Figure 20:
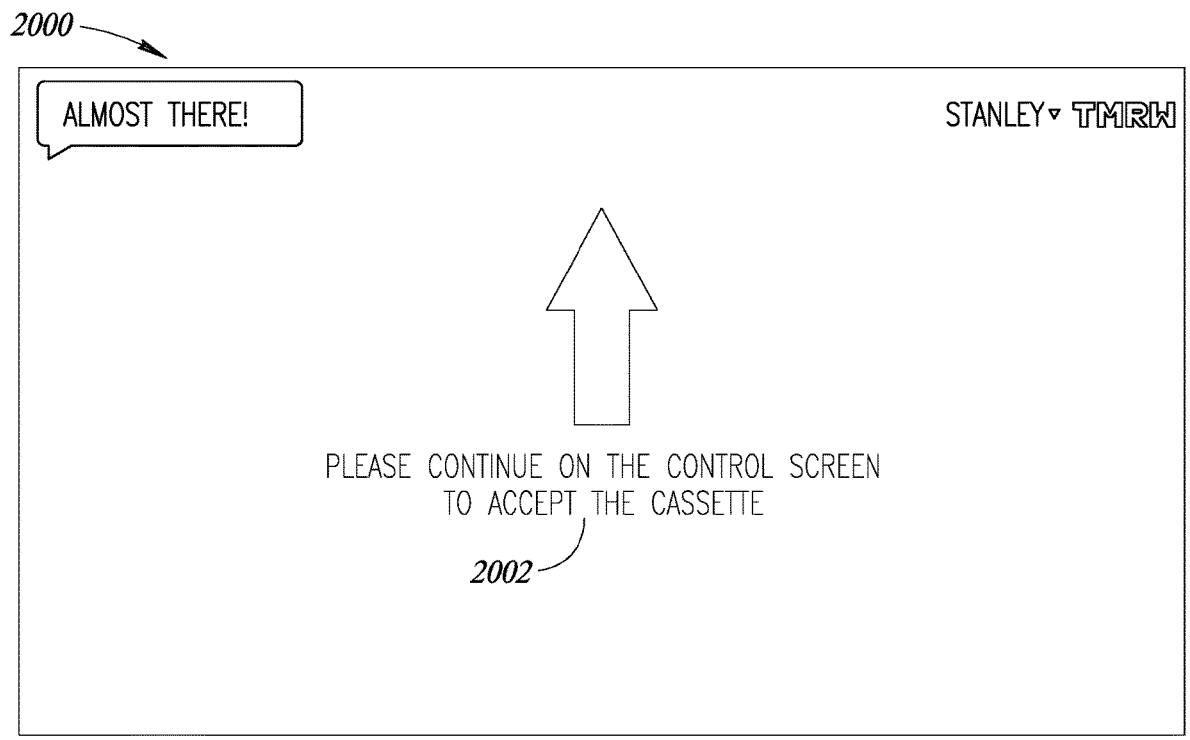
FIG. 20 is a screen print showing a cassette placement prompt window of a user interface used in operation of the transfer system to transfer specimen containers that hold biological specimens between a storage cassette and a carrier cassette, according to at least one implementation.

FIG. 20 shows a cassette placement prompt window 2000, according to at least one illustrated implementation. The processor-based transfer system 122 of the cryogenic system 100 causes presentation of the cassette placement prompt window 2000 via a display monitor, heads up display, or other user interface device.

The cassette placement prompt 2000 window is used to prompt a user to move a cassette or cause a cassette to be moved from a cryogenic bath or tank to a reader, for example a reader that employs a two-dimensional array of antennas to read identifiers from wireless transponders (e.g., RFID transponders), for example from each of a number of wireless transponders each physically coupled to a respective container (e.g., vial, cap, and/or specimen holder or straw). In some implementations, wireless transponders may additionally be physically associated with a cassette or other carrier and/or with a cryogenic bath or tank. In at least some implementations, the cryogenic system 100 may include a robotic appendage that is operable to autonomously retrieve the cassette from the cryogenic bath or tank to a reader and position the retrieved cassette with respect to the antenna array of the reader.

In response to selection of a user selectable icon, for instance the upward pointing arrow and/or associated text 2002, the processor-based subsystem causes the cassette to be read. That is, the processor-based subsystem causes a transmitter, transceiver, or radio of the reader to transmit interrogation signals via one or more antennas (e.g., antennas of the two-dimension array of antennas). The processor-based subsystem may causes a receiver, transceiver, or radio of the reader to receive and process response signals (e.g., backscattered signals encoding unique identifiers) returned from the wireless transponders (e.g., RFID transponders) and received via one or more antennas (e.g., antennas of the two-dimension array of antennas). The processor-based subsystem may, for example, cause a transmitter, transceiver, or radio of the reader to transmit interrogation signals successively from each of the antennas of the two-dimension array of antennas, for instance for a defined interrogation period of time during an interrogation cycle. The processor-based subsystem may, for example, cause a receiver, transceiver, or radio of the reader to listen for return signals from all or selected ones of the antennas of the two-dimension array of antennas, for instance for a defined receive period of time during the interrogation cycle. In at least one implementation, the processor-based subsystem may cause the receiver, transceiver or radio to listen to one, more or all of the antennas other than the antenna that most recently transmitted an interrogation signal, thereby advantageously preventing an resonance in the transmitting antenna from interfering with reception, and possibly reducing a length of time between transmission and detection of reception.

Figure 21:
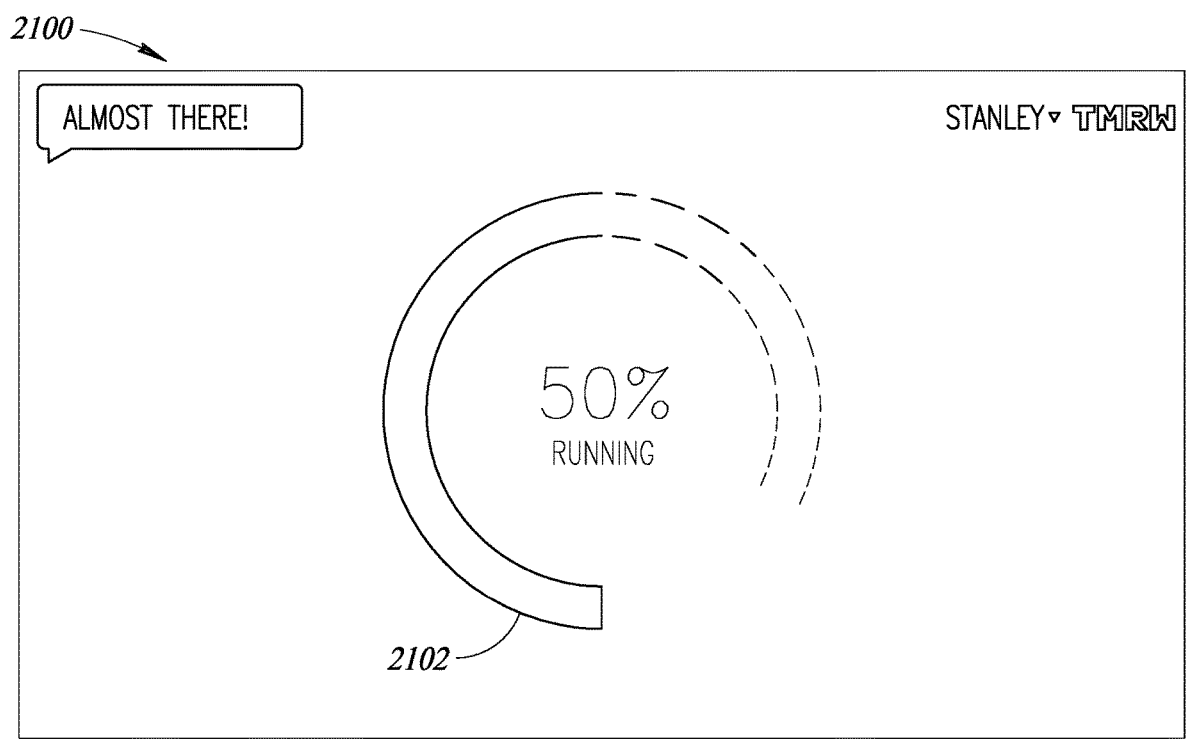
FIG. 21 is a screen print showing a processing window of a user interface used in operation of the transfer system to transfer specimen containers that hold biological specimens between a storage cassette and a carrier cassette, according to at least one implementation.

FIG. 21 shows a processing window 2100, according to at least one illustrated implementation. The processor-based transfer system 122 of the cryogenic system 100 causes presentation of the processing window 2100 via a display monitor, heads up display, or other user interface device.

The processing window 2100 provides a visual indication 2102 to a user that the cryogenic system 100 is currently busy, for example processing information (e.g., reading identifiers from wireless transponders physically coupled to containers in a cassette). Thus, the user knows that the cryogenic system 100 is not currently awaiting any input or other action by the user.

Figure 22:
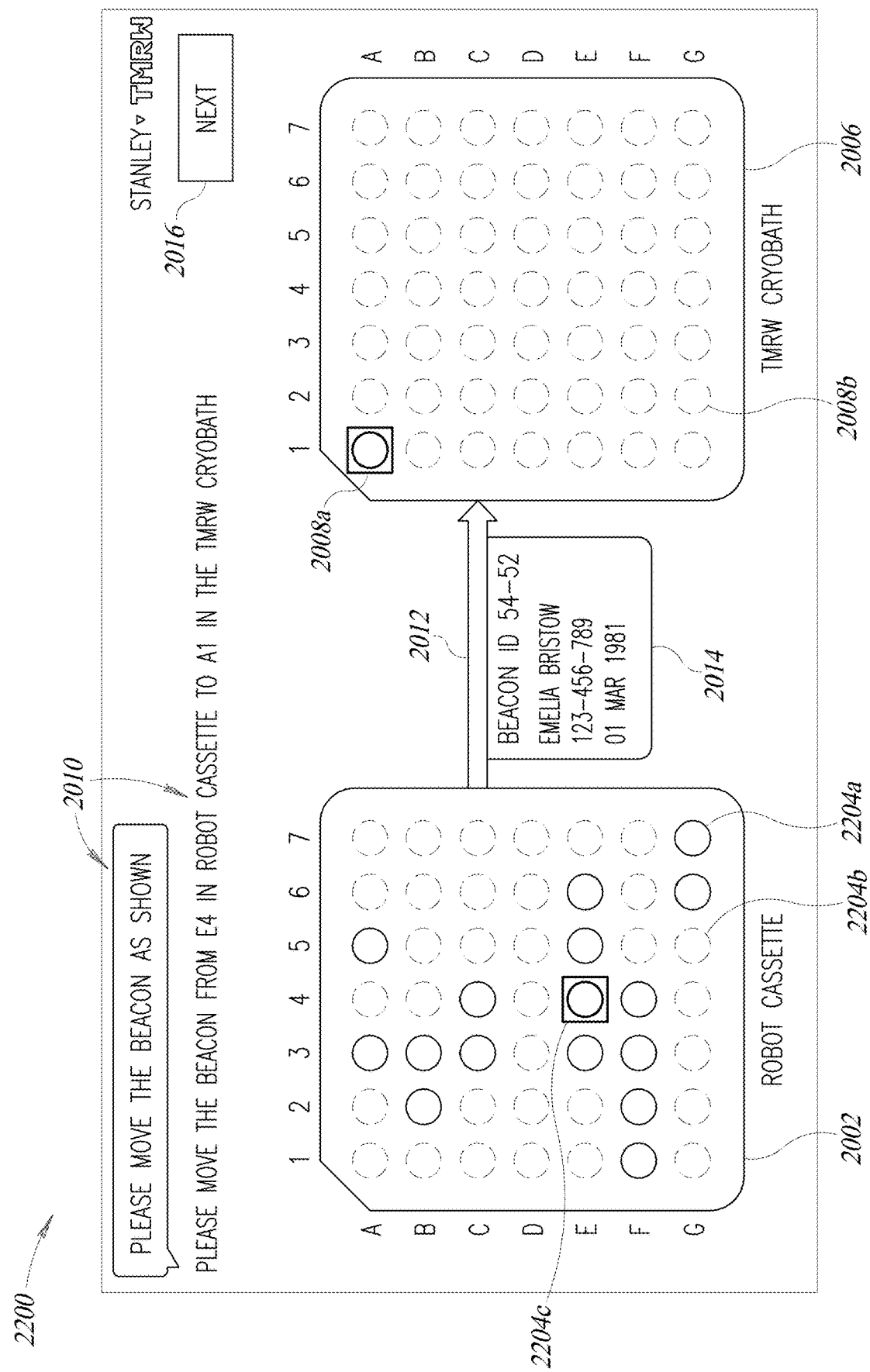
FIG. 22 is a screen print showing a container transfer prompt window of a user interface at a first time, used in operation of the transfer system to transfer specimen containers that hold biological specimens between a storage cassette and a carrier cassette, according to at least one implementation.

FIG. 22 shows a container transfer prompt window 2200 at a first time, according to at least one illustrated implementation. The processor-based transfer system 122 of the cryogenic system 100 causes presentation of the container transfer prompt window 2200 via a display monitor, heads up display, or other user interface device.

The container transfer prompt window 2200 includes a visual representation of a storage cassette 2202, including a visual represent of each position (e.g., circles arranged in two-dimensional in array) 2204a, 2204b, 2204c (only three called out) of the storage cassette, as well as a visual represent of which of those positions of the storage cassette are occupied with a specimen container (e.g., first color or darken circles 2204a in two-dimensional in array) and which are unoccupied (e.g., second color or lighten circles 2204b in two-dimensional in array). The container transfer prompt window 2200 can also include a visual representation of a position in the storage cassette, and hence a specimen container, that is a subject of a current transfer from the storage cassette to the carrier cassette (e.g., third color or intermediate between darken and lighten circles in two-dimensional in array 2204c).

The container transfer prompt window 2200 includes a visual representation of a carrier cassette 2006, including a visual represent of each position (e.g., circles arranged in two-dimensional in array) 2008a, 2008b (only two called out) of the carrier cassette, as well as a visual represent of which of those positions of the carrier cassette are occupied with a specimen container (e.g., first color or darken circles in two-dimensional in array) and which are unoccupied (e.g., second color or lighten circles 2008a in two-dimensional in array). The container transfer prompt window 2200 can also include a visual representation a position in the carrier cassette, and hence specimen container, that is a subject of a current transfer from the storage cassette to the carrier cassette (e.g., third color or intermediate between darken and lighten circles 2008b in two-dimensional in array).

The container transfer prompt window 2200 includes a prompt 2010 and a visual representation of the current transfer, for example indicating a direction of the transfer (e.g., single headed arrow) 2012, identification of the specimen container being transferred (e.g., dialog box 2014 with container identifier, patient name, patient unique identifier, and patient date of birth); and/or a description describing the transfer (e.g., textual description of position in storage cassette and position in carrier cassette).

Selection of a "next" user selectable icon 2016 is taken as an indication that the prompted transfer has been completed, for example when a specimen container was manually transferred from one positon in a storage cassette to a position in the carrier cassette. In response to a selection of the user selectable "next" icon, the processor-based system may scan or cause a reader to scan the positions of the storage cassette and/or the carrier cassette to confirm that the correct specimen container(s) was (were) moved to the correct position in the carrier cassette from the storage cassette. The processor-based transfer system may determine if there are additional specimen containers identified to be transferred, and prompt the transfer of those additional specimen containers. If there are additional transfers to be made, the processor-based system moves on for a transfer of a next specimen container, if any, for example moving to a next container transfer prompt window 2400. It is noted that the term "beacon" as used in the Figures, refers to specimen containers with wireless transponders that encode unique identifiers which can be used to uniquely identify each specimen container from all other specimen containers used by a facility (e.g., clinic, storage facility). It is also noted that the term "cryodevices" as used herein and in the Figures, refers to specimen holders that physical contact the specimens, usually in the form of straws, rods, or spatulas, and which are located in the interior of the vial of the specimen containers for storage. It is also noted that the term "cassettes" as used herein and in the Figures, refers to structures (e.g., trays, frames) with a set of receivers (e.g., openings, apertures) sized and dimensioned to hold respective specimen holders, receivers typically arranged in a two-dimensional specimen array. It is further noted that the term "robot cassettes" as used herein and in the Figures, refers to cassettes designed for use with a cryogenic refrigerator, which typically employs a robotic storage and retrieval mechanism (e.g., turntable, picker or elevator), and hence is denominated as a robot.

Figure 23:
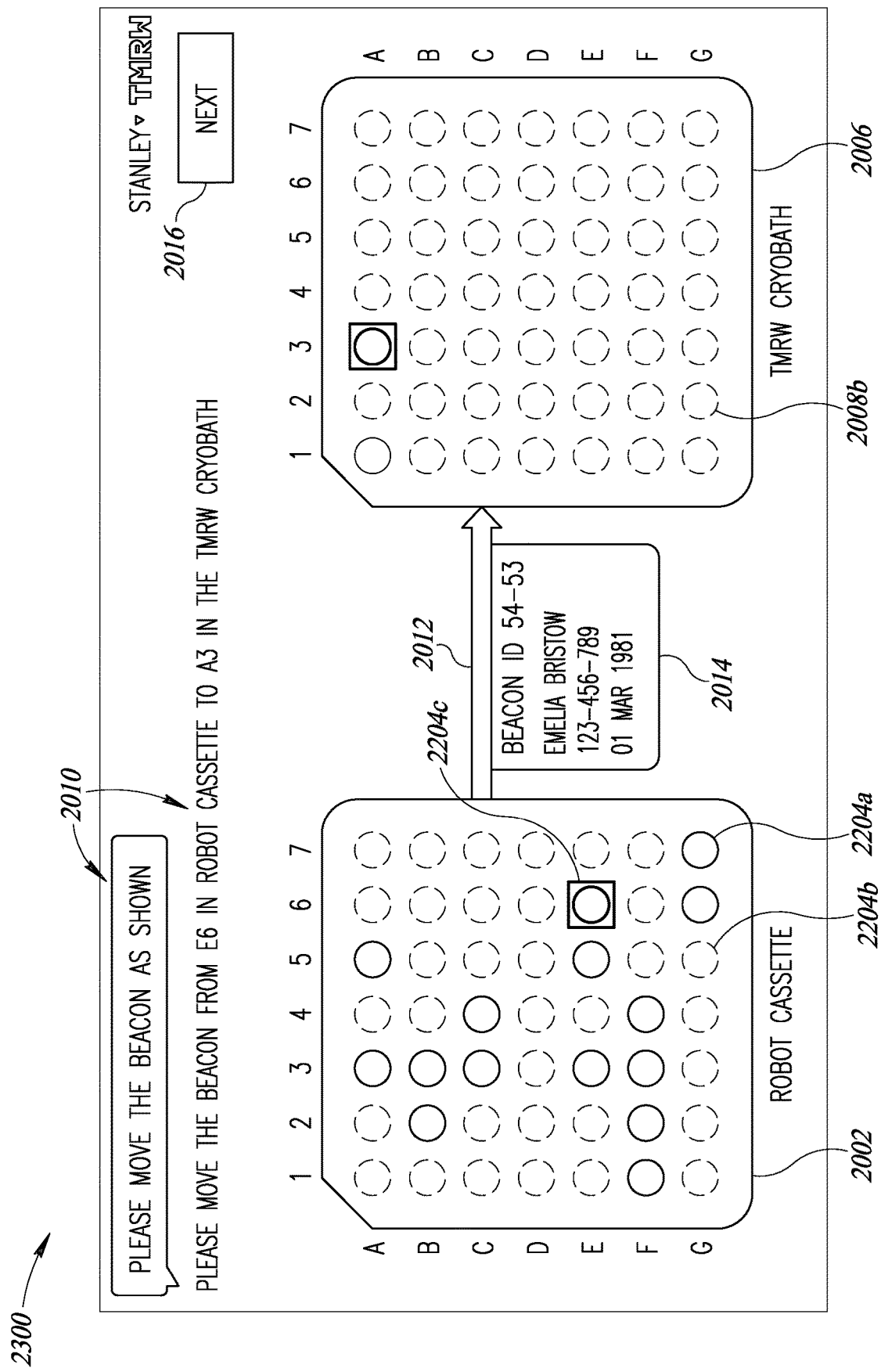
FIG. 23 is a screen print showing a container transfer prompt window of a user interface at a second time, used in operation of the transfer system to transfer specimen containers that hold biological specimens between a storage cassette and a carrier cassette, according to at least one implementation.

FIG. 23 shows the container transfer prompt window 2300 at a second time, according to at least one illustrated implementation. The processor-based transfer system 122 of the cryogenic system 100 causes presentation of the container transfer prompt window 2300 via a display monitor, heads up display, or other user interface device.

The container transfer prompt window 2300 is similar to the container transfer prompt window 2200, although displays different information based in transfer of a different specimen container. Identical reference numbers refer to identical or similar structures.

Figure 24:
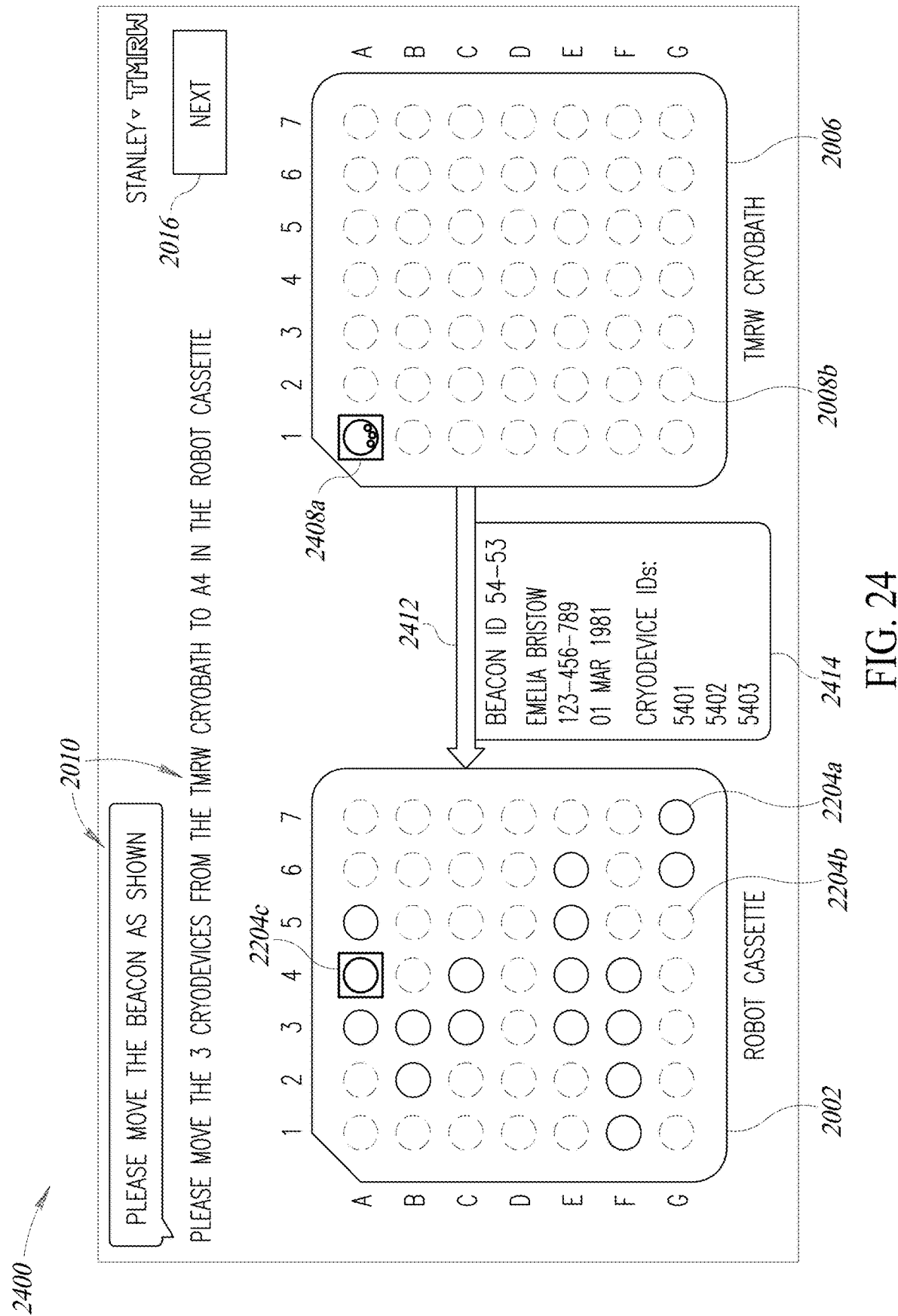
FIG. 24 is a screen print showing a container transfer prompt window of a user interface at a third time, used in operation of the transfer system to transfer specimen containers that hold biological specimens between a storage cassette and a carrier cassette, according to at least one implementation.

FIG. 24 shows a container transfer prompt window 2400 at a third time, different than the first or second times, according to at least one illustrated implementation. The processor-based transfer system 122 of the cryogenic system 100 causes presentation of the container transfer prompt window via a display monitor, heads up display, or other user interface device.

The container transfer prompt window 2400 of FIG. 24 closely resembles the container transfer prompt windows 2200, 2300 of FIGS. 22 and 23, but instead provides a visual indication of a transfer of a specimen container from a position in the carrier cassette to a position in the storage cassette. Identical or similar structures therebetween are identified with the same references numbers.

The container transfer prompt window 2400 includes a visual representation of the current transfer, for example indicating a direction of the transfer (e.g., single headed arrow) 2412, identification of the specimen container being transferred (e.g., dialog box 2414 with specimen container identifier, patient name, patient unique identifier, and patient date of birth); a contents of the specimen container (e.g., unique identifiers of three separate specimen holders (e.g., spatulas, straws), iconic representation 2408a of those specimen holders in specimen container), and/or a description describing the transfer (e.g., textual description of position in storage cassette and position in carrier cassette) 2010. In some instances, representation of specific specimen holders 2408a in a specimen container may be omitted, as well as information regarding those specific specimen holders.

Figure 25:
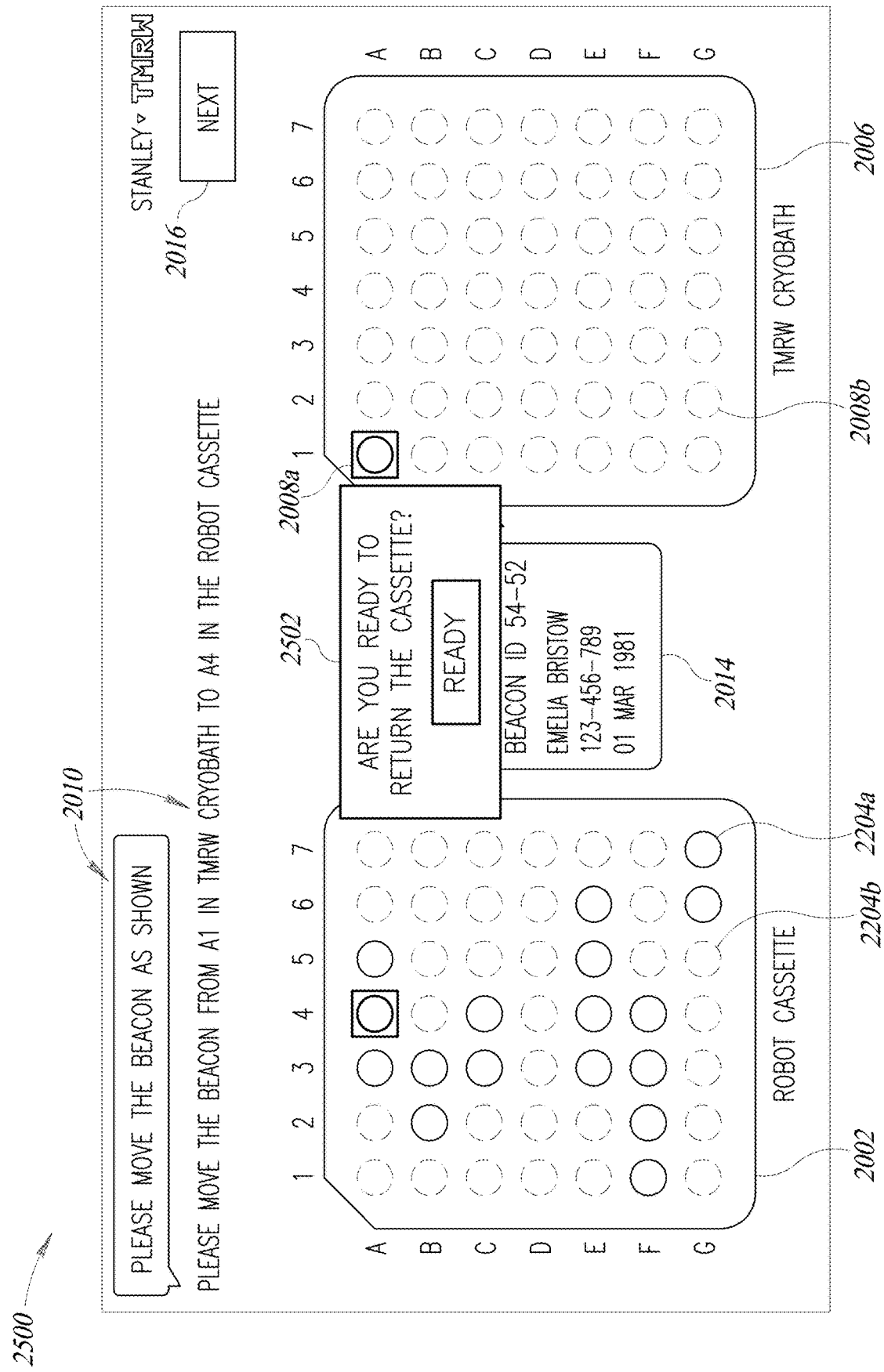
FIG. 25 is a screen print showing a container transfer prompt window of a user interface at a fourth time, used in operation of the transfer system to transfer specimen containers that hold biological specimens between a storage cassette and a carrier cassette, according to at least one implementation.

FIG. 25 shows a container transfer prompt window 2500 at a fourth time, different than the first, second or third times, according to at least one illustrated implementation. The processor-based transfer system 122 of the cryogenic system 100 causes presentation of the container transfer prompt window 2500 via a display monitor, heads up display, or other user interface device.

The container transfer prompt window 2500 of FIG. 25 closely resembles the container transfer prompt windows 2200, 2300, 2400 of FIGS. 22, 23 and 24, respectively, and identical reference numbers are employed for similar or identical structures therebetween. The container transfer prompt window 2500 further includes a "ready" user selectable icon 2502, that allows a user to indicate when the transfer operation has been completed, for example when a specimen container was manually transferred from one positon in a carrier cassette to a position in the storage cassette. In response to a selection of the user selectable ready icon 2502, the processor-based transfer system 122 may scan or cause a reader to scan the positions of the storage cassette and/or the carrier cassette to confirm that the correct specimen container was moved to the correct position in the carrier cassette from the storage cassette. The processor-based transfer system 122 may processor-based transfer system may determine if there are additional specimen containers identified to be transferred, and prompt the transfer of those additional specimen containers.

Figure 26:
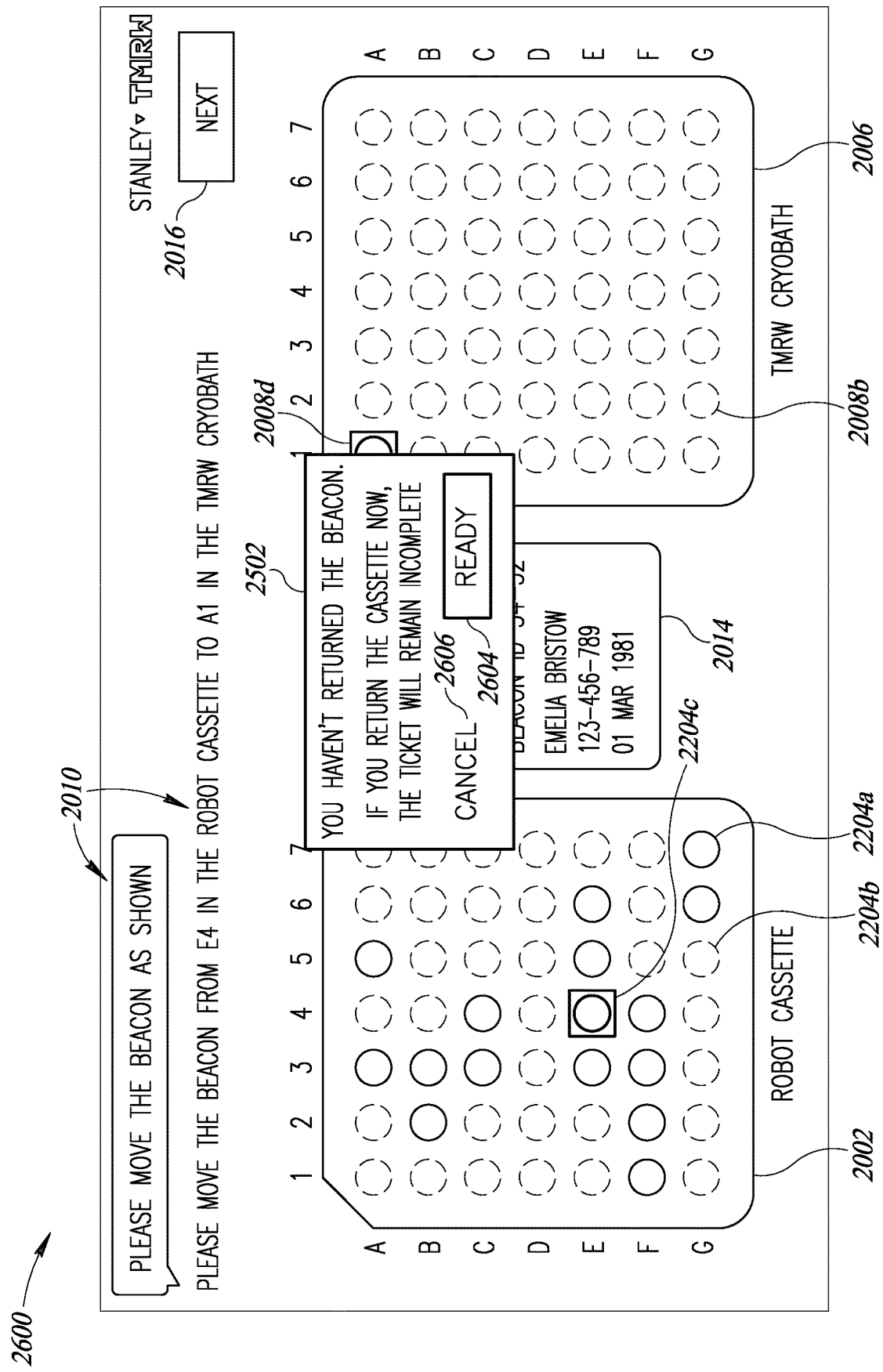
FIG. 26 is a screen print showing a container transfer prompt window 2600 at a fifth time, according to at least one illustrated implementation, providing a notification that a specimen container has not been returned to a cassette.

FIG. 26 shows a container transfer prompt window 2600 at a fifth time, different than the first, second, third or fourth times, according to at least one illustrated implementation. The processor-based transfer system 122 of the cryogenic system 100 causes presentation of the container transfer prompt window 2600 via a display monitor, heads up display, or other user interface device.

The container transfer prompt window 2600 of FIG. 26 closely resembles the container transfer prompt windows 2200, 2300, 2400, 2500 of FIGS. 22, 23, 24 and 25, respectively, and identical reference numbers are employed for similar or identical structures therebetween. The container transfer prompt window 2600 further includes a dialog box 2602 indicating that a specimen container of the specific transfer has not been returned to the cassette. The dialog box 2602 may include "continue" user selectable icon 2604 selection of which indicates that the transfer has been completed. The dialog box 2602 may include "cancel" user selectable icon 2606 selection of which indicates that the transfer transaction has to be aborted.

Figure 27:
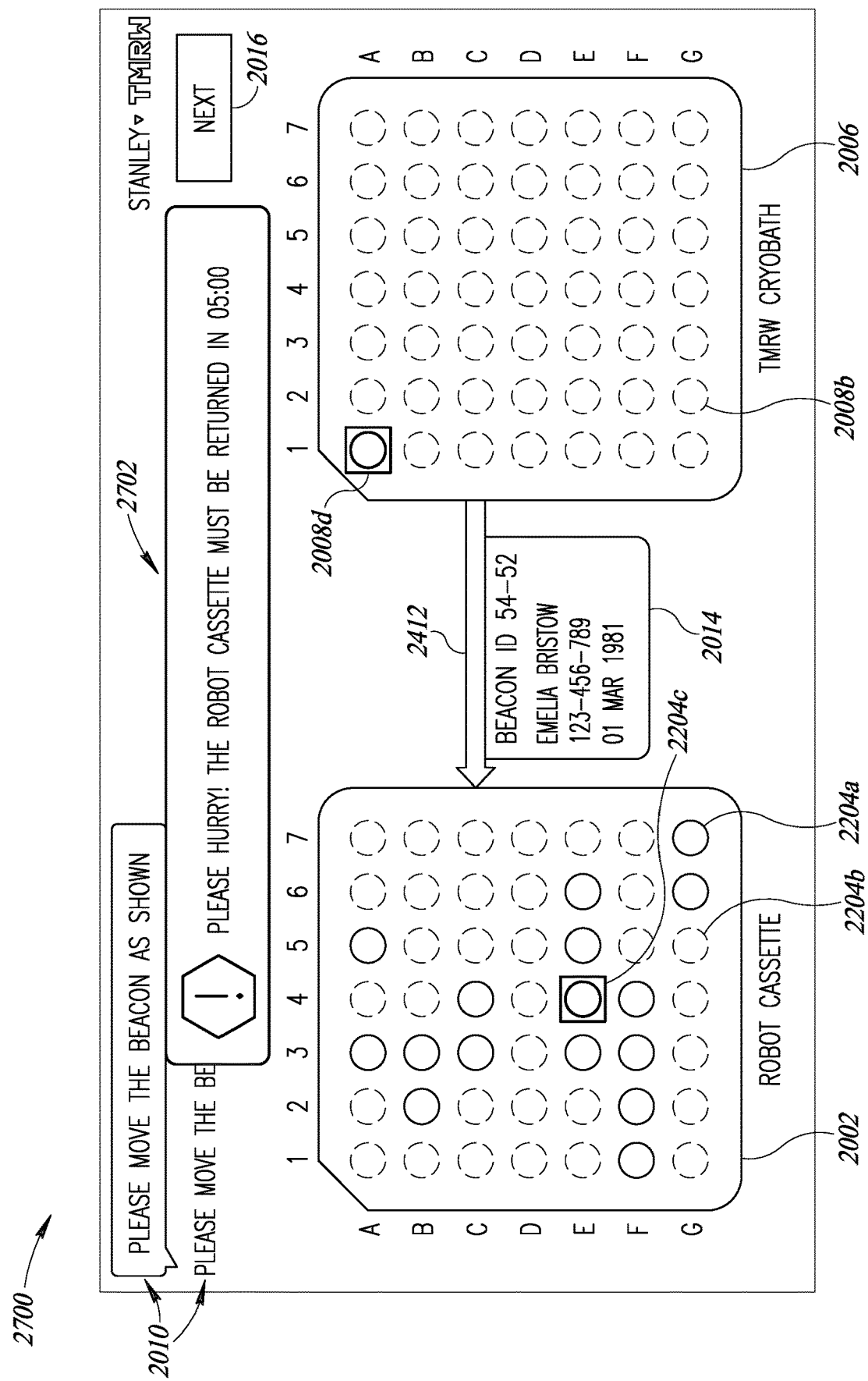
FIG. 27 is a screen print showing a container transfer prompt window 2700, according to at least one illustrated implementation, with an alert and a countdown timer for returning a cassette to a cryogenic environment.

FIG. 27 shows a container transfer prompt window 2700 at a sixth time, different than the first, second, third, fourth or fifth times, according to at least one illustrated implementation. The processor-based transfer system 122 of the cryogenic system 100 causes presentation of the container transfer prompt window 2700 via a display monitor, heads up display, or other user interface device.

The container transfer prompt window 2700 of FIG. 27 closely resembles the container transfer prompt windows 2200, 2300, 2400, 2500, 2600 of FIGS. 22, 23, 24, 25 and 26, respectively, and identical reference numbers are employed for similar or identical structures therebetween. The container transfer prompt window 2700 further includes a dialog box 2702 indicating that time is running out to return the cassette to the cryogenic refrigerator. The processor-based system may track time that the storage cassette remains out of the cryogenic environment, providing warnings and even visual display of a countdown timer and various alerts, to prevent the specimens from being exposed to ambient temperature for too long a period of time.

Figure 28:
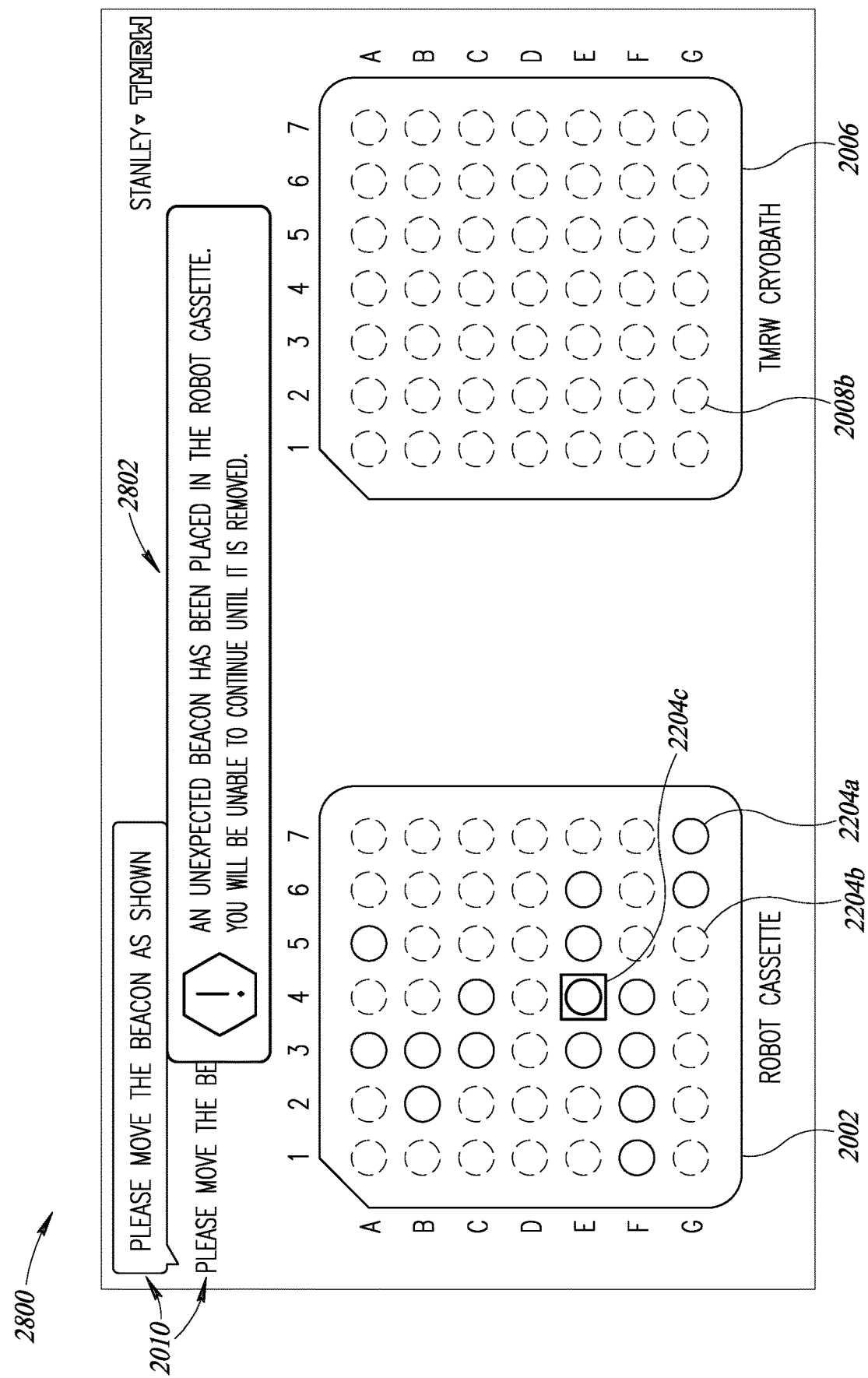
FIG. 28 is a screen print showing a container transfer prompt window 2800, according to at least one illustrated implementation, with a notification that an unexpected specimen container has been returned to a cassette.

FIG. 28 shows a container transfer prompt window 2800 at a seventh time, different than the first, second, third, fourth, fifth or sixth times, according to at least one illustrated implementation. The processor-based transfer system 122 of the cryogenic system 100 causes presentation of the container transfer prompt window 2800 via a display monitor, heads up display, or other user interface device.

The container transfer prompt window 2800 of FIG. 28 closely resembles the container transfer prompt windows 2200, 2300, 2400, 2500, 2600, 2700 of FIGS. 22, 23, 24, 25, 26 and 27, respectively, and identical reference numbers are employed for similar or identical structures therebetween. The container transfer prompt window 2800 further includes a dialog box 2802 indicating that an unexpected specimen container has been returned to a cassette.

Figure 29:
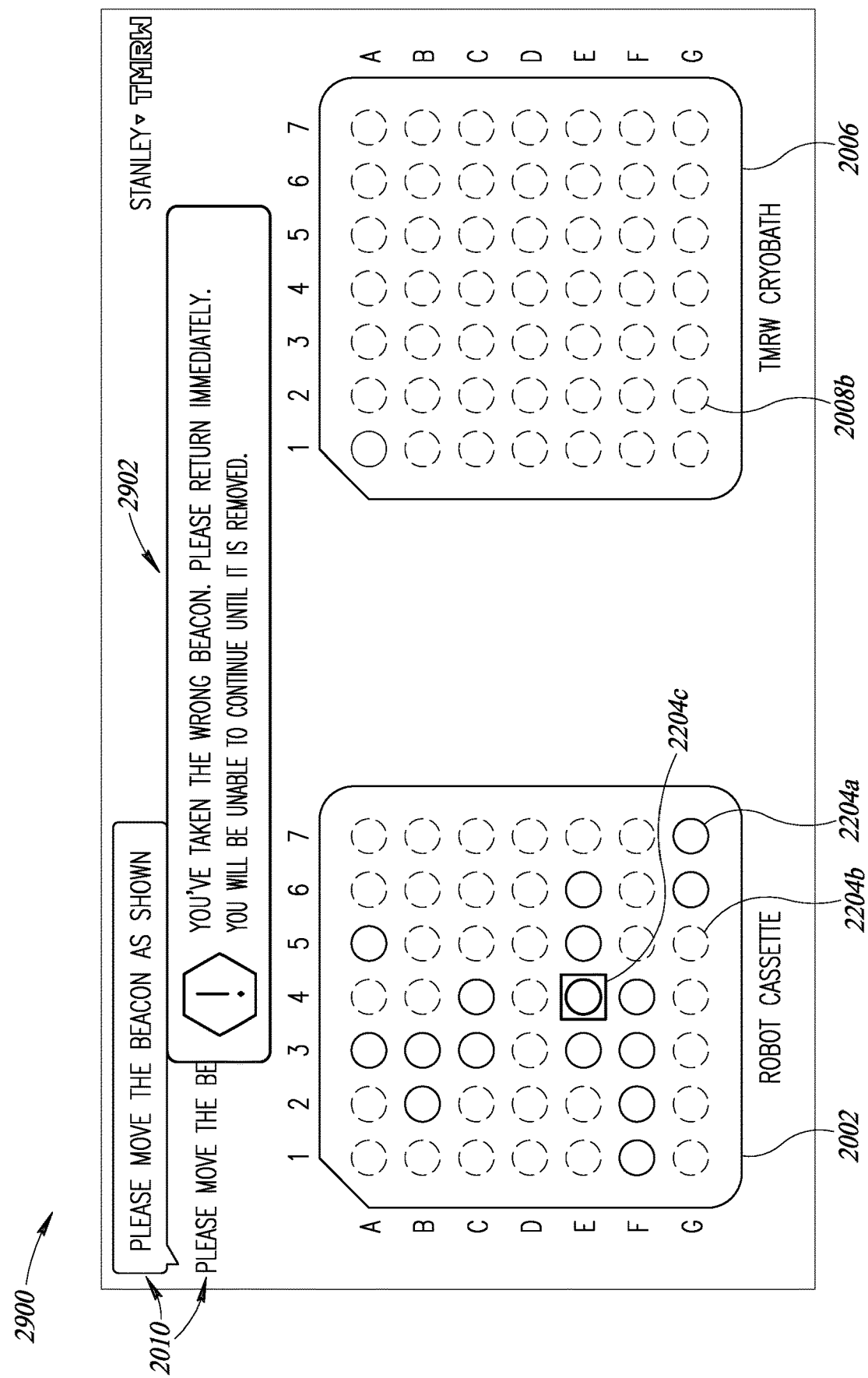
FIG. 29 is a screen print showing a container transfer prompt window 2800, according to at least one illustrated implementation, with a notification that an incorrect specimen container has been removed from a cassette.

FIG. 29 shows a container transfer prompt window 2900 at a seventh time, different than the first, second, third, fourth, fifth, sixth or seventh times, according to at least one illustrated implementation. The processor-based transfer system 122 of the cryogenic system 100 causes presentation of the container transfer prompt window 2900 via a display monitor, heads up display, or other user interface device.

The container transfer prompt window 2900 of FIG. 29 closely resembles the container transfer prompt windows 2200, 2300, 2400, 2500, 2600, 2700, 2800 of FIGS. 22, 23, 24, 25, 26, 27 and 28, respectively, and identical reference numbers are employed for similar or identical structures therebetween. The container transfer prompt window 2900 further includes a dialog box 2902 indicating that an incorrect specimen container has been removed from a cassette.

Figure 30:
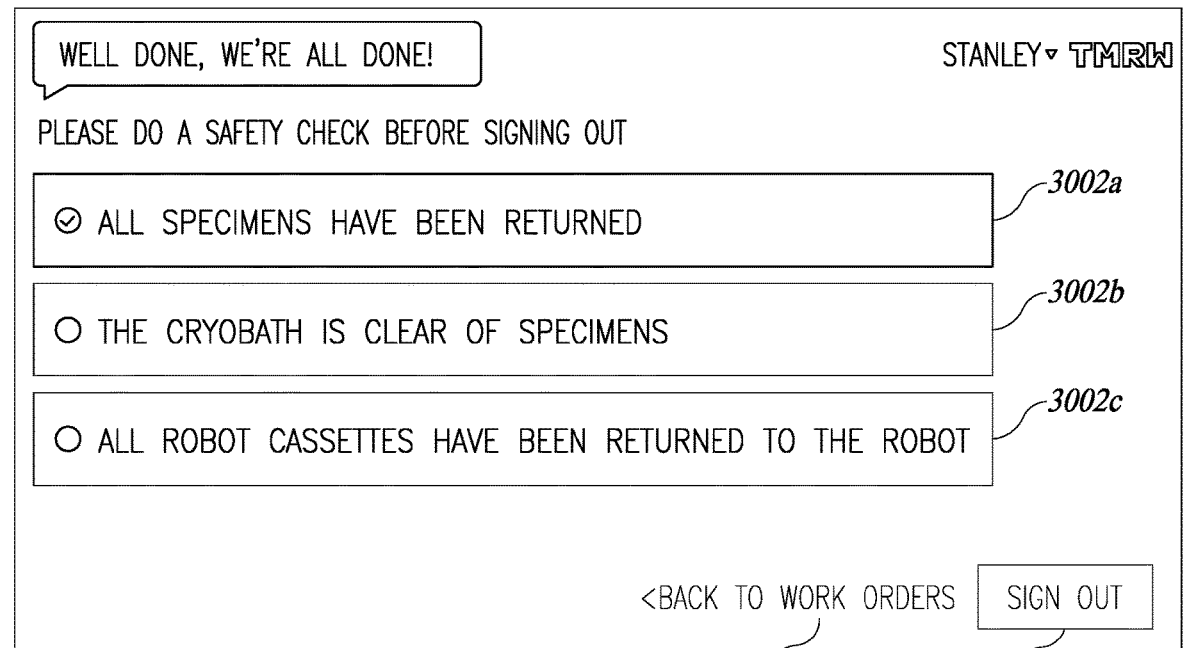
FIG. 30 is a screen print showing a final checklist window of a user interface at a first time, used in operation of the transfer system to transfer specimen containers that hold biological specimens between a storage cassette and a carrier cassette, according to at least one implementation.
Figure 31:
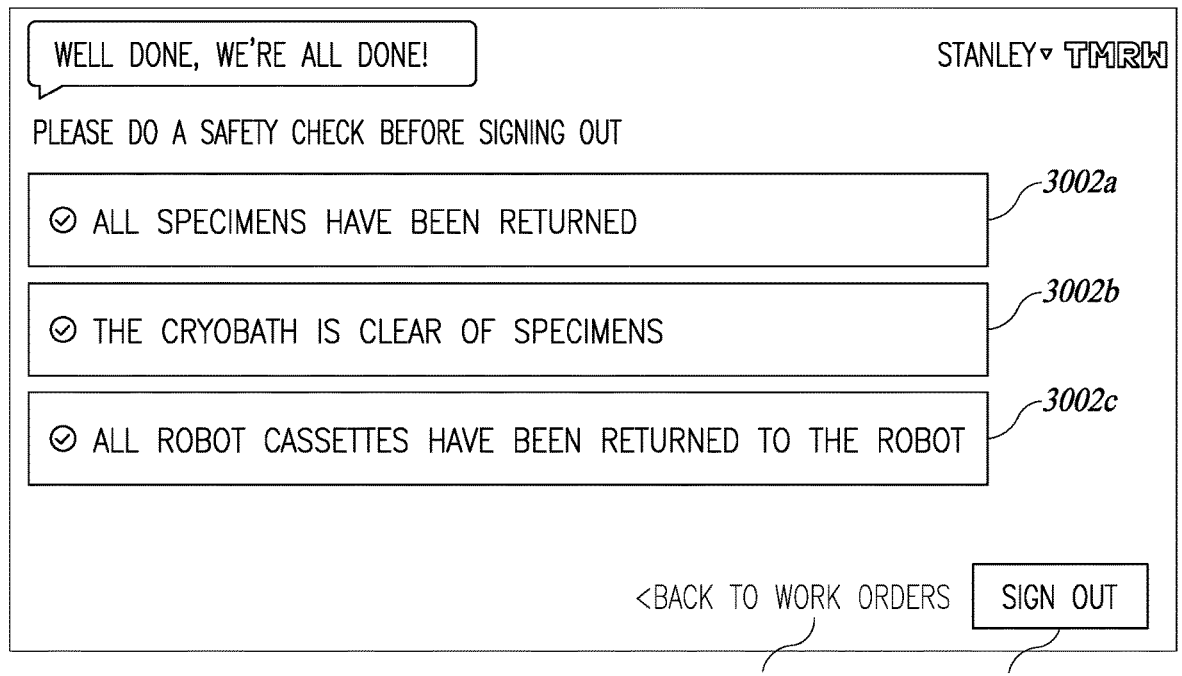
FIG. 31 is a screen print showing a final checklist window of a user interface at a second time, used in operation of the transfer system to transfer specimen containers that hold biological specimens between a storage cassette and a carrier cassette, according to at least one implementation.

FIGS. 30 and 31 show a final checklist window 3000, 3100, respectively, at two different instances of time, according to at least one illustrated implementation. The processor-based transfer system 122 of the cryogenic system 100 causes presentation of the final checklist windows 3000, 3100 via a display monitor, heads up display, or other user interface device.

The final checklist window 3000, 3100 provides a set of user selectable icons corresponding to respective action items or confirmations that are part of a workflow which is to be confirmed or performed as part of a procedure. The final checklist window 3000, 3100 requires a user to affirmatively confirm that each action item or confirmations is complete. The action items or confirmations may, for example include: confirming that all specimens have been returned; the cryogenic bath or tank is clear of specimens; and/or all storage cassettes or other carriers have been returned to the robot.

In particular, FIG. 30 shows a first item indicating that all specimen containers have been returned 3002a identified as being confirmed (e.g., check mark and green color) after the user selects the corresponding user selectable icon indicating that all specimens have been returned. FIG. 30 also shows a second item indicating that the cryobath in the portable thermally insulated carrier is clear of specimen containers have been returned 3002b identified as not yet being confirmed (e.g., solid circle and yellow color). FIG. 30 also shows a third item indicating that all storage cassettes have been returned to cryogenic refrigerator 3002c identified as not yet being confirmed (e.g., solid circle and yellow color). FIG. 31 shows all of the items 3002a, 3002b, 3002c identified as being confirmed (e.g., check mark and green color)

after the user selects the corresponding user selectable icons indicating that each action item or confirmation has been completed.

Once all items are identified as being confirmed, a sign out user selectable icon 3004 becomes selectable. In response to selection of the sign out user selectable icon 3004 the processor-based subsystem ends the session for the user, and requires the user to sign back in to start a new session. In response to selection of a back to work orders user selectable icon 3006, the processor-based subsystem completes the currently selected procedure, and returns to the navigation window, for example navigation windows 1400, 2500, 1600, 1700.

Figure 32:
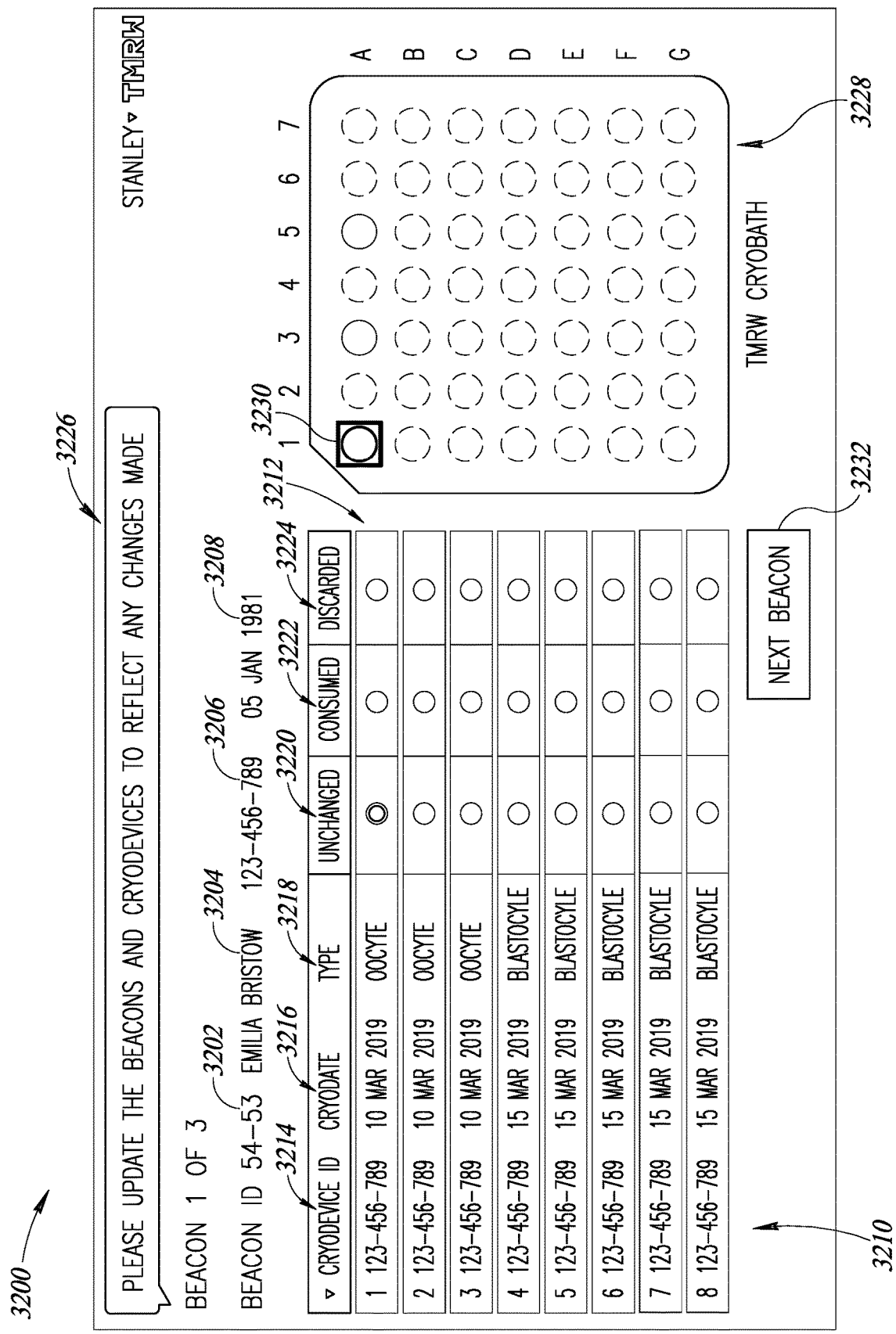
FIG. 32 is a screen print showing an inventory window of a user interface at a first time, used in operation of the transfer system to transfer specimen containers that hold biological specimens between a storage cassette and a carrier cassette, according to at least one implementation.

FIG. 32 shows an inventory window 3200 of a user interface at a first time, used in operation of the transfer system to transfer specimen containers that hold biological specimens between a storage cassette and a carrier cassette, according to at least one implementation.

The inventory window 3200 allows a user to inspect and update information representative of the contents of each specimen container. For example, the inventory window 3200 illustrated in FIG. 32 shows an inventory for a specimen container with the unique identifier 54-53. The inventory window 3200 provides specimen container identification information, for example, including: the unique identifier of the specimen container 3202, patient name 3204, patient unique identifier 3206, and patient date of birth 3208 for the patient to which the specimen container is assigned (e.g. contains biological tissue from the patient or for the patient).

The inventory window 3200 provides a listing of the contents of the selected container, for example as a list or chart 3210. The list or chart 3210 may, for example, include a row 3212 (only one called out) for each specimen holder or "cryodevice" stored in the selected specimen container. The list or chart 3210 may, for example, include a number of columns with information about the specimen holders or "cryodevices" stored in the selected specimen container. For example, for each of the specimen holders or "cryodevices" the list or chart 3210 may include: a specimen holder or cryodevice unique identifier 3214, date of specimen 3216, and type of specimen 3218, as well as user selectable categories of specimen status including unchanged 3220, consumed 3222, and discarded 3224. Selection of a user selectable categories (e.g., via radio button user interface components), for example in response to a prompt 3226, causes the processor-based system to update the information regarding the specimen carried by the respective specimen holder or cryodevice.

The inventory window 3200 may also provide a visual representation of a cassette 3228 (e.g., storage cassette, carrier cassette) including an indication (e.g., dark circle encompassed by square 3230) of where the selected specimen holder or cryodevice is positioned in the cassette.

The inventory window 3200 may also a user selectable "next beacon" icon 3232, selection of which indicates that the user is finished inspecting and/or updating information about the currently selected specimen holder or cryodevice, and is ready to select another specimen holder or cryodevice.

The various implementations and embodiments described above can be combined to provide further implementations and embodiments. All of the commonly assigned US patent application publications, US patent applications, foreign patents, and foreign patent applications referred to in this specification and/or listed in the Application Data Sheet, including but not limited U.S. patent application Ser. No. 17/082,359, filed Oct. 28, 2020; 62/927,566, filed Oct. 29, 2019; U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018, are each incorporated herein by reference, in their entirety. These and other changes can be made to the embodiments in light of the above-detailed description.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A system operable to provide signals indicative of occurrences of conditions associated with transfers of specimen containers between positions in storage cassettes and positions in transfer cassettes, the specimen containers marked with wireless transponders, the system comprising:
a first two-dimensional array of antennas, the first two-dimensional array of antennas having a first set of dimensions;
a second two-dimensional array of antennas, the second two-dimensional array of antennas having a second set of dimensions;
at least one radio communicatively coupled to the first two-dimensional array of antennas and the second two-dimensional array of antennas and configured to drive antennas of the first two-dimensional array and antennas of the second two-dimensional array to emit interrogation signals to interrogate the wireless transponders and to receive response signals from wireless transponders in a range of one or more antennas of the first two-dimensional array of antennas or one or more antennas of the second two-dimensional array of antennas, the at least one radio configured to determine one or more received signal strength indicator (RSSI) values of the response signals received from the wireless transponders in response to a given interrogation; and
a processor-based control system communicatively coupled to the at least one radio, wherein, for each respective received signal strength (RSSI) value of the determined one or more received signal strength indicator (RSSI) values, at least the radio or the processor-based control system is configured to determine a respective normalized RSSI value from the determined one or more RSSI values for each response signal of the response signals received from the wireless transponders in response to the given interrogation, and the processor-based control system is configured to determine, based at least in part on the respective normalized RSSI value, whether at least one wireless transponder of the wireless transponders is located at a first defined position of a first storage cassette of the storage cassettes or at a second defined position of a first transfer cassette of the transfer cassettes, and in response to a determination of the at least one wireless transponder of the wireless transponders not being located at the first defined position or at the second defined position, the processor-based control system is configured to provide a signal indicative of a first occurrence of a first defined condition.

2. The system of claim 1 wherein, the processor-based control system further is configured to present a prompt indicative of a position of ene a second storage cassette of the storage cassettes or of a second transfer cassette of the transfer cassettes from which to transfer one of the specimen containers along with the wireless transponder associated with the specimen container and a position of a third storage cassette of the storage cassettes or a third transfer cassette of the transfer cassettes to which to transfer the specimen container, the first defined position being the position of the first storage cassette of the storage cassettes or the second defined position being the position of the first transfer cassette of the transfer cassettes to which to transfer the specimen container before determining whether the at least wireless transponder of the wireless transponders is located at the first defined position of the first storage cassette of the storage cassettes or at the second defined position of the first transfer cassette of the transfer cassettes, wherein the antennas of the first two-dimensional array of antennas are configured to interrogate the first storage cassette or the second transfer cassette and the antennas of the second two-dimensional array of antennas are configured to interrogate the second storage cassette of the storage cassettes or the second transfer cassette of the transfer cassettes.

3. The system of claim 1 wherein the processor-based control system is configured to determine, based on response signals received in response to one or more interrogations, whether one or more specimen containers marked by respective wireless transponders are in one or more first incorrect positions in one or more storage cassette of the storage cassettes or in one or more second incorrect positions in one or more transfer cassette of the transfer cassettes, and in response to a determination of a specimen container marked by a respective wireless transponder of the wireless transponders being in the one or more first incorrect positions or the one or more second incorrect positions, the processor-based control system is configured to provide a signal indicative of a second occurrence of second defined condition.

4. The system of claim 1 wherein the processor-based control system is configured to determine, based on response signals received in response to one or more interrogations, whether one or more specimen containers marked by a respective wireless transponder of the wireless transponders are missing from the storage cassettes or the transfer cassettes, and in response to a determination of at least one specimen container marked being missing from the storage cassettes or the transfer cassettes, the processor-based control system is configured to provide a signal indicative of a third occurrence of a third defined condition.

5. The system of claim 1 wherein the processor-based control system is configured to present a signal indicative of the first occurrence of the first defined condition and indicative of at least an incorrect location or a correct location for the specimen container in the storage cassettes or the transfer cassettes.

6. The system of claim 1 wherein the processor-based control system, for each response signal received in response to the given interrogation, is configured to determine which response signal returning from one wireless transponder of the wireless transponders is closest to the antenna emitting a respective interrogation signal to which the wireless transponders respond via at least one of: a respective read rate representative of a total number of times the respective wireless transponder is read per a unit of time; or a respective response time representative of an amount of time a respective wireless transponder takes to initially respond to the interrogation.

7. The system of claim 1 wherein, the processor-based control system is configured to provide the signal indicative of the first occurrence to a display such that the display can present a visual prompt indicative of the first occurrence.

8. The system of claim 1 wherein the processor-based control system is configured to provide a signal to a robot such that the robot can make a movement transferring at least one of the specimen containers between positions in storage cassettes and positions in transfer cassettes.

9. The system of claim 1 wherein the wireless transponders and respective specimen containers are stored in a cryogenic environment, and the first two-dimensional array of antennas is external to the cryogenic environment.

10. A method of using the system of claim 1 the method comprising:
for each response signal received in response to a given interrogation, determining, by the at least one radio, a respective received signal strength indicator (RSSI) value of the response signals received from the wireless transponders in response to the given interrogation from the respective response signals received in response to the given interrogation;
for each determined respective received signal strength indicator (RSSI) value, determining, by at least one of the radio or the processor-based control system, a respective normalized RSSI value of respective response signals received in response to the given interrogation;
determining, by the processor-based control system, whether at least one wireless transponder of the wireless transponders is located at a first defined position or the second defined position based at least in part on the respective normalized RSSI value; and
in response to a determination of the at least one wireless transponder of the wireless transponders being not located at the first defined position or at the second defined position, providing a signal indicative of the first occurrence of the first defined condition.

11. The method of claim 10 wherein, before determining whether the at least one wireless transponder of the wireless transponders is located at a first defined position of ene a first storage cassette of the storage cassettes or of a second defined position of a first transfer cassette of the transfer cassettes, causing presenting a prompt indicative of a first position of one storage cassette of the storage cassettes or of one transfer cassette of the transfer cassettes from which to transfer one specimen container of the specimen containers and the wireless transponder associated with the first storage cassette or the first transfer cassette and a second position of a second storage cassette of the storage cassettes or a third position of a second transfer cassette of the transfer cassettes to which to transfer the specimen container, wherein one storage cassette of the storage cassettes or one transfer cassette of the transfer cassettes is interrogated via the antennas of the first two-dimensional array of antennas and the one storage cassettes or the one transfer cassette is interrogated via the antennas of the second two-dimensional array of antennas.

12. The method of claim 10, further comprising:
determining, by the processor-based control system, whether specimen containers marked by respective wireless transponders of the wireless transponders are in one or more incorrect positions in one or more storage cassettes of the storage cassettes or in one or more transfer cassettes of the transfer cassettes based on response signals received in response to one or more interrogations; and
in response to a determination of at least one specimen container marked by one or more respective wireless transponders of the wireless transponders being in a first incorrect position in one storage cassette of the storage cassettes or in a second incorrect position in one transfer cassette of the transfer cassettes, providing a signal indicative of a second occurrence of a second defined condition.

13. The method of claim 10, further comprising:
determining, by the processor-based control system, whether one or more specimen containers marked by one or more respective wireless transponders of the wireless transponders are missing from the one storage cassette of the storage cassettes or from the one transfer cassette of the transfer cassettes based on response signals received in response to one or more interrogations; and in response to a determination of at least one specimen containers marked being missing from the one storage cassette of the storage cassettes or from the one transfer cassette of the transfer cassettes, providing a signal indicative of a third occurrence of a third defined condition.

14. The method of claim 10 further comprising presenting a signal indicative of at least an incorrect location and a correct location for the specimen container in the storage cassettes or the transfer cassettes.

15. The method of claim 10, further comprising:
for each response signal received in response to the given interrogation, further determining, by the processor-based control system, which response signal returning from a wireless transponder of the wireless transponders is closest to the antenna emitting a respective interrogation signal to which the wireless transponders respond via at least one of:
 a respective read rate representative of a total number of times a respective wireless transponder is read per a unit of time; or
 a respective response time representative of an amount of time the respective wireless transponder takes to initially respond to the interrogation.

16. The method of claim 10 wherein the providing the signal indicative of the first occurrence of the first defined condition includes presenting a visual prompt.

17. The method of claim 10 further comprising transferring at least one specimen container of the specimen containers between positions in storage cassettes and positions in transfer cassettes using a robot receiving the signal indicative of the first occurrence.

18. The system of claim 1 wherein the processor-based control system is further configured to determine whether a temperature of a cryogenic fluid in one storage cassette of the storage cassettes or in one transfer cassette of the transfer cassettes is within a defined temperature threshold or is outside the defined temperature threshold and whether a level of the cryogenic fluid in one storage cassette of the storage cassettes or in one transfer cassette of the transfer cassettes is within a defined level threshold or outside the defined level threshold, and in response to a determination that of the temperature of the cryogenic fluid being outside the defined temperature threshold or the level of the cryogenic fluid being outside the defined level threshold, the processor-based control system is configured to provide a signal indicative of a fourth occurrence or a fifth occurrence of a forth defined condition or of a fifth defined condition, respectively.

19. The system of claim 1 wherein the processor-based control system is configured to determine whether a temperature of a cryogenic fluid in a cryogenic freezer is below a threshold temperature and a level of the cryogenic fluid in the cryogenic freezer is below a threshold level, and in response to a determination of the temperature of the cryogenic fluid being below the threshold temperature or the level of the cryogenic fluid in the cryogenic freezer being below the threshold level, the processor-based control system is configured to provide a signal indicative of a second occurrence or of a third occurrence of a second defined condition or of a third defined condition, respectively.

20. The method of claim 10, further comprising:
determining, by the processor-based control system, whether a temperature of a cryogenic fluid in one storage cassette of the storage cassettes or in a transfer cassette of the transfer cassettes is within a temperature threshold or outside the temperature threshold and whether a level of the cryogenic fluid in the one of the storage or the transfer cassettes is within a level threshold or outside the level threshold; and
in response to a determination of the temperature of the cryogenic fluid or the level of the cryogenic fluid in the one storage cassette of the storage cassettes or in the one transfer cassette the transfer cassettes being below the threshold temperature or being below the threshold level, providing, by the processor-based control system, a signal indicative of a second occurrence of a second defined condition or of a third occurrence of a third defined condition, respectively to be provided.

21. The method of claim 10, further comprising:
determining, by the processor-based control system, whether a temperature of a cryogenic fluid in a cryogenic freezer is within a temperature threshold or outside the temperature threshold and whether a level of the cryogenic fluid in the cryogenic freezer is within a level threshold or outside the level threshold; and
in response to a determination of the temperature of the cryogenic fluid being outside the temperature threshold or a determination of the level of the cryogenic fluid in the cryogenic freezer is outside the level threshold, providing, by the processor-based control system, a signal indicative of a second occurrence of a second defined condition or of a third occurrence of a third defined condition, respectively.

* * * * *